(12) United States Patent
Klefenz

(10) Patent No.: US 8,170,340 B2
(45) Date of Patent: May 1, 2012

(54) DEVICE, METHOD AND COMPUTER PROGRAM FOR IDENTIFYING A TRAFFIC SIGN IN AN IMAGE

(75) Inventor: Frank Klefenz, Mannheim (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 506 days.

(21) Appl. No.: 12/519,594

(22) PCT Filed: Dec. 18, 2007

(86) PCT No.: PCT/EP2007/011131
§ 371 (c)(1),
(2), (4) Date: Jul. 15, 2009

(87) PCT Pub. No.: WO2008/074476
PCT Pub. Date: Jun. 26, 2008

(65) Prior Publication Data
US 2010/0067805 A1 Mar. 18, 2010

(30) Foreign Application Priority Data

Dec. 18, 2006 (DE) .................. 10 2006 059 663

(51) Int. Cl.
*G06K 9/00* (2006.01)
(52) U.S. Cl. ........ 382/187; 382/103; 382/104; 382/181; 382/281; 348/61; 348/148
(58) Field of Classification Search .............. None
See application file for complete search history.

(56) References Cited

U.S. PATENT DOCUMENTS

| | | | |
|---|---|---|---|
| 6,266,442 B1* | 7/2001 | Laumeyer et al. | 382/190 |
| 6,363,161 B2* | 3/2002 | Laumeyer et al. | 382/104 |
| 6,449,384 B2* | 9/2002 | Laumeyer et al. | 382/104 |
| 6,453,056 B2* | 9/2002 | Laumeyer et al. | 382/104 |
| 6,625,315 B2* | 9/2003 | Laumeyer et al. | 382/190 |
| 7,092,548 B2* | 8/2006 | Laumeyer et al. | 382/104 |
| 7,403,669 B2 | 7/2008 | Aoyama | |
| 7,444,003 B2* | 10/2008 | Laumeyer et al. | 382/103 |

(Continued)

FOREIGN PATENT DOCUMENTS

KR 2004-0001793 A 1/2004

(Continued)

OTHER PUBLICATIONS

Barnes et al., "Real-time radial symmetry for speed sign detection", 2004, IEEE, pp. 566-571.*

(Continued)

*Primary Examiner* — Sath V Perungavoor
*Assistant Examiner* — Jason Heidemann
(74) *Attorney, Agent, or Firm* — Keating & Bennett, LLP

(57) ABSTRACT

A device for identifying a traffic sign in an image includes a Hough transformer implemented to identify a plurality of line sections running in different directions through the image in the image or in an edge image derived from same. The device further includes a shape detector implemented to detect a predefined shape in the image or in the edge image derived from same based on the identified line sections. The device apart from that includes a pattern identifier implemented to select an image section corresponding to the detected predefined shape based on the detected predefined shape and to identify a traffic sign based on the selected image section.

15 Claims, 43 Drawing Sheets

U.S. PATENT DOCUMENTS

| | | | | |
|---|---|---|---|---|
| 2001/0036293 | A1* | 11/2001 | Laumeyer et al. | 382/104 |
| 2001/0043717 | A1* | 11/2001 | Laumeyer et al. | 382/104 |
| 2001/0043718 | A1* | 11/2001 | Laumeyer et al. | 382/104 |
| 2006/0210116 | A1 | 9/2006 | Azuma | |

FOREIGN PATENT DOCUMENTS

| | | |
|---|---|---|
| WO | 2008/002638 A1 | 1/2008 |
| WO | 2008/003095 A2 | 1/2008 |

OTHER PUBLICATIONS

Kim et al., "Fast and robust ellipse extraction from complicated images," IEEE 2002, pp. 1-6.*

Piccioli et al., "A robust method for road sign detection and Recognition", 1994, Springer, pp. 495-500.*

Official Communication issued in International Patent Application No. PCT/EP2007/011131, mailed on May 29, 2008.

Garcia-Garrido et al.: "Fast Traffic Sign Detection and Recognition Under Changing Lighting Conditions"; IEEE Intelligent Transportation Systems Conference; Sep. 17-20, 2006, pp. 811-816.

Damavandi et al.: "Speed Limit Traffic Sign Detection & Recognition"; IEEE Conference on Cybernetics and Intelligent Systems; vol. 2; Dec. 1-3, 2004, pp. 797-802.

Funt et al.: "Color Constant Color Indexing"; IEEE Transactions on Pattern Analysis and Machine Intelligence; vol. 17; No. 5; May 1995, pp. 522-529.

Miura et al.: "An Active Vision System for Real-Time Traffic Sign Recognition"; IEEE Intelligent Transportation Systems Conference Proceedings; Oct. 1-3, 2000, pp. 52-57.

Kehtarnavaz et al.: "Stop-Sign Recognition Based on Color/Shape Processing"; Machine Vision and Applications; Sep. 1993, pp. 206-208.

Loy et al.: "Fast Shape-Based Road Sign Detection for a Driver Assistance System"; IEEE/RSJ International Conference on Intelligent Robots and Systems; Sep. 28-Oct. 2, 2004, pp. 70-75.

Hatzidimos: "Automatic Traffic Sign Recognition in Digital Images"; Proceedings of the International Conference on Theory and Applications of Mathematics and Informatics; 2004, pp. 174-184.

Soetedjo et al.: "Fast and Robust Traffic Sign Detection"; IEEE Xplore; 6 pages, 2005.

Ji et al.: "A Statistically Efficient Method for Ellipse Detection"; IEEE Xplore; 5 pages, 1999.

* cited by examiner

FIG 4B
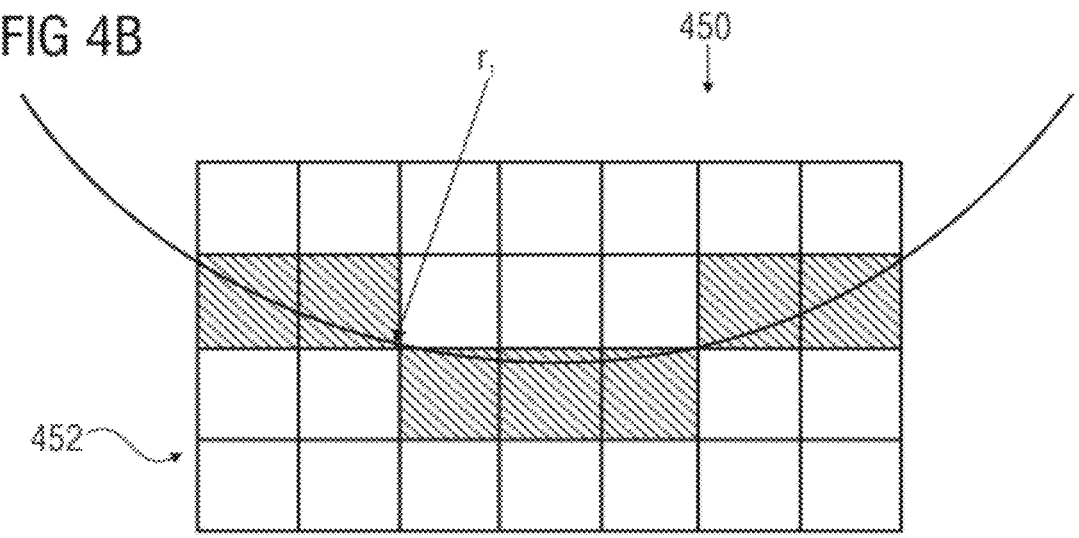
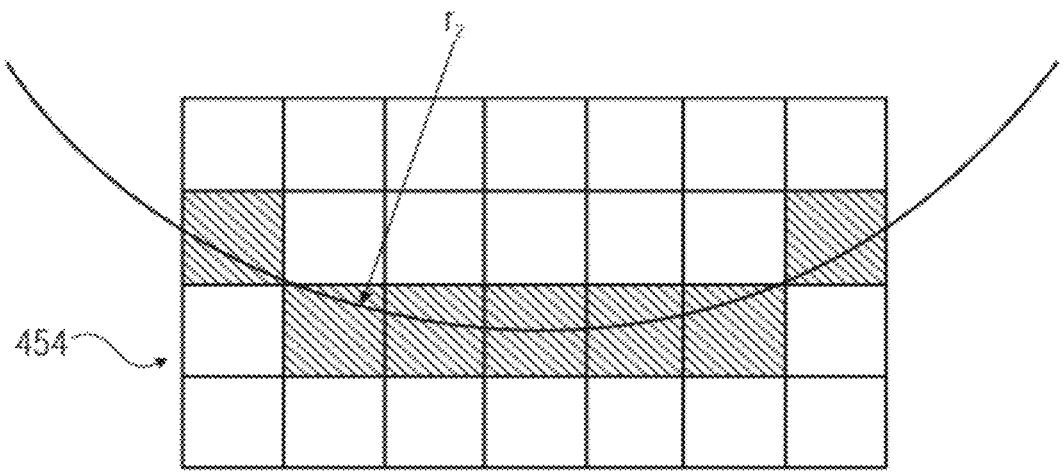
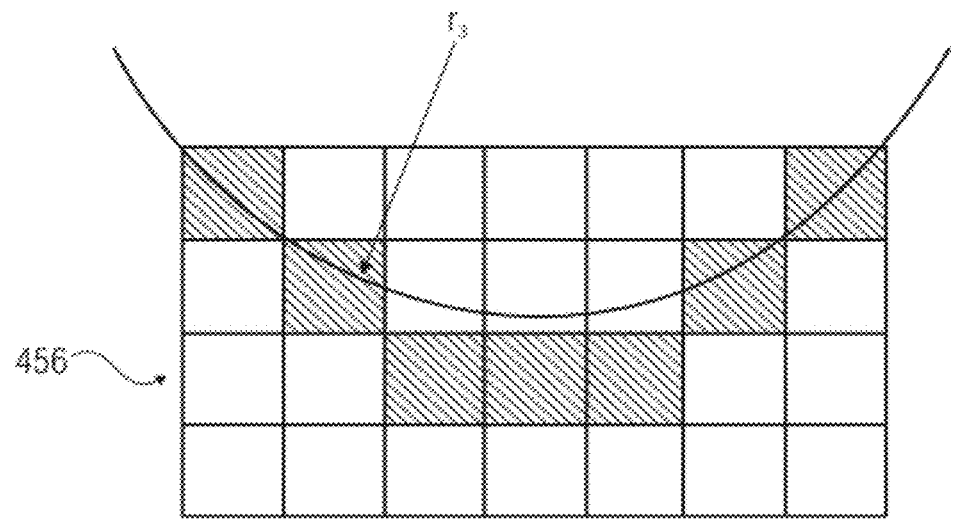

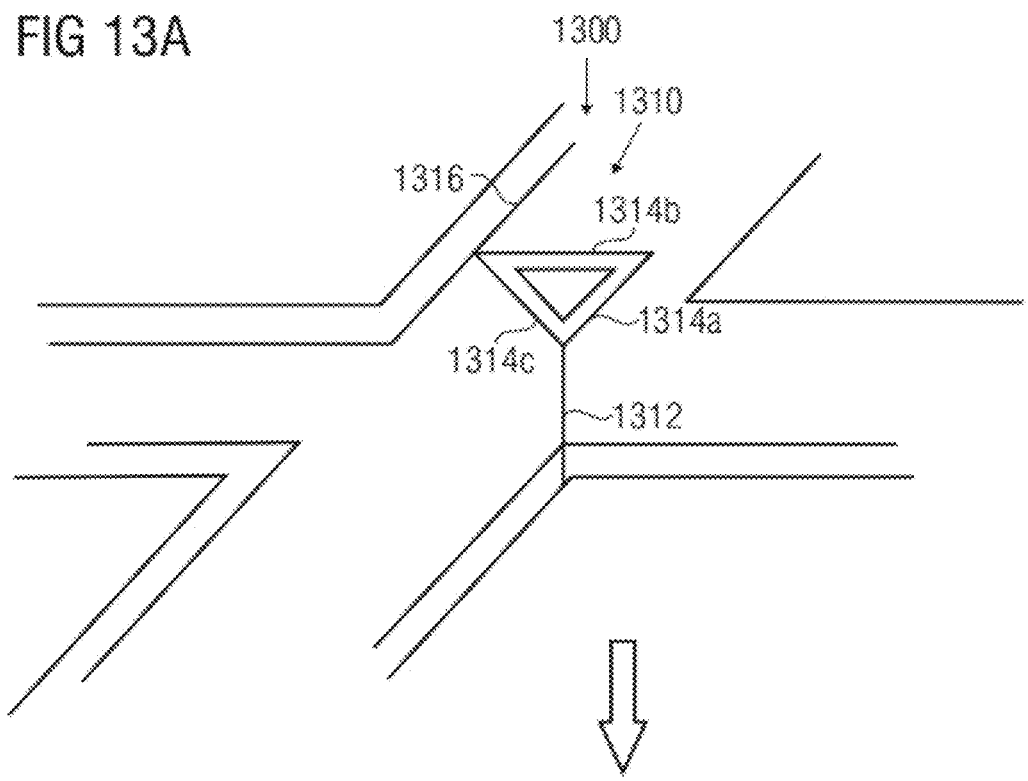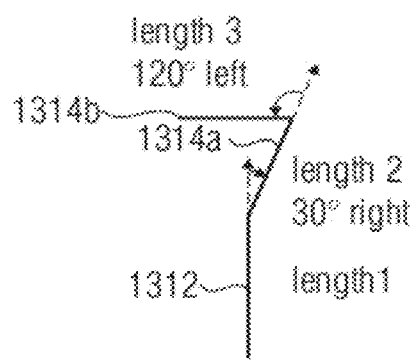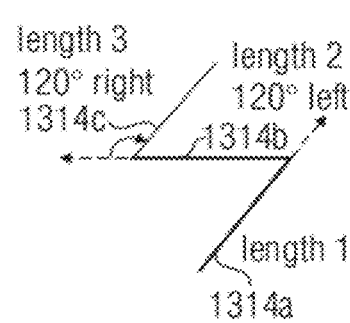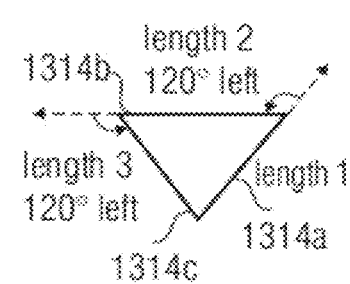
FIG 13A
FIG 13B  FIG 13C  FIG 13D

B) "crisp" histogram (64 colors: m = 1.1)

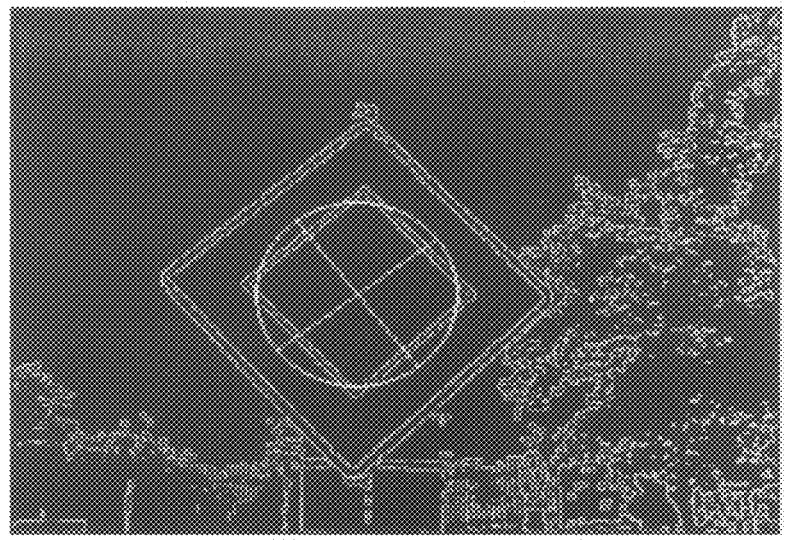
FIG 25A
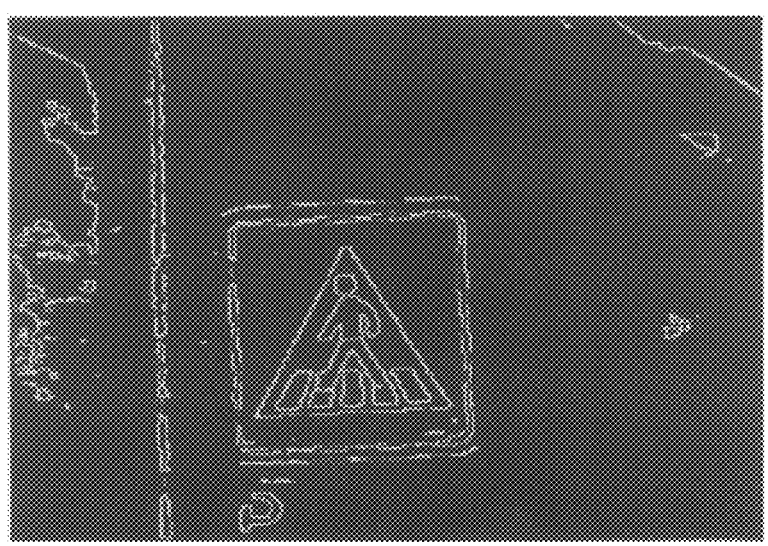
FIG 25B

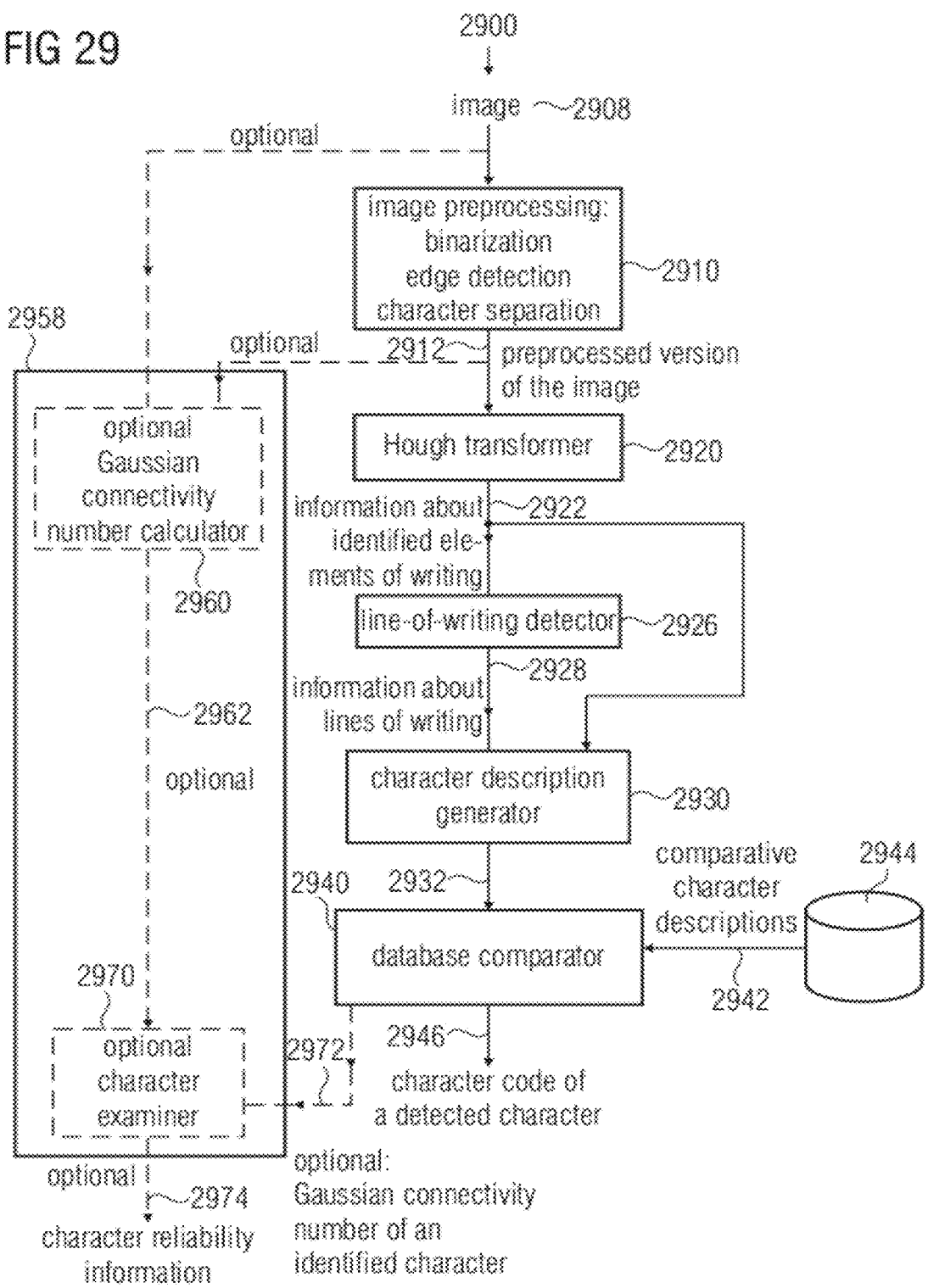

1st arc: downward
     position x, y; curvature radius r
2nd arc: to the right
     position x, y; curvature radius r
3rd arc: upward
     position x, y; curvature radius r 1st straight line section: to top right (angle 80° against horizontal)
                    position x,y; length l 2nd straight line section: vertical (angle 90° against horizontal)
                    position x,y; length l

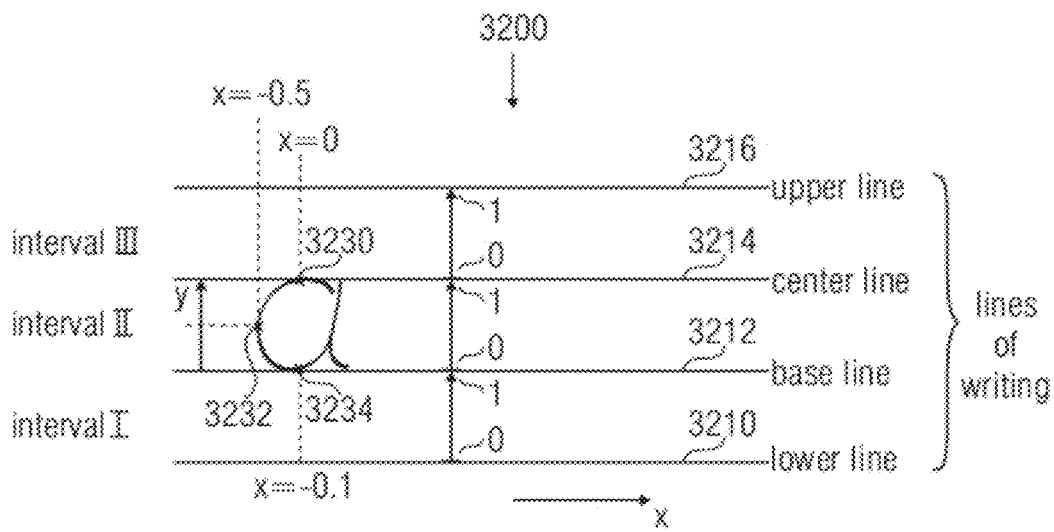

FIG 32A

→ arc: • direction (upward, downward, to left, to right)
  extreme:
  • position x
  • position y relative to lines of writing $$\begin{pmatrix} \text{interval I, interval II, interval III} \\ \text{on line of writing} \\ \text{additionally optionally more accurate description} \end{pmatrix}$$

• curvature radius (optional)
→ straight line section:
  • direction (e.g. angle against horizontal and/or against line of writing)
  • starting point and end point or length and center point

FIG 32B

3280 ↓ example: "a"

arc 1: downward, extreme: x=0; on center line
    arc 2: to right, extreme: x=-0.5; interval II, y=0.5
    arc 3: upward, extreme: x=-0.1; on base line straight line section 1:  to top right, angle 80°
                            starting point x=0.4, interval II, y=0.2
                            end point x=0.5, on center line

DEVICE, METHOD AND COMPUTER PROGRAM FOR IDENTIFYING A TRAFFIC SIGN IN AN IMAGE

The present invention generally relates to a device, a method and a computer program for identifying a traffic sign in an image, specifically to traffic sign detection while using a Hough transform.

BACKGROUND OF THE INVENTION

The steady increase in the traffic flow on the roads and the increase in the requirements placed upon the safety of vehicles by car drivers result in an ever increasing need to automatically detect traffic signs. Detection of traffic signs by an electronic system enables drawing a driver's attention to requirements of the respective traffic situation, and therefore enables recognizing dangers in road traffic on time and counteracting same.

For example, it is possible to detect speed limits indicated by traffic signs, or the lifting of same, by means of a system for traffic sign detection. For example, a vehicle may provide a permanent display of the current speed limit, so that a driver is informed of the speed limit even if he/she has overlooked the traffic sign dictating the speed limit. In addition, a driver may be warned, for example, by an optical or acoustic signal if he/she exceeds the maximum permissible speed (e.g. by more than a maximum permissible deviation).

Alternatively, it is also possible to detect other traffic regulations, for example regulations governing the right of way. Therefore, if the driver overlooks a traffic sign governing the right of way, which may be determined, for example, on the basis of detecting the traffic sign and further on the basis of the vehicle's speed, the driver may be warned against the dangers resulting from this. Similarly, for example, traffic signs which point out specific dangers (e.g. slippery road, steep slope, sharp bend, and the like) may be detected automatically. Again, the user may be informed or warned if he/she does not adjust his/her driving to the situation indicated by the traffic sign (for example if he/she approaches a sharp bend too fast).

Several approaches for detecting traffic signs already exist. In this context, however, there is typically the difficulty that detection of traffic signs in complex environment situations cannot occur with the very high level of safety that may be applied. In addition, conventional systems exhibit enormous problems when, for example, traffic signs are partly occluded, for example are located in a shadow area, or are dirty or damaged (e.g. bent).

SUMMARY

According to an embodiment, a device for identifying a traffic sign in an image may have: a Hough transformer which is implemented to identify a plurality of line sections running through the image in different directions in the image or in an edge image derived from same; a shape detector which is implemented to detect a shape corresponding to a traffic sign in the image or in an edge image derived from same based on the identified line sections; and a pattern identifier which is implemented to select an image section corresponding to the detected shape whose shape corresponds to the shape detected by the shape detector based on the detected shape and to identify a traffic sign based on the selected image section using a comparative image pattern, wherein the pattern identifier is implemented to adapt the section of the image and the comparative image pattern to each other with respect to a shape by mapping; wherein the Hough transformer is further implemented to identify circular arc segments or elliptical arc segments in the image or in the edge image derived from same; wherein the device further includes an ellipse detector which is implemented to detect a location of an ellipse in the image or in the edge image derived from same based on the identified circular arc segments or elliptical arc segments; wherein the Hough transformer is implemented to determine extreme points of circular arc segments or of elliptical arc segments, and wherein the ellipse detector is implemented to select at least a first set of four extreme points from the extreme points determined by the Hough transformer, and a second set of four extreme points from the extreme points determined by the Hough transformer, wherein the first set of four extreme points is different from the second set of four extreme points, to determine parameters of a first fit ellipse by the four extreme points of the first set of extreme points, to determine a deviation of the four extreme points of the first set of extreme points from the first fit ellipse, to determine parameters of a second fit ellipse by the four extreme points of the second set of extreme points, to determine a deviation of the four extreme points of the second set of extreme points from the fit ellipse, and to determine, using the deviation of the four extreme points of the first set of extreme points from the first fit ellipse and using the deviation of the four extreme points of the second set of extreme points from the second fit ellipse, whether the four extreme points of the first set of extreme points belong to an ellipse in the image, and whether the four extreme points of the second set of extreme points belong to an ellipse in the image.

According to another embodiment, a method of identifying traffic signs in an image may have the steps of: Hough transforming the image or an edge image derived from same to identify circular arc segments or elliptical arc segments; detecting a shape corresponding to a traffic sign in the image or an edge image derived from same based on the identified circular arc segments or elliptical arc segments; and identifying a traffic sign in an image section corresponding to the detected shape using a comparative image pattern, wherein the section of the image and the comparative image pattern are adapted to each other with respect to a shape by mapping; wherein detecting a shape corresponding to a traffic sign includes detecting a location of an ellipse in the image or in the edge image derived from same based on the identified circular arc segments or elliptical arc segments; wherein Hough transforming includes determining extreme points of circular arc segments or of elliptical arc segments, and wherein detecting the ellipse includes selecting a first set of four extreme points from the extreme points determined by the Hough transformer, and a second set of four extreme points from the extreme points determined by the Hough transformer, wherein the first set of four extreme points is different from the second set of four extreme points, wherein detecting the ellipse includes determining parameters of a first fit ellipse by the four extreme points of the first set of extreme points, determining a deviation of the four extreme points of the first set of extreme points from the first fit ellipse, determining parameters of a second fit ellipse by the four extreme points of the second set of extreme points, determining a deviation of the four extreme points of the second set of extreme points from the fit ellipse, and determining, using the deviation of the four extreme points of the first set of extreme points from the first fit ellipse and using the deviation of the four extreme points of the second set of extreme points from the second fit ellipse, whether the four extreme points of the first set of extreme points belong to an ellipse in the image, and whether the four extreme points of the second set of extreme points belong to an ellipse in the image.

Another embodiment may have a computer program for executing the method of identifying traffic signs in an image, wherein the method may have the steps of: Hough transforming the image or an edge image derived from same to identify circular arc segments or elliptical arc segments; detecting a shape corresponding to a traffic sign in the image or an edge image derived from same based on the identified circular arc segments or elliptical arc segments; and identifying a traffic sign in an image section corresponding to the detected shape using a comparative image pattern, wherein the section of the image and the comparative image pattern are adapted to each other with respect to a shape by mapping; wherein detecting a shape corresponding to a traffic sign includes detecting a location of an ellipse in the image or in the edge image derived from same based on the identified circular arc segments or elliptical arc segments; wherein Hough transforming includes determining extreme points of circular arc segments or of elliptical arc segments, and wherein detecting the ellipse includes selecting a first set of four extreme points from the extreme points determined by the Hough transformer, and a second set of four extreme points from the extreme points determined by the Hough transformer, wherein the first set of four extreme points is different from the second set of four extreme points, wherein detecting the ellipse includes determining parameters of a first fit ellipse by the four extreme points of the first set of extreme points, determining a deviation of the four extreme points of the first set of extreme points from the first fit ellipse, determining parameters of a second fit ellipse by the four extreme points of the second set of extreme points, determining a deviation of the four extreme points of the second set of extreme points from the fit ellipse, and determining, using the deviation of the four extreme points of the first set of extreme points from the first fit ellipse and using the deviation of the four extreme points of the second set of extreme points from the second fit ellipse, whether the four extreme points of the first set of extreme points belong to an ellipse in the image, and whether the four extreme points of the second set of extreme points belong to an ellipse in the image, when the computer program is executed on a computer.

The present invention provides a device for identifying a traffic sign in an image. The device comprises a Hough transformer implemented to identify a plurality of line sections, or line segments, in the image or edge image derived therefrom which run through the image in different directions. The device further comprises a shape detector implemented to detect, on the basis of the line sections identified, a predefined shape in the image or in the edge image derived therefrom. The device further comprises a pattern identifier implemented to select, on the basis of the predefined shape detected, an image section which corresponds to the predefined shape detected, and to identify a traffic sign on the basis of the image section selected.

It is a core idea of the present invention that detection of shapes may occur in a particularly reliable manner if line sections which run through the image in different directions are identified by means of a Hough transformer, since a Hough transformer provides particularly reliable information about various line sections. In particular, a Hough transformer is able to detect even interrupted line sections as one single line section as long as it is ensured that a sufficient fragment of a line section is still present in the image. Thus, utilization of a Hough transform overall ensures that the shape detector obtains information about line sections running in the image in a form which is as compact as possible and is not split up into many small individual line sections.

This approach is especially advantageous in particular in connection with traffic sign detection, since the external outlines of the relevant traffic signs are essentially defined by a plurality of straight lines. If traffic signs are not round, they will predominantly have triangular or square shapes, the rims of the traffic signs being defined by straight lines or straight line sections. Therefore, if an uninterrupted straight line section exists in an image, it may be assumed that said line section is possibly a straight-line boundary of a traffic sign which is interrupted by a disturbance (e.g. by a shadow or by soiling).

Therefore, it may be stated that in accordance with a core idea of the present invention, a Hough transformer provides the shape detector with precisely that information about straight line sections in an image which the shape detector needs in order to detect the traffic signs.

In addition, in accordance with a further core idea of the present invention, one has found that detection of a traffic sign solely on the basis of the shape of an external outline is not possible since a plurality of various traffic signs have identical shapes (round, triangular or square). Rather, it is advantageous to employ a pattern identifier which selects, on the basis of the predefined shape detected, an image section which corresponds to the predefined shape detected, so as to identify a traffic sign on the basis of the image section selected. Thus, the inventive device ensures that pattern identification need not be performed across the entire image. Rather, an individual image section is selected, the rims of which are selected such that the shape defined by the rims corresponds to the shape of a traffic sign (e.g. round, triangular or square).

In other words, the shape detector identifies, on the basis of the information provided by the Hough transformer on line sections running through the image, any shapes which indicate the presence of traffic signs, and the pattern identifier identifies the pattern contained in an image section described by the shape detector.

Thus, a traffic sign in an image is identified, all in all, in a two-stage process. Typically, the Hough transformer provides a particularly reliable statement on straight lines as typically define the outlines of traffic signs. Also, the two-stage process, which initially comprises detection of lines and/or shapes, and subsequently identification of a pattern, enables a particularly high level of efficiency of the inventive concept.

Thus, a traffic sign is pre-identified, on the basis of shape detection, while using the line sections from the overall image which are provided by the Hough transformer, whereas a second stage of traffic sign identification only operates on an image section and consequently makes do with comparatively low computing power.

As compared to conventional methods of pattern detection, the inventive concept thus entails a particularly high level of reliability, since, as is known, the Hough transformer is highly insensitive to shadowing or interruptions of lines. In addition, a Hough transform may be efficiently implemented in hardware or in software.

The two-stage concept yields additional advantages in terms of efficiency, which results in that pattern identification need only be performed on individual sections of the overall image which have been detected as candidate sections for a traffic sign.

In an advantageous embodiment of the present invention, the shape detector is implemented to detect, on the basis of relative locations of the line sections identified, the predefined shape in the image or in the edge image derived therefrom. Specifically, it has turned out that it is precisely the relative locations of individual line sections in relation to one another that defines a traffic sign, whereas an absolute location of the traffic sign in the image is less meaningful. Specifically, traffic signs may be located at various distances from a vehicle from which the image is being taken. Additionally, traffic signs may be arranged on the left-hand side or on the right-hand side of the road. In particular with multi-lane roads, such as highways, a location of the traffic sign in relation to the vehicle from which the image is being taken is not very meaningful. Also, it shall be noted that the traffic sign is not necessarily upright, but may be tilted in relation to the vehicle. As a result, orientation of the traffic sign in the image is not clear right from the start. Rather, it is only the traffic sign's shape per se that is essentially meaningful. However, the shape of the traffic sign is characterized by the relative locations of the line sections identified, which may be considered outlines of the traffic sign.

In accordance with a further embodiment of the present invention, the shape detector is implemented to select a subset of selected identified line sections from a total number of identified line sections, to determine, for the selected identified line sections, relative location parameters which describe relative locations of the selected identified line sections in relation to one another or relative locations of intersection points of the selected identified line sections, and to decide, on the basis of the relative location parameters, whether the selected identified line sections describe a predefined comparative shape. In this context, it is advantageous to compare the relative location parameters for the selected identified line sections with relative location parameters of comparative shapes to be identified so as to obtain a quantitative definition of a deviation between the relative location parameters for the selected identified line sections and the relative location parameters of the comparative shapes to be identified. Advantageously, a shape which corresponds to the comparative shape is detected in the image or in the edge image derived therefrom when the relative location parameters for the selected identified line sections deviate from the relative location parameters of the comparative shape by a predefined maximum permissible deviation at the most.

The corresponding concept therefore enables identifying, from a comparatively large number of straight line sections identified overall, such straight line sections which define a contour of a traffic sign in that individual combinations (advantageously a predefined number of straight line sections) are selected. The decision as to whether selected straight line sections describe an outline of a traffic sign is made, for example, with the aid of ratios of the lengths of the line sections and/or with the aid of angles between the line sections (i.e. by means of relative location parameters).

In an advantageous embodiment, the pattern identifier is implemented to identify, on the basis of the edge shape, an image pattern, which fills up the shape detected, or the rim of which is determined by the shape detected, by comparing it with at least one comparative image pattern. In other words, the pattern identifier compares the image pattern in the image section specified by the shape detector with a comparative image pattern, e.g. an image of a known traffic sign. Any information about any similarity between the image pattern in the image section and the comparative image pattern may then be used as a reliable criterion indicating whether or not the traffic sign defined by the comparative image pattern is depicted in the image section.

In a further advantageous embodiment, the pattern identifier is implemented to select a section of the image which corresponds to the shape detected, and to adapt, by means of mapping, the section of the image and a comparative image pattern to each other with regard to a size and/or a shape and/or a location. In this manner, one achieves that detection of a traffic sign becomes independent of the relative location, distance, rotation or slope of the traffic sign to be identified in relation to the motor vehicle from which the image is being taken. Specifically, if the shape of the image section is known, it may easily be determined how the image section may be mapped (e.g. in a distorted, rotated or enlarged manner) for the image section to match the comparative image pattern at least in terms of its outer shape. Alternatively, the comparative pattern may naturally also be mapped such that it corresponds to the identified image section in terms of its outer border.

In a further advantageous embodiment, the Hough transformer is further implemented to identify bent circular segments or elliptical segments, i.e. circular arc segments (i.e. sections of a circle line, also referred to as circular segment or circular arc below) or elliptical arc segments (i.e. sections from an elliptical line, also referred to as elliptical segment or elliptical arc below), in the image or in the edge image derived therefrom. In this case, the device advantageously comprises an ellipse detector implemented to detect, on the basis of identified curved circular segments or elliptical segments, a location of an ellipse in the image or in the edge image derived therefrom.

An additional functionality of detecting ellipses is particularly advantageous since a plurality of traffic signs comprise round shapes. Due to perspective distortions, said round shape typically leads to oval or elliptical shapes of the traffic signs, which are actually circular, in the camera image. Therefore, utilization of an ellipse detector leads to a particularly reliable detection of traffic signs, even if they are tilted or exhibit other perspective distortions relative to the vehicle from which the image is being taken. Detection of the ellipses on the basis of information provided by a Hough transformer entails the advantages which have already been described above, namely that detection is still ensured even if the outlines of the traffic signs are partly occluded or shadowed. In particular, a Hough transformer is especially insensitive toward such disturbances of an image. In addition, it shall be noted that due to utilization of a Hough transform for detecting both circles and ellipses, a particularly efficient algorithm exists, since due to utilization of a Hough transform, no explicit distinction needs to be made between detection of circles or ellipses. This is due to the fact that by means of a Hough transform, it is advantageously extreme points of the ellipses that are identified at which the ellipses may be approximated by circular arc segments.

The present invention further provides a method of identifying traffic signs in an image. The corresponding method realizes the functionality of the above-described device and therefore has the same advantages over conventional methods.

The present invention further provides a computer program for performing the method mentioned.

Other features, elements, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which:

FIG. 4b shows a graphical representation of three exemplary reference curves for utilization in an inventive pattern detection means;

FIG. 13a shows a schematic illustration of a crossroads comprising a traffic sign;

FIG. 13b shows a schematic illustration of a first set of three selected straight line sections;

FIG. 13c shows a schematic illustration of a second set of selected line sections;

FIG. 13d shows a schematic illustration of a third set of selected line sections;

FIG. 20b shows a graphical representation of an edge image belonging to the image in accordance with FIG. 20a;

FIG. 25a shows a graphical representation of an edge image of a traffic sign along with a marking of a detected ellipse;

FIG. 25b shows an edge image of a traffic sign;

FIG. 29 shows a block diagram of an inventive device for detecting characters in an image in accordance with an embodiment of the present invention;

FIG. 32a shows a graphical representation of a character "a" within a line system consisting of a lower line, a base line, a center line and an upper line;

FIG. 32b shows a representation of an exemplary description of a character;

FIG. 32c shows a representation of an exemplary description of the character "a" shown in FIG. 32a;

DETAILED DESCRIPTION OF THE INVENTION

Figure 10:
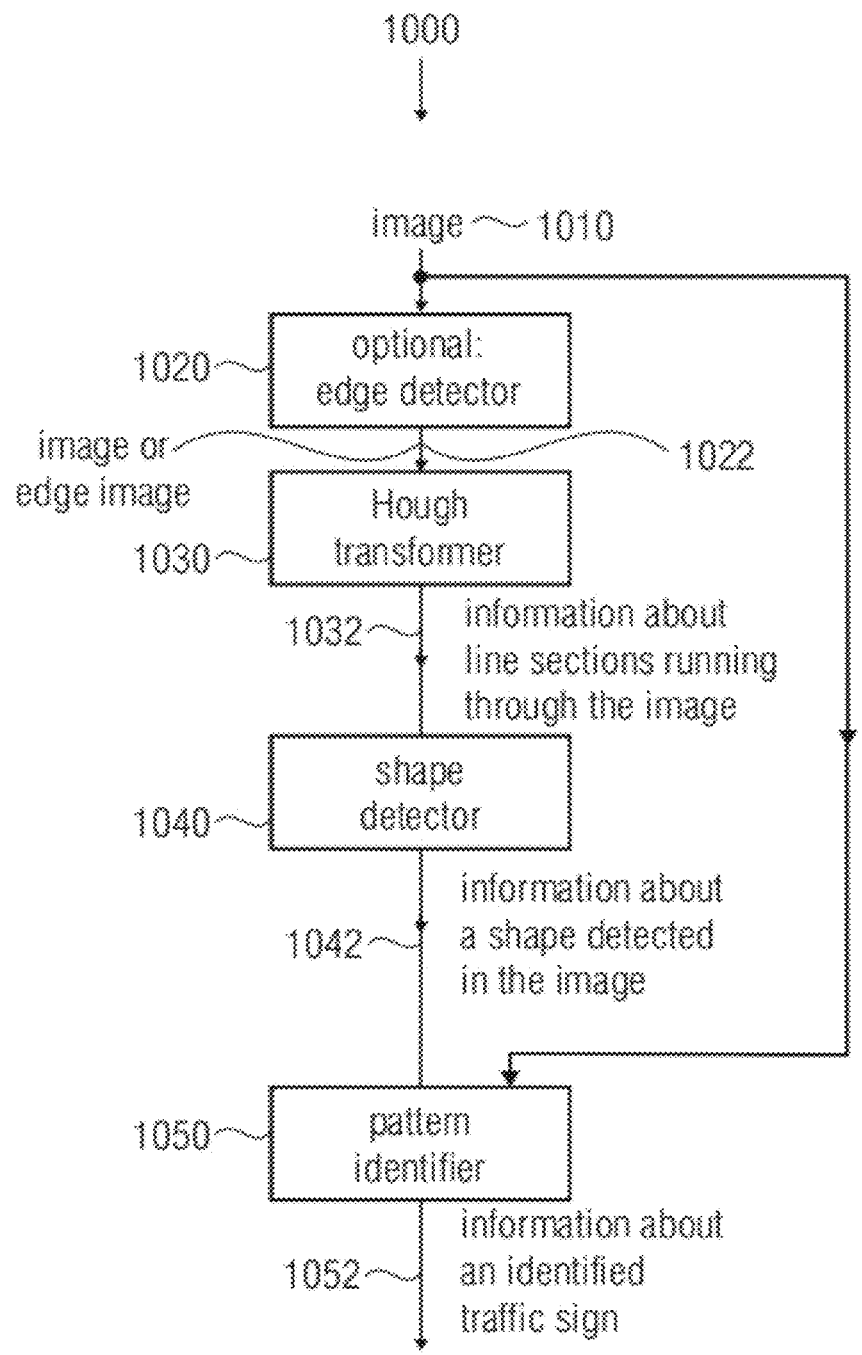
FIG. 10 shows a block diagram of an inventive device for identifying a traffic sign in an image in accordance with an embodiment of the present invention.

FIG. 10 shows a block diagram of an inventive device for identifying a traffic sign in an image in accordance with an embodiment of the present invention. The device of FIG. 10 is designated by 1000 in its entirety. The device 1000 is implemented to receive an image 1010. The device 1000 further optionally comprises an edge detector 1020. The edge detector 1020 is implemented to receive the image 1010 and to produce an edge image 1022 from the image 1010. The device 1000 further comprises a Hough transformer 1030. The Hough transformer 1030 is implemented to receive the edge image 1022. In the event that the edge detector 1020 is dispensed with, the Hough transformer 1030 is implemented to receive the image 1010 directly. In addition, it is to be stated that the Hough transformer 1030 is implemented to identify, in the image or in an edge image derived therefrom, a plurality of line sections running through the image in different directions. Therefore, the Hough transformer provides information 1032 on straight line sections running through the image to a shape detector 1040. The shape detector 1040 is implemented to identify, on the basis of the information about the identified line sections, a predefined shape in the image 1010 or in the edge image 1022 derived therefrom. The shape detector 1040 provides information 1042 on a shape detected in the image.

The device 1000 further comprises a pattern identifier 1050 implemented to receive the information 1042 on a shape detected in the image, as well as the image 1010. The pattern identifier 1050 is further implemented to select, on the basis of the detected predefined shape, an image section which corresponds to the detected predefined shape, and to identify a traffic sign on the basis of the image section selected. Thus, the pattern identifier 1050 provides information 1052 on a traffic sign identified in the image or in the image section.

On the basis of the above structural description, the mode of operation of the device 1000 will be described below.

The device 1000 implements multi-stage identification of a traffic sign in an image. This comprises initially evaluating the shape of an outer border of the traffic sign. The Hough transformer 1030 extracts from the image 1010, or from the edge image 1022, information about straight line sections or lines which define, for example, rims of traffic signs. On account of the plurality or multitude of straight line sections which are identified in the image 1010 or in the edge image 1022 by the Hough transformer 1030, such lines or straight line sections which together define a shape which corresponds to a predefined shape of a traffic sign (e.g. triangle, rectangle or square) are then identified by the shape detector 1040. Thus, all in all, a shape corresponding to a traffic sign is identified in the image. The information about the shape detected in the image or edge image is then supplied to the pattern identifier. The information about a shape detected in the image thus defines a section of the image whose rim has a shape which corresponds to a traffic sign. Thus, an image section which potentially contains a traffic sign is identified, provided that the image content corresponds to the depiction of a traffic sign. Thus, the pattern identifier processes only such image sections whose rims have the shape of a traffic sign (i.e. whose rims have the shape of a triangle, a rectangle or a square, for example). Thus, the pattern identifier 1050 is relieved of the task of searching the entire image for traffic signs, since in accordance with a core idea of the present invention, a traffic sign can only be present within a shape identified or detected by the shape detector 1040. Application of an image comparison to the shape detected by the shape detector 1040 may be implemented substantially more easily than an image comparison with the entire image, since when performing an image comparison with the entire image, a comparative image may be shifted, e.g., across the entire image. In addition, utilization of the shape detector 1040 also enables production of as complete a match as possible between the shape detected in the image and a known shape of a traffic sign, for example by means of mapping, as will be described below.

In summary, it may therefore be stated that as compared to conventional devices, device 1000 enables considerably more reliable detection of a traffic sign, since, on the one hand, any disturbances in the image, for example partial occlusion of traffic signs, may be effectively offset by utilization of the Hough transformer 1030, and since, on the other hand, any computing expenditure may be drastically minimized by the two-stage approach utilizing a shape detector 1040 and a pattern identifier 1050.

Figure 11A:
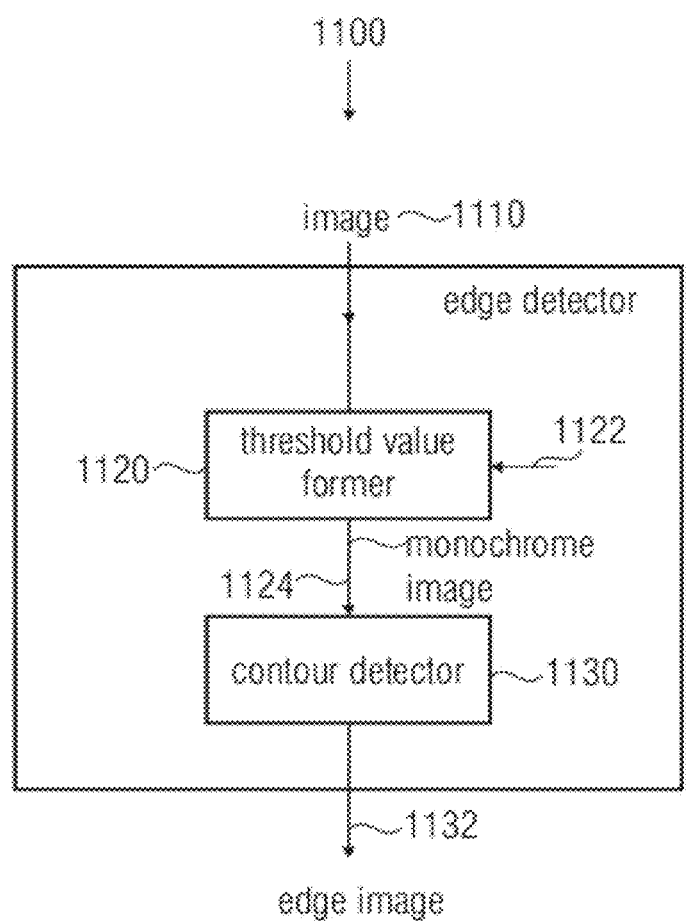
FIG. 11a shows a block diagram of an edge detector for utilization in the inventive device for identifying a traffic sign in an image.

FIG. 11a shows a block diagram of an inventive edge detector for utilization in conjunction with the device 1000 for identifying a traffic sign in an image.

The edge detector of FIG. 11a is designated by 1100 in its entirety. The edge detector 1100 is implemented to receive an image 1010. The edge detector 1100 comprises a threshold value generator 1120 implemented to apply a threshold value to the image. For this purpose, the image 1010, which is present as a color image, for example, is converted to a brightness image. In other words, a gray-level image is produced from a color image unless the image 1010 is already present as a gray-level image. The threshold value generator 1120 is implemented to perform, for example, a binarization of a gray-level image which is based on the image 1010 (or, alternatively, of a color image which is based on the image 1010). To this end, the threshold value generator 1120 advantageously receives a threshold value 1122 and applies same to the gray-level image or color image derived from the image 1010. Thus, the threshold value-former 1120 provides a monochrome image 1124 which is based on the image 1010. In accordance with an embodiment of the present invention, the binarization performed by the threshold value generator 1120 may be adaptive. For example, the binarization may be adapted in accordance with a histogram distribution of gray levels in a gray-level image derived from the image 1010. Thus, the threshold value may be employed adaptively and in response to the histogram distribution of the gray levels.

If the edge detector 1100 or the threshold value generator 1120 receives a video, i.e. a sequence of images 1010, it is advantageous to repeatedly (e.g. regularly) readjust the threshold value 1122. In this manner, it is possible to readjust the threshold value after a predefined number of x image frames of the video. Alternatively, it is also possible to determine an optimum threshold or threshold value 1120 for each image. Such image processing is described by Jahne, for example.

The edge detector 1100 of FIG. 11 advantageously further comprises a contour detector 1130. The contour detector 1130 is implemented to receive the monochrome image 1124 and to create an edge image 1132 from the monochrome image 1124 while using an edge detection algorithm. Thus, the contour detector 1130 is implemented to find a contour, or an edge, in the monochrome image 1124. The edge finder algorithm, or contour finder algorithm, employed in this context is composed of morphological operators, for example. In other words, the monochrome image 1124 is processed by one or more morphological operators, so that the edge image 1132 results. In summary, one may therefore state that the contour detector 1130 produces the edge image 1132 from the monochrome image 1142 while using an edge detection algorithm.

Figure 11B:
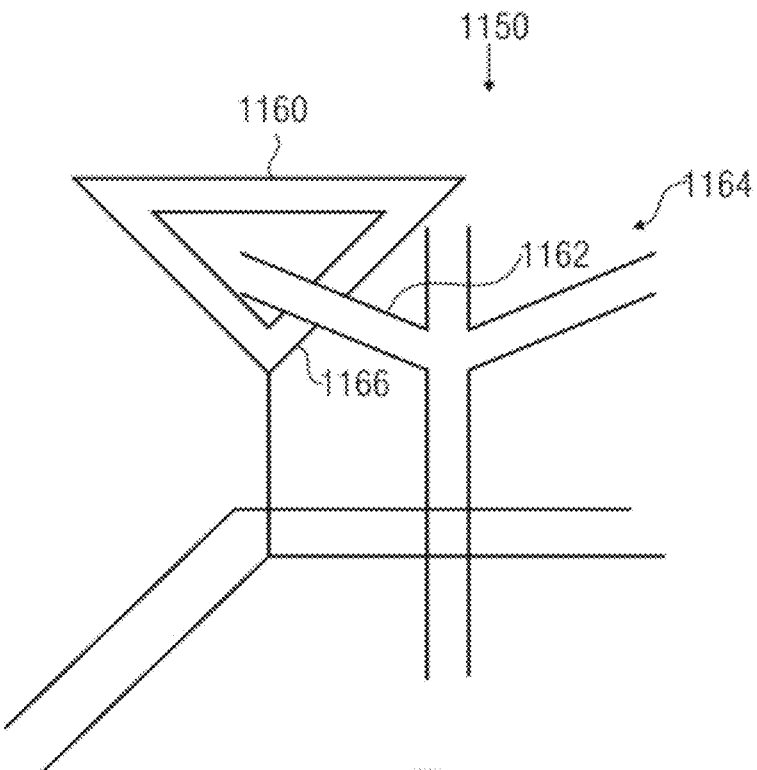
FIG. 11b shows a schematic illustration of an image of a partially occluded traffic sign.
Figure 11C:
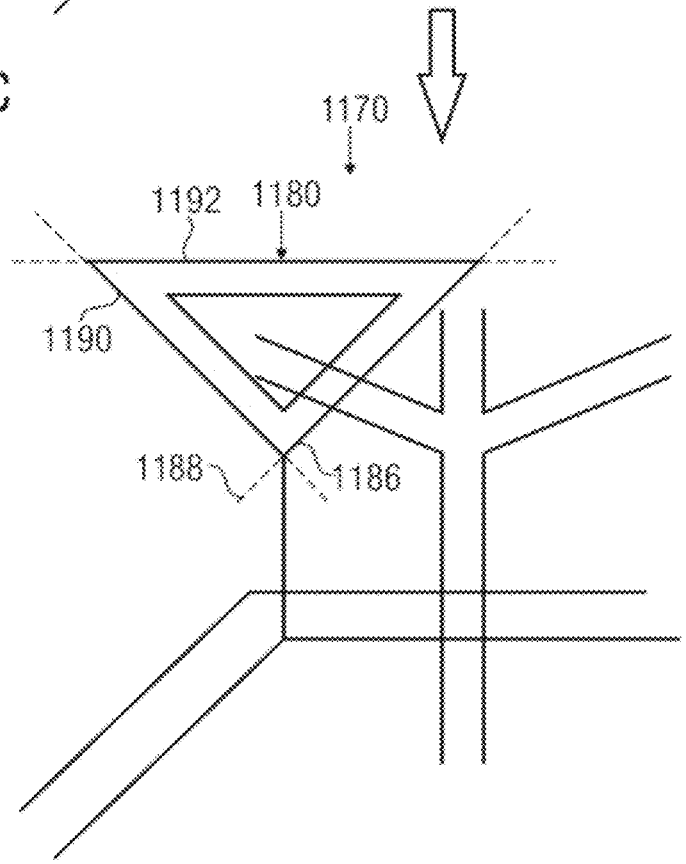
FIG. 11c shows a graphical representation of the image processed by a Hough transform in accordance with FIG. 11b.

The advantages resulting from utilizing the Hough transformer 1030 in the device 1000 will be explained below by means of the graphical representations of FIGS. 11*b* and 11*c*. For example, FIG. 11*b* shows a graphical representation of an image, or edge image, wherein part of a traffic sign is partly occluded, for example by a tree. The graphical representation of FIG. 11*b* is designated by 1150 in its entirety. FIG. 11*c* further shows a graphical representation of information produced from the edge image 1150 of FIG. 11*b* by the Hough transformer 1030. The graphical representation of FIG. 11*c* is designated by 1170 in its entirety.

The edge image 1150 of FIG. 11 shows a representation of a crossroads or junction comprising a traffic sign 1160 which is partly occluded by a branch 1162 of a tree 1164. Thus, the triangular shape of the traffic sign 1160 is interrupted. This may be clearly seen, in particular, at a bottom right edge 1066 of the traffic sign 1160.

The graphical representation 1170 of FIG. 11*c* shows the information produced from the edge image 1150 of FIG. 11*b* by means of the Hough transformer 1030. The Hough transformer 1030 is able to detect and describe straight line sections which run through the edge image 1150 at various angles. This is also true if a straight line section is interrupted, as is the case with the bottom right edge 1166 of the traffic sign 1160. This ability of the Hough transformer 1030 is due to the fact that the Hough transformer 1030 detects a straight line section for example when at least one predefined minimum number of edge points is located along a straight line. In this context, it is irrelevant at first whether the Hough transformer precisely detects the lengths of the edges (e.g. of the edge 1166).

However, it shall be noted that a straight line section typically comprises at least a predefined minimum length in order to be detected by the Hough transformer 1030.

In addition it shall be noted that a Hough transformer 1030 implemented to detect straight line sections will determine, for example, a number of points located on a predefined straight line or straight line section, and will decide, on the basis of the determined number of points located on the straight line or line section, whether or not an edge is present along the straight line or line section.

For example, the Hough transformer 1030 performs the above-mentioned operation for straight line sections or straight lines of different directions and/or lengths and is therefore able to determine straight line sections or straight lines of different lengths and/or of different directions. The Hough transformer 1030 advantageously describes the respective identified straight line sections by means of parameters which indicate, e.g., the lengths and/or directions and/or starting points and/or end points of the line sections identified.

Thus, the Hough transformer 1030 detects, for example, the bottom right edge 1166 of the traffic sign 1160, which is shown in the graphical representation 1150, as a continuous edge. Depending on the implementation of the Hough transformer 1030, the Hough transformer 1030 in this context may determine a precise length of the edge 1166, or may indicate the length only approximately. However, in each case the Hough transformer 1030 is able to identify the direction of the edge 1166 and further to describe a straight line on which the edge 1166 is located. Thus, the information 1032 provided by the Hough transformer 1030 describes, for example, the bottom right edge 1186, which is shown in the graphical representation 1170 of FIG. 1*c*, of the traffic sign 1180 as a continuous line. Whether or not the precise starting points and end points of the line 1186 are known depends on details in the implementation of the Hough transformer 1030, as was already explained. However, it is ensured, that the Hough transformer will detect that the edge runs along a straight line 1188, which in the graphical representation 1070 is shown as a broken line.

In summary, one may therefore state that partial occlusion of the edge 1166 is undone by the Hough transformer 1030, and that, therefore, the rim of the traffic sign 1160 is advantageously described by three continuous lines 1186, 1190, 1192.

Figure 12:
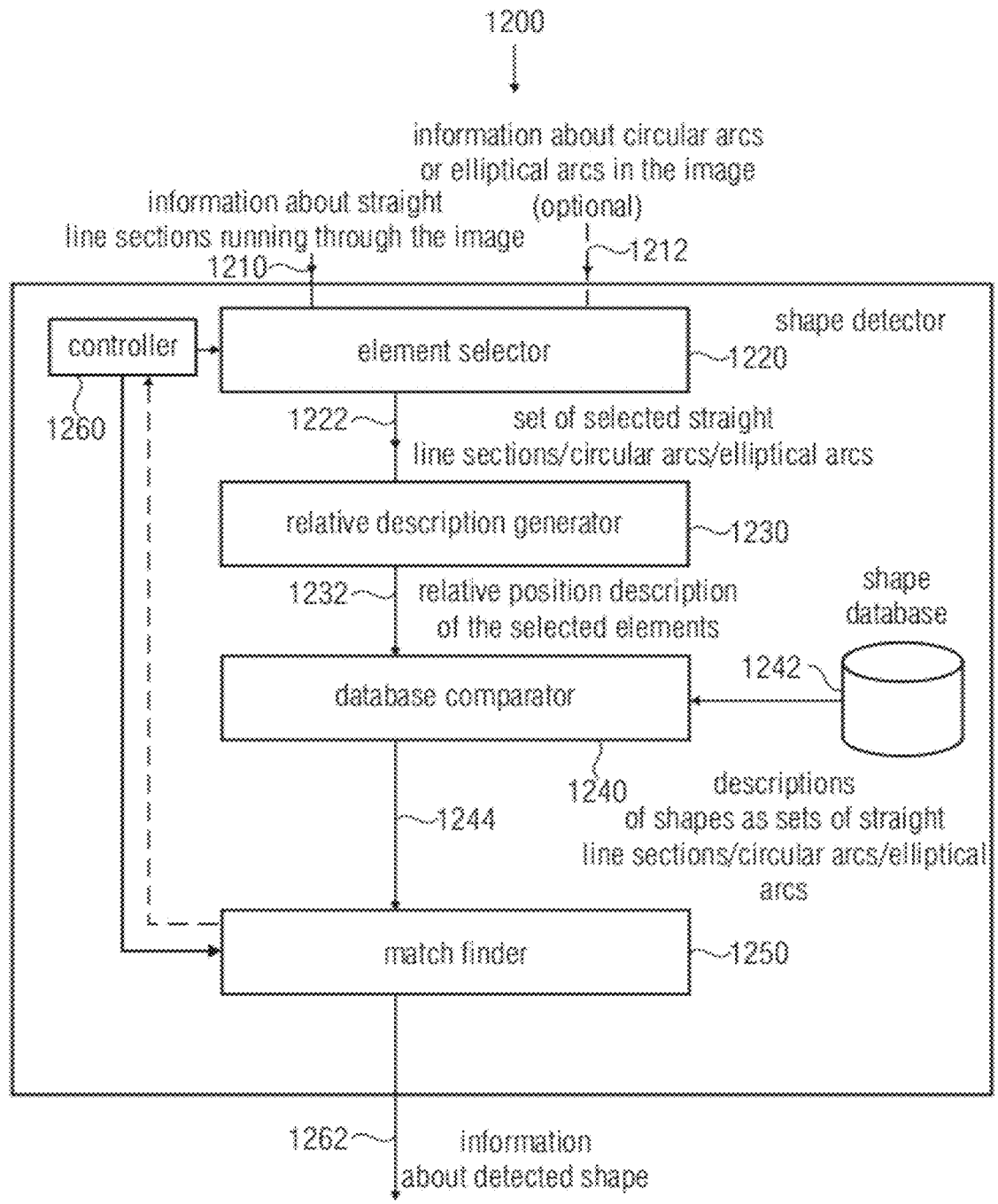
FIG. 12 shows a block diagram of an inventive shape detector for utilization in an inventive device for identifying a traffic sign in accordance with an embodiment of the present invention.

With reference to FIG. 12, a description will be given below as to how a shape may be detected on the basis of the information, provided by the Hough transformer 1030, on straight line sections running through the image (i.e. for example, on the basis of information about the straight line sections 1186, 1190, 1192).

To this end, FIG. 12 shows a block diagram of an inventive shape detector as may be employed, for example in the device 1000 of FIG. 10. The shape detector of FIG. 12 is designated by 1200 in its entirety.

The shape detector 1200 is implemented to receive information 1210 on the straight line sections running through the image, said information being provided by the Hough transformer 1030, for example. The information 1210 comprises, for example, information about a direction, on a starting point, on an end point, on a length and/or on a direction of straight line sections detected in the image 1010 or in the edge image 1022 by the Hough transformer 1030.

Optionally, the shape detector 1200 is further implemented to receive information about circular arc segments or elliptical arc segments in the image 1010 or in the edge image 1022. The respective information is designated by 1212.

The shape detector 1200 comprises an element selector 1220 implemented to receive the information 1210 and, optionally, the information 1212. The element selector 1220 is implemented to select a plurality of elements from the straight line sections described by the information 1210 and/or the information 1212, and also, possibly, from additional circular arcs and elliptical arcs. In other words, in an advantageous embodiment the element selector 1220 is implemented to select a predefined number of straight line sections from the straight line sections described by the information 1210 so as to thereby obtain selected straight line sections. The element selector 1220 advantageously may further be implemented to select mutually adjacent line sections (and possibly additionally circular arcs or elliptical arcs). Thus, the element selector 1220 is advantageously implemented to select straight line sections (and possibly additionally circular arcs or elliptical arcs) which together form a continued course of line (it being possible to disregard minor interruptions between the successive straight line sections (and possibly additionally circular arcs or elliptical arcs)).

Thus, the element selector 1220 provides a set of selected elements, i.e. of selected straight line sections and possibly additionally of circular arcs or elliptical arcs. The description of the set of selected elements is designated by 1222. A relative description generator 1230 receives the information 1222 and is further implemented to produce a relative position description 1232 of the selected elements on the basis of the information 1222. The relative position description 1232 describes mutual relative positions of the selected elements or of intersection points of the selected elements. For example, the relative position description 1232 may comprise a description of lengths and directions of the elements from the set of selected elements. In addition, the relative position description 1232 may describe angles between straight line sections of the set 1222 of selected straight line sections. Alternatively or additionally, the relative position description may describe relative lengths of the selected straight line sections. If the elements selected additionally comprise circular arcs or elliptical arcs, the relative position description may also comprise, for example, information about curvature radii or angles of the circular arcs or elliptical arcs.

The shape detector 1200 further comprises a database comparator 1240 implemented to receive the relative position description 1232. The database comparator 1240 is further coupled to a shape database 1242 to receive from the shape database 1242 descriptions of shapes as description sets of straight line sections, circular arcs and/or elliptical arcs (for example in a relative position description). The database comparator 1240 is further implemented to provide comparative information 1244 describing a deviation between the elements described by the relative position description 1232 and a set of reference elements read out from the shape database 1242.

The shape detector 1200 further comprises a match finder 1250 implemented to receive the result 1244 of the database comparator 1240 and to decide whether the match between the set of elements described by the relative position description 1232 and the set of elements obtained from the shape database 1242 is sufficient.

The shape detector 1200 advantageously further comprises a controller 1260 implemented to cooperate with the element selector 1220 and the match finder 1250. For example, the controller 1260 is implemented to control the element selector 1220 to select different sets of selected elements. In addition, the controller 1260 is advantageously implemented to provide the match finder 1250 with information about which elements have been selected by the element selector 1220. The match finder 1250 advantageously provides, to the controller 1260, information as to the degree of the match between the relative position description 1232 and a description, contained in the shape database 1242, of the shape, or comparative shape.

In addition, the match finder 1250 is implemented to provide information 1262 on a detected shape. The information 1262 on the shape detected describes, for example, a location of the detected shape and a type (e.g. triangle, rectangle, square) of the detected shape.

On the basis of the above structural description, the mode of operation of the shape detector 1200 will be described below, which mode of operation may incidentally be implemented with any topology and may therefore be implemented, for example, independently of the topology of the shape detector 1200 described by means of FIG. 12. References to individual means or block of the shape detector 1200 are therefore to be regarded as examples.

For further illustration, reference shall also be made to FIGS. 13*a*, 13*b*, 13*c*, 13*d*, 14*a*, and 14*b*. FIG. 13*a* shows a graphical representation of a crossroads comprising a traffic sign. FIG. 13*b* shows a graphical representation of the first set of three straight line sections, FIG. 13*c* shows a graphical representation of a second set of three straight line sections, and FIG. 13*d* shows a graphical representation of a third set of three straight line sections. The straight line sections of the three sets of straight line sections of FIGS. 13*b*, 13*c* and 13*d* have incidentally been taken from the graphical representation of FIG. 13*a*.

Figure 14A:
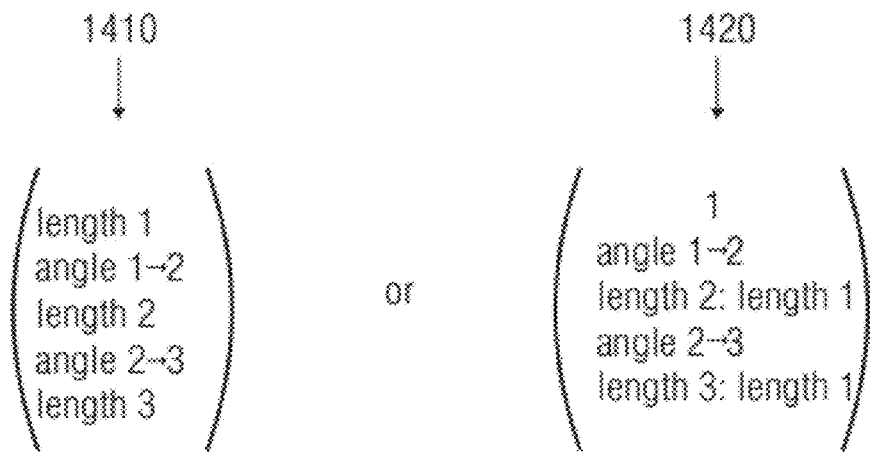
FIG. 14a shows a schematic illustration of a form of description of a set of three line sections.

In addition, FIG. 14*a* shows a schematic illustration of two possibilities of relative position descriptions of three straight line sections.

Figure 14B:
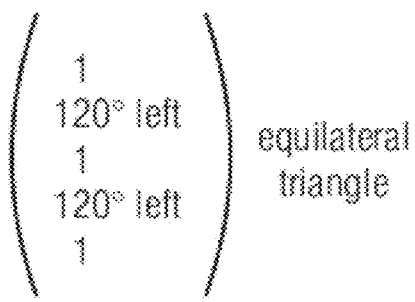
FIG. 14b shows a schematic illustration of a form of description of an equilateral triangle.

FIG. 14*b* shows a schematic illustration of a possible relative position description of an equilateral triangle.

With reference to FIG. 13*a*, it is assumed that for example the Hough transformer 1030 provides a description of an image as a representation of a plurality of straight line sections. The respective description of FIG. 13*a* is designated by 1300 in its entirety. The graphical representation 1300 shows a traffic sign 1310, the outlines of which are defined by a plurality of straight line sections. For example, a pipe which bears the traffic sign is described by a first straight line section 1312. An outline of the essentially triangular traffic sign is described by three straight line sections 1314*a*, 1314*b*, 1314*c*. A roadside is described by a straight line section 1316, for example. The description of the straight line sections 1312, 1314*a*, 1314*b*, 1314*c*, 1316 thus forms the information 1210 on straight line sections running through the image. It is by means of the element selector 1220, for example, that for example three straight line sections (generally: a predefined number of straight line sections or a predefined number of elements) are selected from the straight line sections running through the image of FIG. 13*a* (generally: from the elements detected in the image by the Hough transformer, such as straight lines, circular arcs or elliptical arcs). Advantageously, three mutually adjacent straight line sections (generally: elements) which form a continuous course of line section are selected. For example, if the line sections 1312, 1314*a*, 1314*b* are selected, the set of three straight line sections which is depicted in FIG. 13*b* will result. However, it the straight line sections 1314*a*, 1314*b*, 1316 are selected, the set of three straight line sections which is depicted in FIG. 13*c* will result. However, if the straight line sections 1314*a*, 1314*b*, 1314*c* are selected, the set of three selected line sections which is depicted in FIG. 13*d* will result.

A set of selected straight line sections (generally: of selected elements) may be described by a length of a first selected line section, an angle between the first selected line section and a second selected line section, a length of the second selected line section, an angle between the second selected line section and a third selected line section, and by a length of the third selected line section. A corresponding description is schematicly shown in a first graphical representation 1410 of FIG. 14*a*. Alternatively, the lengths may be indicated in relation to one another or in relation to a length of, e.g., the first selected line section, so that a description results which is shown in the second graphical representation 1420 of FIG. 14*a*.

A corresponding description of an equilateral triangle, which may be stored, for example, as a comparative description in the database 1242, is schematicly shown in FIG. 14b.

With regard to the selected straight line sections corresponding to the first set of selected straight line sections, it is to be established that they may be depicted, for example, in a form "length 1; angle 30 degrees right; length 2; angle 120 degrees left; length 3".

The selected line sections in accordance with the third set of selected line sections may be described, for example, by a description of the form "length 1; angle 120 degrees left; length 2; angle 120 degrees left; length 3".

A normalized description of the selected line sections of the third set of selected line sections (normalization of the length) is as follows:

"1; angle 120 degrees left; 1; angle 120 degrees left; 1".

Of course, the angles and relative lengths may vary slightly, since for example the traffic sign 1310 may be rotated slightly, for example, and may therefore be mapped in a distorted manner, for example, as a result of which relative lengths and angles change.

For example, if a description of an isosceles triangle in accordance with FIG. 14b is stored as a comparative pattern in the shape database 1242, a comparison between a description of the three straight line sections of the first set of selected elements (cf. FIG. 13b), for example, will provide a large-scale deviation, or a small-scale match. Similarly, a comparison between a description of the straight line sections of the second set of straight line sections (cf. FIG. 13c) with a description of an equilateral triangle will provide a small-scale match, or a large-scale deviation. However, a comparison between a description of the three straight line sections of the third set of straight line sections (cf. FIG. 13d) and a description of an equilateral triangle will provide a large-scale match, or a small-scale deviation. Thus, if, for example, the first set of three straight line sections (cf. FIG. 13b) is selected at first, and if subsequently, a comparison with a description of the equilateral triangle from the shape database 1242 reveals that a deviation is inadmissibly large (for example larger than a predefined or dynamically adjusted maximum admissible deviation), a further set of elements or of straight line sections will be selected, for example, e.g. the second set of straight line sections (cf. FIG. 13c). If a deviation between the second set of straight line sections and a comparative shape stored in the shape database 1242 is still inadmissibly large, the third set of selected elements will be selected, for example (cf. FIG. 13d). If, therefore, it is found, for one of the sets of selected elements, that a deviation between the set of selected elements and a shape stored in the shape database 1242 is sufficiently small (i.e. that, for example, relative position descriptions differ by a sufficiently small amount), the corresponding set of selected elements, for example, will be marked as a detected shape, and associated information will be provided (e.g. as information 1262 on a detected shape).

The selection of sets of selected elements may be finished, for example, as soon as a set of selected elements differs by a sufficiently small amount from a set of elements which is defined in the shape database 1242. Alternatively, however, further detected shapes may be searched following the identification of a detected shape, until a termination criterion is met. Thus, the shape detector may provide, e.g., information about precisely one detected shape or information about several detected shapes.

The information 1262 therefore describes the detected shape in any form of description desired. For example, if a triangle is identified, the information 1262 may indicate coordinates of corner points of the triangle in the image 1010 or in the edge image 1022. However, it is also possible to select another form of description, as far as the respective description enables the outlines of the detected shape to be concluded therefrom.

Figure 15:
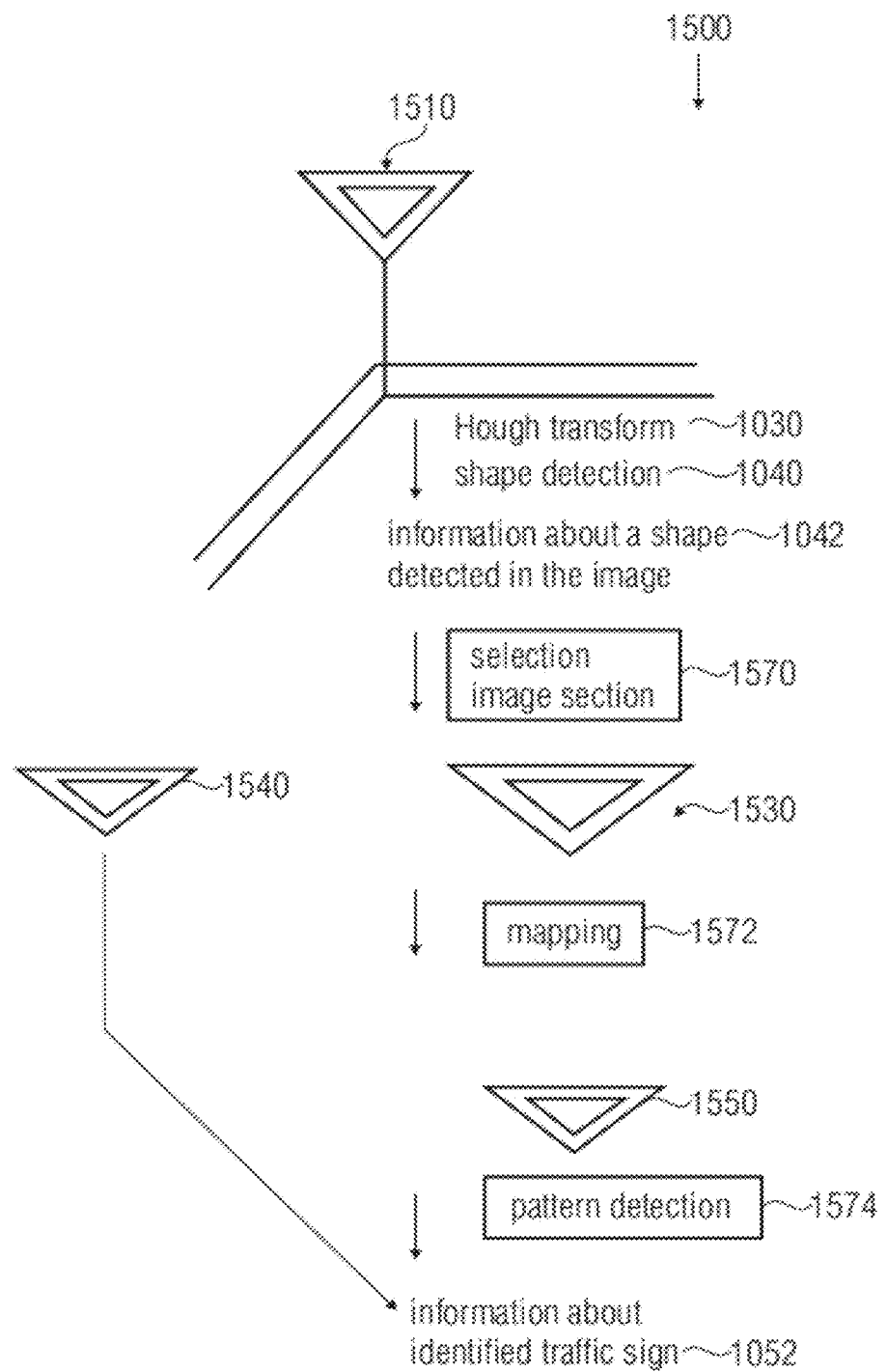
FIG. 15 shows a schematic illustration of a selection of an image section and of mapping of the image section to a predefined shape.

What follows is a description, by means of FIG. 15, as to how pattern identification on the part of the pattern identifier 1050 may be improved in that an image section of the image 1010 is selected using a shape detected by the shape detector 1050, and is further mapped.

Therefore, FIG. 15 shows a schematic illustration of a procedure for identifying a traffic sign. The schematic illustration of FIG. 15 is designated by 1500 in its entirety. An image (for example the image 1010) contains a traffic sign 1510 which is rotated and therefore distorted, for example in relation to the observer. The distortion is indicated in that the traffic sign, which ideally approximately has the shape of an isosceles triangle, is represented in a distorted manner. For illustration purposes, the distortion here is depicted in an exaggerated manner.

In accordance with the invention, edge detection, for example in an edge detector 1020, is optionally applied to the image of the traffic sign. Subsequently, a Hough transform is performed in the Hough transformer 1330 to detect straight line sections in the image. The information 1032 on the straight line sections running through the image is provided to the shape detector 1040 so as to perform a shape detection. In the example shown, the shape detector provides information about a triangle detected in the image. The triangle detected in the image does, indeed, deviate from the ideal shape stored in the pattern database (e.g.: equilateral triangle), but the deviation is so small that on account of a tolerance range employed by the shape detector, the shape detector detects a triangle despite the distortion of the traffic sign 1510. Thus, the shape detector 1040 provides, as the information 1042 on a shape detected in the image, information which describes the position of the triangle in the image, for example by indicating coordinates of the corner points.

Subsequently, the pattern identifier 1050 selects an image section of the image 1010, the selected image section being defined by the information 1042 on the shape detected in the image. For example, the pattern identifier 1050 may be implemented to mask the remaining image located outside the shape identified by the shape detector 1040. Ideally, the pattern identifier 1050 thus obtains an image section whose shape corresponds to the shape identified by the shape detector 1040. In the example shown, the pattern identifier 1050 obtains a triangular image section 1530.

In this respect, it is to be noted that the triangular image section is distorted in relation to the images stored in the image database (e.g. by an affine mapping). An image stored in the image database is designated by 1540, for example. The comparison of the shapes of the image 1540 stored in the image database and the image section 1530 reveals that the shapes are different, so that a direct comparison is not possible or would lead to unreliable results. However, a mapping specification by means of which the reference image, or comparative image, 1540 stored in the image database and the image section 1530 might be made to have identical shapes may be determined from the shapes of the comparative image 1540 stored in the image database and of the image section 1530. For example, if there is an affine distortion of the image section 1530, it may be undone by an opposite affine mapping. For example, the pattern identifier 1050 may be implemented to map the image section 1530 in an affine manner (i.e. to turn it, to rotate it or to extend and/or to distort it), so that the image section 1530 is made to have at least approximately the shape of the reference image, or comparative image, 1540. A version, which is formed or distorted accordingly in an affine manner, of the image section 1530 is designated by 1550 in FIG. 15. Thus, the image section 1550, which is mapped in an affine manner, and the reference image 1540 have the same shapes or outlines, so that particularly reliable pattern detection or pattern comparison may be performed. Therefore, information 1052 on an identified traffic sign may be obtained on the basis of pattern detection.

In summary, it may therefore be stated that the pattern identifier 1050 may perform, for example, on the basis of the information 1052 on a shape detected in the image, a selection 1570 of an image section, mapping 1572 of the image section so as to adapt shapes of the image section and of the comparative image or reference image 1540 to one another, and pattern detection 1574, wherein the mapped image section 1550 is compared to the comparative image or reference image 1540, so as to obtain the information 1052 on the traffic sign identified.

As an alternative to mapping 1572 of the selected image section 1530, the pattern identifier, however, may also map the comparative image or reference image 1540 so as to approximate or adapt the shapes of the selected image section 1530 and of a comparative image or reference image 1540, which is mapped accordingly, to one another.

What follows is a description as to how the concept described with reference to FIGS. 10 to 15 may be further improved in that detection of extreme points of circles or ellipses will take place in addition to the above-described steps.

Figure 16:
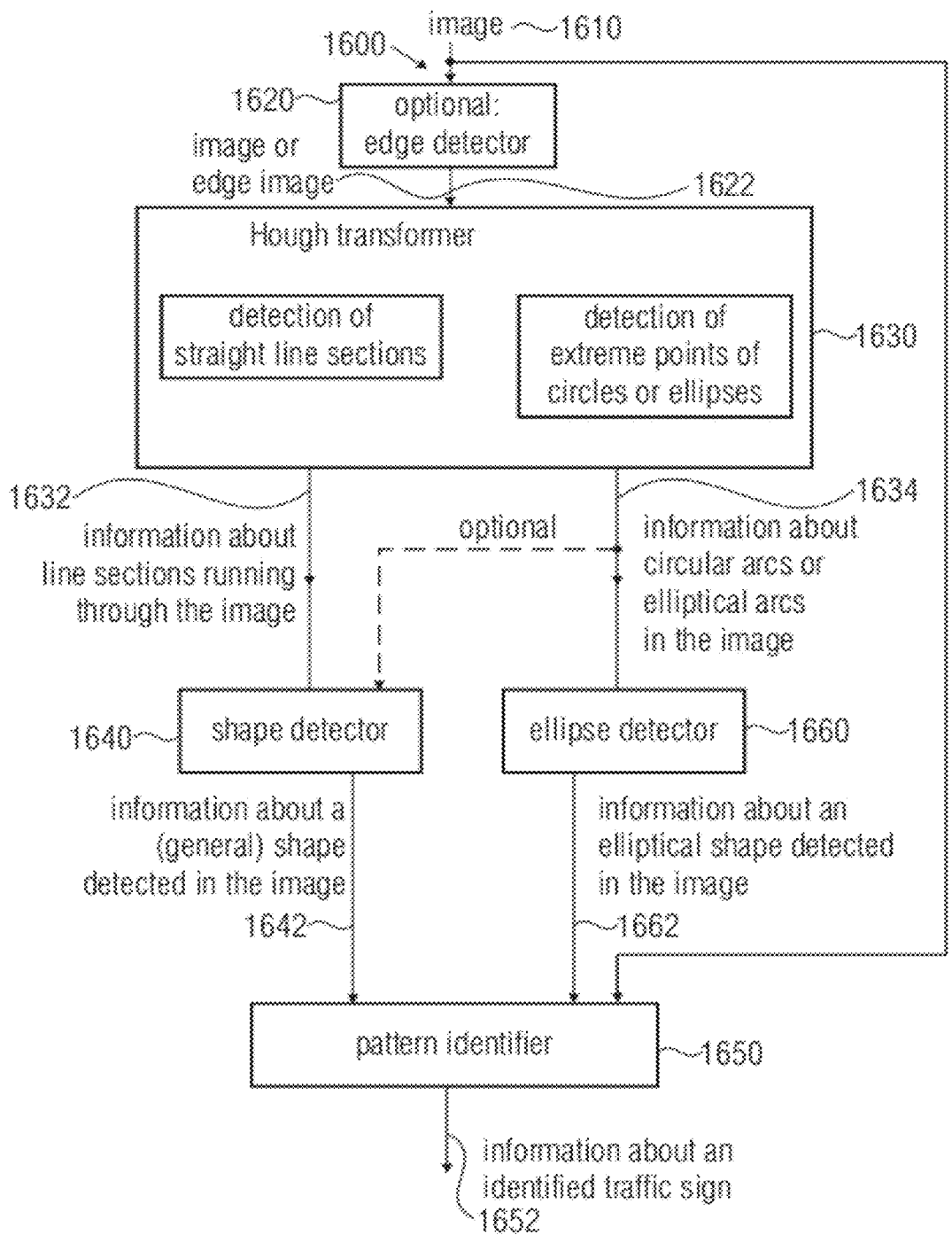
FIG. 16 shows a block diagram of an inventive device for identifying a traffic sign in an image in accordance with an embodiment of the present invention.

To this end, FIG. 16 shows a block diagram of an inventive device for identifying a traffic sign in an image in accordance with an embodiment of the present invention.

The device of FIG. 16 is designated by 1600 in its entirety.

The device 1600 is implemented to receive an image 1610. The device 1600 further optionally comprises an edge detector 1620, which in terms of its function is comparable to the edge detector 1020 of the device 1000. The device 1600 further comprises an upgraded Hough transformer 1630 implemented to receive the image 1610 or the edge image 1622 which is provided by the optional edge detector 1620. The upgraded Hough transformer is implemented to detect straight line sections in the image 1610 or in the edge image 1622, and as far as that goes, it is comparable to the functionality of the Hough transformer 1030. The upgraded Hough transformer 1630 is also capable, in addition, of detecting extreme points of circles or ellipses in the image 1610 or in the edge image 1622, and thus to provide information about extreme points of circular arcs or elliptical arcs in the image. The respective information is designated by 1634. Of course, the upgraded Hough transformer 1630 is additionally implemented to provide information 1632 on straight line sections running through the image 1610 or through the edge image 1622, said information 1632 essentially being comparable to the information 1032 of the Hough transformer 1030.

The device 1600 further comprises a shape detector 1640, which receives the information 1632 on the line sections running through the image from the Hough transformer 1630. The shape detector 1640 may be identical with the shape detector 1040 of the device 1000. Alternatively, the shape detector 1620 may be implemented to receive the information 1634 on any circular arcs or elliptical arcs present in the image in addition to the information 1632 on the straight line sections running through the image.

Therefore, the shape detector 1640 in any case provides information 1642 on a shape detected in the image to a pattern identifier 1650, provided that a shape is detected in the image on the basis of the information 1632 (and possibly of the information 1634). The fundamental functionality of the pattern identifier 1650 comprises the functionality of the pattern identifier 1050, however, it is optionally upgraded as compared to same, as will be described below.

The device 1600 additionally comprises the ellipse detector 1660. The ellipse detector 1660 receives the information 1634 on circular arcs or elliptical arcs in the image, advantageously in the form of a description of coordinates of extreme points and additionally, optionally, of associated curvature radii and directions of curvature.

The function of the ellipse detector 1660 will be described in more detail below. The ellipse detector 1660 is generally implemented to provide information about an elliptical shape detected in the image to the pattern identifier 1650.

The pattern identifier 1650 is additionally implemented to provide information 1652 on an identified traffic sign on the basis of the information 1642 on a (general) shape detected in the image, or on the basis of the information 1662, provided by the ellipse detector 1660, on an elliptical shape detected in the image.

With regard to the upgraded shape detector 1640, which is optionally employed if the information 1634 on circular arcs or elliptical arcs in the image is to be used by the shape detector 1640, it is to be stated that the upgraded shape detector 1640 advantageously is implemented to select, as the set 1222 of selected elements, a set of elements which includes both straight line sections, on the one hand, and circular arcs or elliptical arcs, on the other hand.

For example, the shape detector 1640 for identifying an approximately triangular traffic sign having rounded corners is advantageously implemented to select three straight lines and three circular arcs or elliptical arcs from the information provided by the Hough transformer, so that straight line sections and circular arcs alternate and form a closed course of line. A description of an ideal, isosceles-triangular traffic sign having rounded edges may then be as follows, for example: "straight line section, length 1; circular arc 120°, curved to the left, curvature radius 0.05; "straight line section, length 1; circular arc 120°, curved to the left, curvature radius 0.05; "straight line section, length 1; circular arc 120°, curved to the left, curvature radius 0.05"

Accordingly, in this case, the shape database 1242 is advantageously implemented to describe comparative shapes by combining straight line sections and circular arcs or elliptical arcs. In turn, a comparison may advantageously be made in that a vector is created which combines the properties of the elements mentioned (straight line sections, circular arcs, elliptical arcs) in a predefined sequence.

A set-up of an ellipse detector 1660 will be described below by way of example. To this end, FIG. 17 shows a block diagram of an inventive ellipse detector for utilization in an inventive device for identifying a traffic sign in an image in accordance with an embodiment of the present invention.

Figure 17:
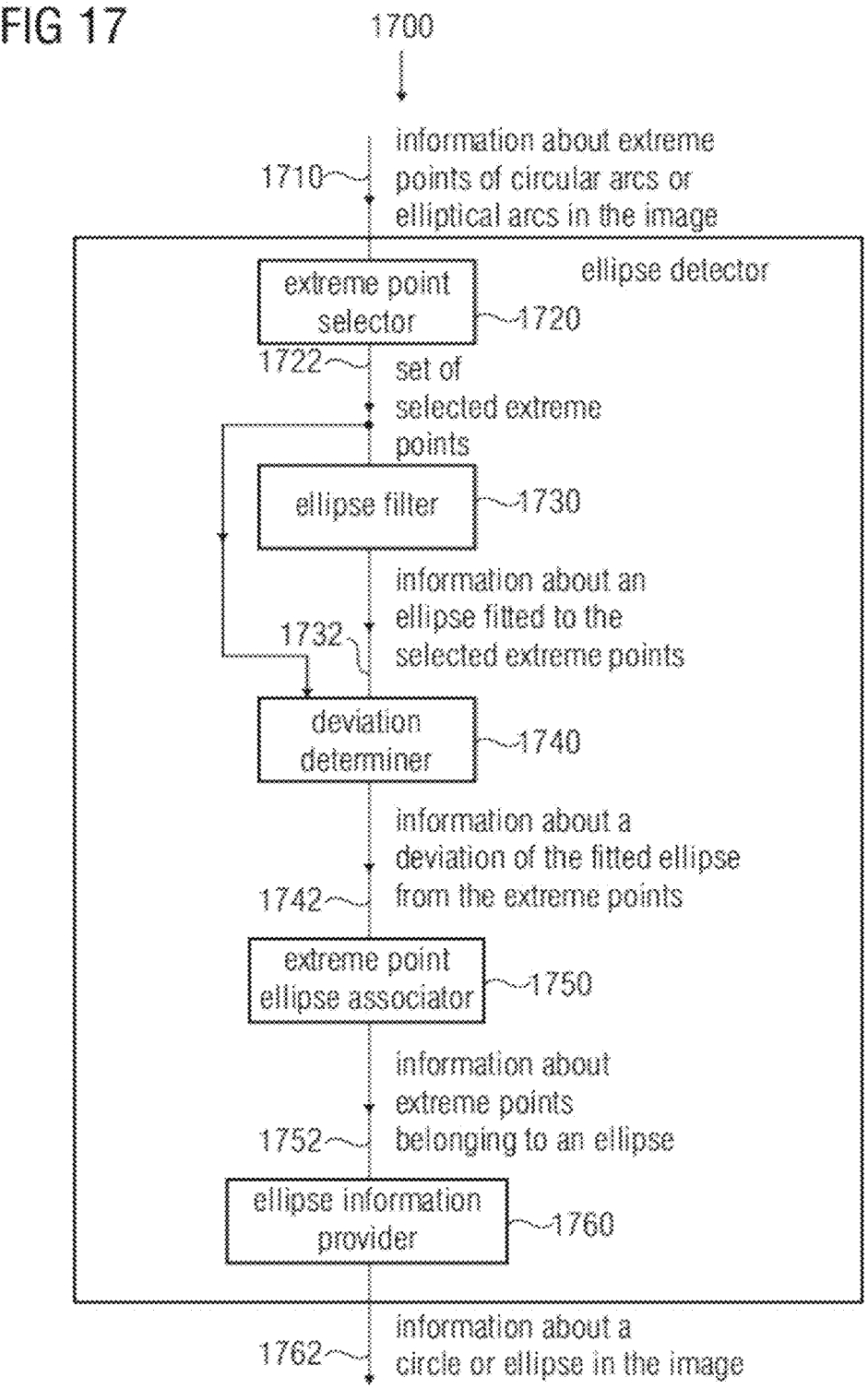
FIG. 17 shows a block diagram of an inventive ellipse detector for utilization in an inventive device for identifying a traffic sign in an image.

The ellipse detector of FIG. 17 is designated by 1700 in its entirety. The ellipse detector 1700 is implemented to receive information 1710 on extreme points of circular arcs or elliptical arcs in the image. The information 1710 may be comparable, for example, to the information 1634 provided by the Hough transformer 1630.

The ellipse detector 1700 further comprises an extreme-point selector 1720, which receives the information about extreme points of circular arcs or elliptical arcs in the image. The extreme-point selector 1720 is implemented to select a set 1722 of selected extreme points from the extreme points provided, overall, by the Hough transformer 1630, and to provide the set 1722 of selected extreme points (or information describing the set of selected extreme points) to an ellipse fitter 1730.

The ellipse fitter 1730 is implemented to provide information about an ellipse fitted to the selected extreme points (of the set 1722 of selected extreme points). The respective information is designated by 1732. A deviation determiner 1740 is implemented to receive the information 1732 and further the information 1722. The deviation determiner 1740 is implemented to determine a deviation between the selected extreme points of a set of selected extreme points and the ellipse fitted to the selected extreme points and to provide, accordingly, information 1742 on the deviation of the fitted ellipse from the extreme points of the set of selected extreme points.

The ellipse detector 1700 further comprises an extreme-point ellipse associator 1750 implemented to perform an association between extreme points and ellipses on the basis of the information about the deviation of the fitted ellipse from the extreme points. In other words, if the information 1710 comprises a description of extreme points which belong to several ellipses, the extreme-point ellipse associator 1750 will provide information 1752 as to which extreme points belong to the same ellipse. Thus, the extreme-point ellipse associator 1750 advantageously provides information which describes or indicates the four extreme points that belong to a single ellipse.

The ellipse detector 1700 further is implemented to provide, on the basis of the information 1752, information 1762 on a circle or an ellipse in the image, the information 1762 comprising at least one location parameter, but advantageously a complete location description, of the ellipse present in the image. Thus, on the basis of information about extreme points of circular arcs or elliptical arcs in the image, the ellipse detector overall makes available location information 1762 for a circle or for an ellipse in the image.

Figure 18:
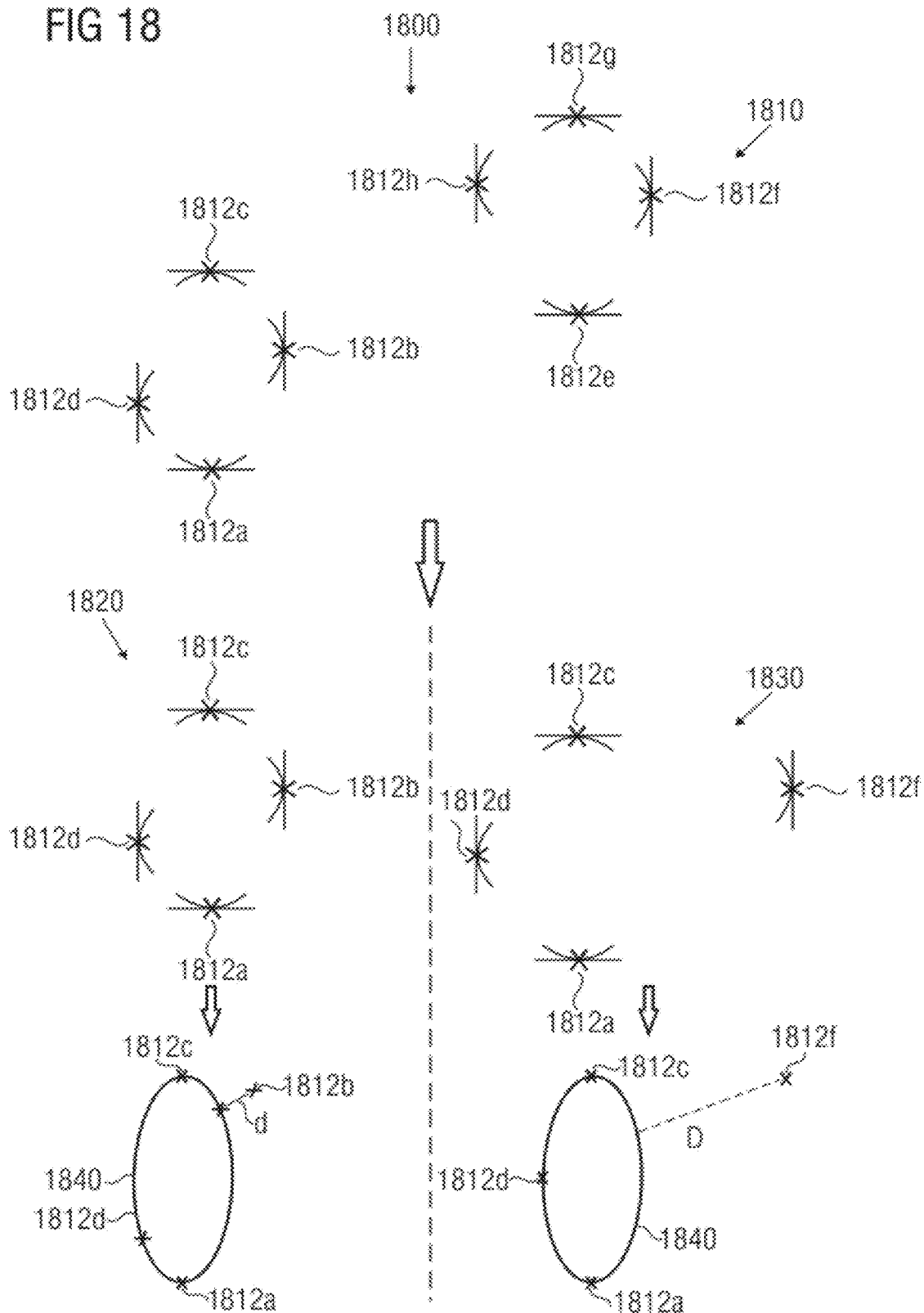
FIG. 18 shows a schematic illustration of a procedure for identifying four points belonging to an ellipse.

With reference to FIG. 18, details will be described below with regard to an approach in terms of associating extreme points with ellipses. In this context, FIG. 18 shows a graphical representation of an approach for identifying extreme points belonging to an ellipse. The graphical representation of FIG. 18 is designated by 1800 in its entirety.

A first graphical representation 1810 shows eight extreme points 1812a to 1812h, which in total belong to two ellipses. A graphical representation 1820 shows a first selection, or a first set, of four ellipse points 1812a, 1812b, 1812c, 1812d. A further graphical representation 1830 shows a selection of four ellipse points 1812a, 1812f, 1812c, 1812d. It is known that three of the points of a set of extreme points are extreme points. Thus, an ellipse may be fitted through the three extreme points (for example, extreme points 1812a, 1812c, 1812d). In this context it shall be noted that extreme points by definition are ellipse points which are located farthest in a first direction, in a direction opposite the first direction, are located farthest in a second direction or are located farthest in a direction opposite the second direction. A fit ellipse through the three extreme points 1812a, 1812c, 1812d is designated by 1840. It is apparent that the point 1812b is very close to the fit ellipse 1840. The deviation d (distance) between the fit ellipse 1840 and the extreme point 1812d incidentally essentially results from numerical errors in calculating the ellipses fit 1840 or from tolerances in determining the coordinates of the extreme points. By contrast, a distance D between the extreme point 1812f and the fit ellipse 1840 is considerably larger than the distance d. Typically, the distance D is larger than a predefined maximum admissible distance, while the distance d is smaller than a predefined admissible distance.

In this context it is to be stated that in an advantageous embodiment the distance between the fit ellipse is determined by three extreme points and a fourth selected extreme point, and is compared with a predefined limiting value. If the distance is smaller than the predefined limiting value, it will be concluded therefrom that the fourth ellipse point belongs to the ellipse. Otherwise it shall be assumed that the fourth ellipse point does not belong to the ellipse through the three further ellipse points.

Thus it may be established, in the example shown, that the extreme points 1812a, 1812b, 1812c, 1812d belong to the same ellipse, whereas the extreme points 1812a, 1812f, 1812c, 1812d do not belong to the same ellipse.

In addition, it shall be noted that the pattern identifier 1650 may be implemented to select the section of the image 1610 in dependence of whether or not a general shape has been detected in the image which is described by the information 1642, or whether or not an elliptical shape has been detected in the image which is described by the information 1662. In other words, the pattern identifier 1650 is implemented to adapt the respective algorithm for selecting the image section and for mapping (e.g. for affine distortion) the image section in dependence on shapes detected in the image (general shape or elliptical shapes).

Figure 19:
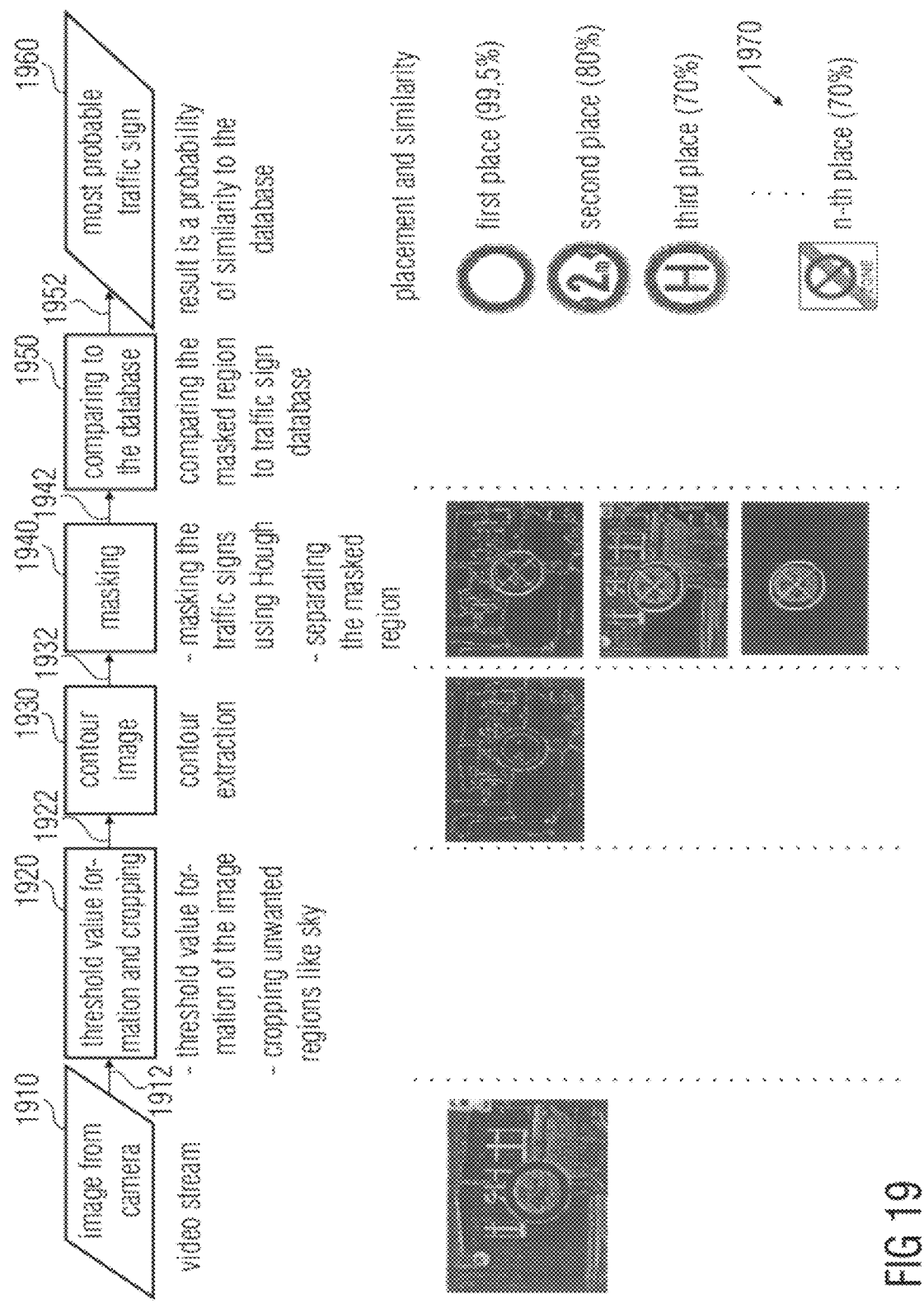
FIG. 19 shows a flow chart of an inventive method of identifying a traffic sign in an image in accordance with an embodiment of the present invention.

FIG. 19 shows a flow chart of an inventive method of identifying a traffic sign in an image in accordance with an embodiment of the present invention. The method of FIG. 19 is designated by 1900 in its entirety. The method 1900 comprises receiving 1900 an image from a camera. However, what is advantageously received from the camera is not just a single image, but a stream of images (also referred to as a video stream).

The method 1900 includes a second step 1920 comprising threshold value formation which is applied to the image, and comprising cropping undesired regions. For example, the sky is removed from the image, so that an amount of information to be processed in total is reduced. The threshold value formation may also be performed in the manner as was already explained further up. In a third step, the method 1900 comprises contour extraction. The contour extraction 1930 comprises producing, or marking, edges or contours in the threshold-value treated image determined by step 1920 on the basis of the camera image 1912. Thus, an edge image or contour image 1932 is formed in step 1930 of the contour extraction. In a subsequent step 1940, traffic signs are masked by means of a Hough transform. In other words, step 1940 comprises detecting e.g. triangular shapes, rectangular shapes, square shapes, round shapes and/or elliptical shapes, and providing information which describes the respective shapes. Subsequently, the areas where the shapes mentioned were detected are masked, so that an image is formed in which e.g. only the image content within a single identified shape exists, whereas an image content in a surrounding of the identified shape is masked out or suppressed. In the advantageous embodiment, the region which is masked accordingly is detached from the image, so as to obtain an image reduced in size, for example, which comprises the image area within the shape detected, only a smaller part of the surrounding of the shape detected being contained than in the original camera image 1912. Thus, a masked region 1942 results from the step 1940 of masking.

A further step 1950 then comprises comparing the masked region with entries of a database or a traffic sign database so as to obtain a traffic sign within the masked region 1942. The comparison 1950 with entries of the database results in information 1952 describing similarities between an image content within the masked region 1952 and various traffic signs stored in the database. The information 1952, which indicates, for example, placement of various traffic signs (in the order of their similarity to the image content of the masked region) and the associated similarity, is designated by 1970. The comparison 1950 with the database thus provides, as a result 1952, a probability of similarity between the image content of the masked region 1942 and traffic signs (or images of traffic signs) in the image database. As a result, information about a most likely traffic sign is formed. The respective information is designated by 1960.

Figure 20A:
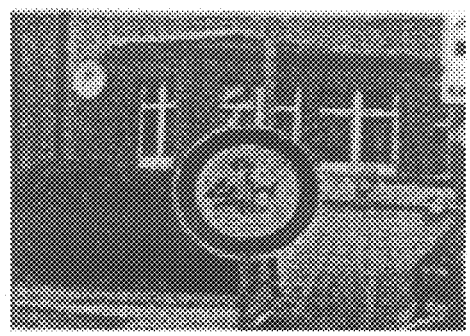
FIG. 20a shows a graphical representation of an image comprising a traffic sign.

Details of the method 1900 of FIG. 19 will be dealt with below. To this end, FIG. 20*a* shows a graphical representation of a camera image comprising a traffic sign. The camera image depicted in FIG. 20*a* is designated by 2000 in its entirety and may be comparable to, e.g., the image 1912 in the method 1900.

Figure 20B:
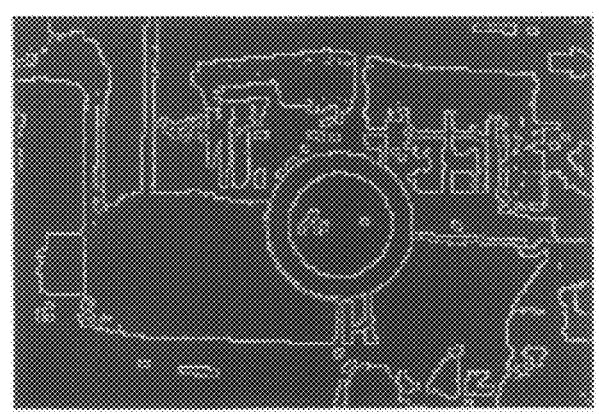

FIG. 20*b* shows a graphical representation of an edge image or contour image as occurs when applying the method 1900 of FIG. 19. The edge image or contour image of FIG. 20 is designated by 2050 in its entirety and essentially corresponds to the contour image 1932.

With regard to the edge image 2050 it is to be noted that the present invention is able to produce stable edge images 1932 from the recorded video stream 1912. In addition, markings which are painted onto the road (e.g. speed limits or warning signs painted onto the road) and confinements of the lane are also taken into account in preparing the edge image. A particular challenge in preparing the edge image is that the edge image is to be independent of the light conditions. Such a challenge may be solved, for example, by automatically setting the threshold value in the threshold value formation 1920. In addition, fast camera movements may also be taken into account.

Figure 21A:
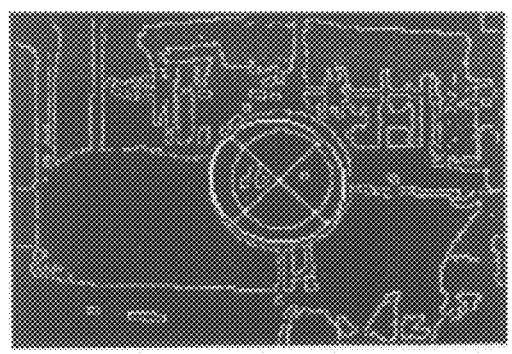
FIG. 21a shows a graphical representation of an edge image which belongs to an image comprising a traffic sign, along with a marking for an ellipse identified.

FIG. 21*a* shows a graphical representation of an edge image having a circular or ellipsoid shape marked therein. The marked edge image of FIG. 21*a* is designated by 2100 in its entirety. A round or elliptical shape may be marked using a Hough transform, for example. Specifically, by using a Hough transform, curves may be found in edge images. In addition, shape detection with round objects is possible.

Figure 21B:
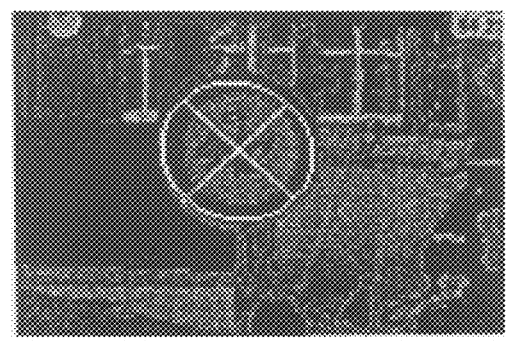
FIG. 21b shows a graphical representation of the image belonging to the edge image in accordance with FIG. 21a, along with a marking of an ellipse.

FIG. 21*b* shows a graphical representation of an image (e.g. of the camera image 1912) having a circular or ellipsoid shape marked therein. The marked camera image of FIG. 21 is designated by 2140 in its entirety. With regard to the marked camera image 2140 it shall be noted that the shapes detected represent those regions of the image which are of interest or relevant.

Figure 21C:
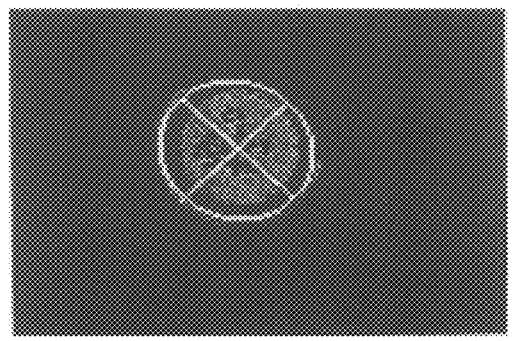
FIG. 21c shows a graphical representation of an ellipsoid section of the image of FIG. 21b.

FIG. 21*c* shows a graphical representation of a masked camera image. The masked camera image of FIG. 21*c* is designated by 2180 in its entirety. In the masked camera image, areas outside the detected circular or ellipsoid shape are suppressed or are set, for example, to black or any other predefined color value. Thus, the detected region or the detected area, which is circular or ellipsoid, for example, is masked. The detected area may thus be masked and possibly separated off in addition. Thus, it is to be stated that the graphical representation 2180 describes, for example, the masked image 1942 resulting from the masking 1940.

Figure 22A:
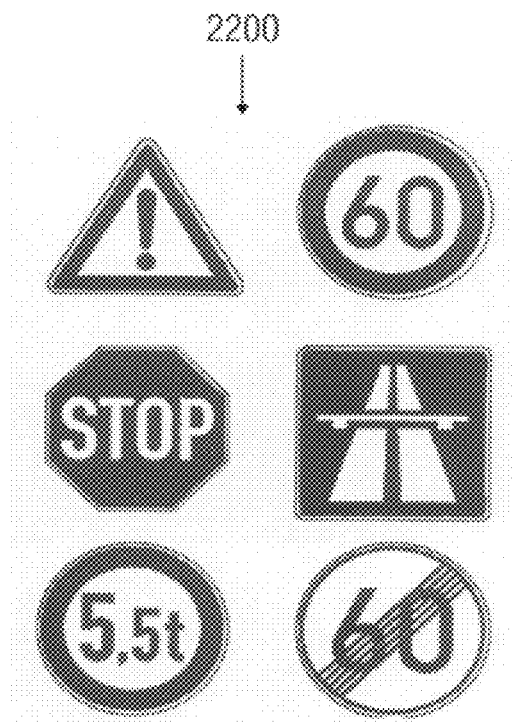
FIG. 22a shows a graphical representation of various traffic signs of traffic sign database.

What follows is a description of how the comparison of the traffic sign database may be performed. To this end, FIG. 22*a* shows a graphical representation of various traffic signs whose images may be stored in the traffic sign database, for example. The traffic sign database may comprise signs having various shapes. Typical shapes of traffic signs are triangular, rectangular, square, round and octagonal (cf. stop sign).

The comparison with the traffic sign database which is performed in step 1950 of the method 1900 may be performed, for example, in that features are extracted from the masked area, and in that the extracted features are compared with features stored in the database.

In an advantageous embodiment, the traffic sign database comprises, for example, color histograms of the traffic signs stored. In this context, the color histograms indicate the mutual relationship in which the individual colors come up in the traffic signs. In this context, a directional dependence of the color distribution may be taken into account, for example, and the color distribution may be weighted in dependence on the position, for example.

Figure 22B:
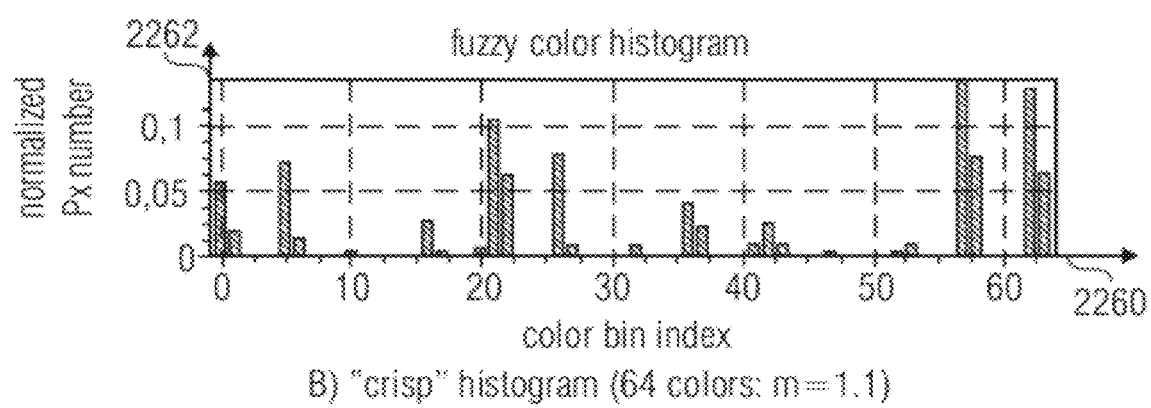
FIG. 22b shows a schematic illustration of a fuzzy color histogram for utilization in pattern detection.

An example of a color histogram is shown in FIGS. 22*b*, the fuzzy color histogram of FIG. 22*b* being designated by 2250 in its entirety. An abscissa 2260 shows a color criteria index describing a color, for example. An ordinate 2262 describes a normalized number of pixels, for example. Thus, the fuzzy color histogram 2250 describes, overall, which relative proportion of an overall image is taken up by color pixels of a specific color.

For example, stored color histograms 2250 enable performing a plurality of comparisons with entries or features in a database, the database comprising the color histograms of the traffic signs stored.

It shall be noted that various methods of feature extraction and feature comparison may be employed for determining a match:

Hough transform for digit detection;
color histograms: color-constant indexing (cf. [1], [2]) or fuzzy color histograms (cf. [3]);
spatial color histograms: spatial chromatic histogram (cf. [1]), spatial fuzzy color histogram (cf. [3]).

Exemplary images of traffic signs will be briefly explained below.

Figure 23A:
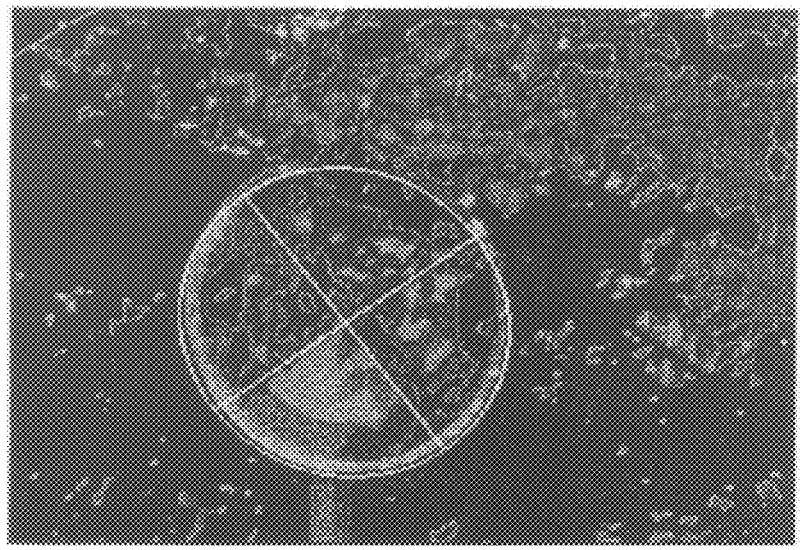
FIG. 23a shows a graphical representation of a threshold value-evaluated image of traffic sign along with a marking of an ellipse.

For example, FIG. 23*a* depicts a graphical representation of a shadowed traffic sign. The graphical representation of FIG. 23*a* takes into account a threshold value formation. However, it is apparent that by means of a Hough transform, a shape or an outline of the traffic sign may be detected and marked despite the shadowing. Detection of the traffic sign is apparent from the circular or ellipsoid marking (white line).

Figure 23B:
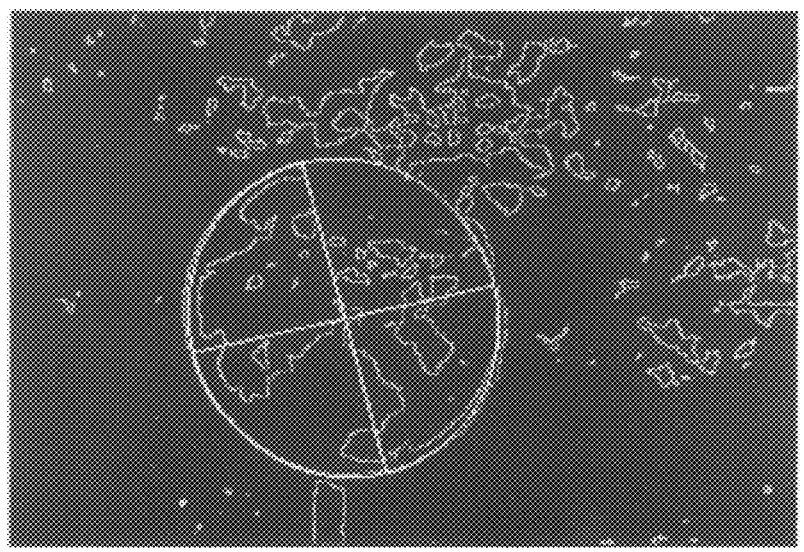
FIG. 23b shows a graphical representation of an edge image of a traffic sign along with a marking of an ellipse.

FIG. 23*b* shows a graphical representation of the same traffic sign as a contour image. The contour image, again, has a circular or ellipsoid shape of the traffic sign marked therein (cf. white line).

Figure 24A:
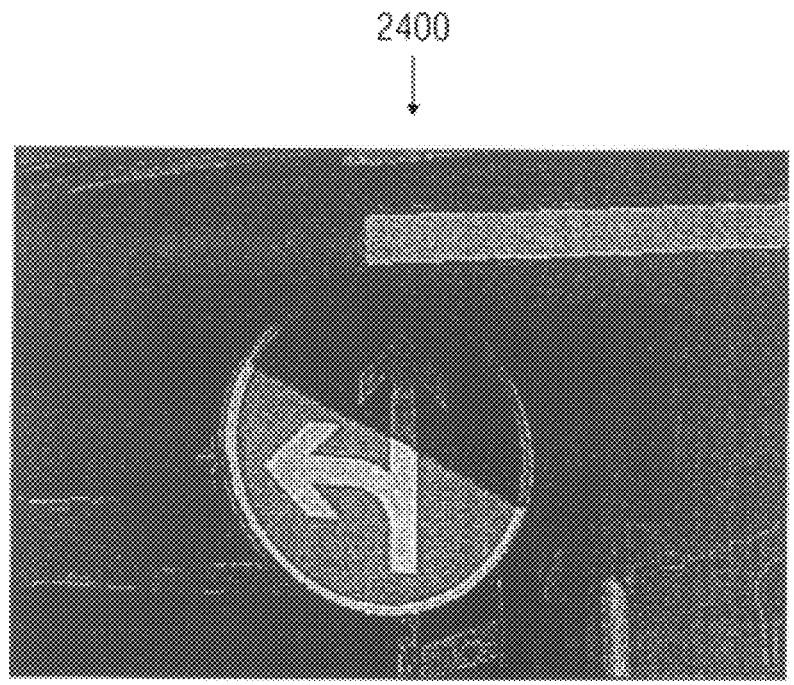
FIG. 24a shows a graphical representation of a traffic sign which is partly shadowed.

FIG. 24*a* shows a graphical representation of a half-shadowed traffic sign. The graphical representation of FIG. 24*a* is designated by 2400 in its entirety.

Figure 24B:
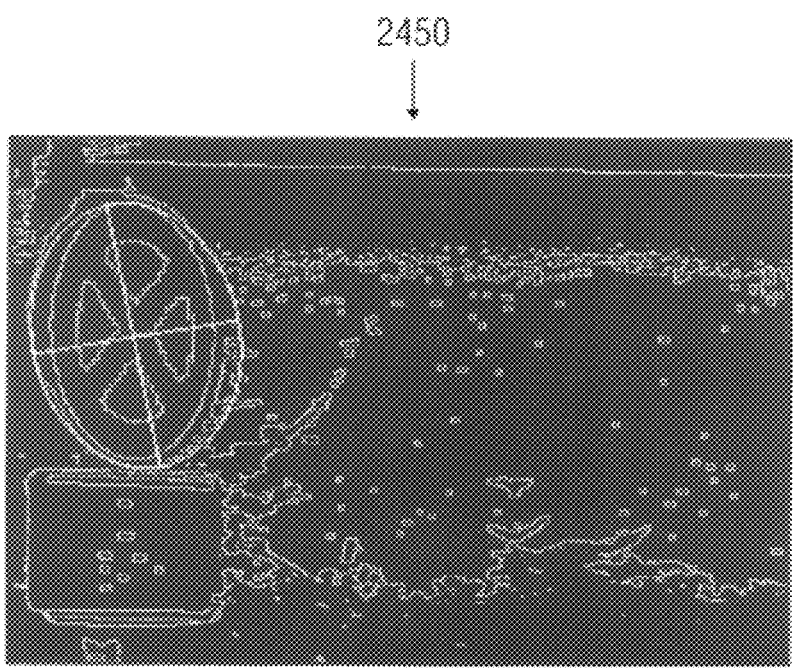
FIG. 24b shows a graphical representation of an edge image of a traffic sign along with a marking of a detected ellipse.

FIG. 24*b* shows a graphical representation of a contour image or edge image which is based on the camera image taken with a moving camera. The graphical representation of FIG. 24*b* is designated by 2450 in its entirety.

It is apparent from the graphical representations 2400 and 2450 that the round shape of a traffic sign may be detected by means of a Hough transform in any case, i.e. both in the event of partial shadowing of the traffic sign and in the event that a picture of the traffic sign was taken with a moving camera.

FIG. 25*a* shows a graphical representation of a right-angled or square traffic sign wherein an at least approximately elliptical part is marked by means of a Hough transform. Incidentally, the graphical representation of FIG. 25*a* is designated by 2500 in its entirety.

FIG. 25*b* shows a graphical representation of contours or edges of a further rectangular or square traffic sign. The graphical representation of FIG. 25*b* is designated by 2550 in its entirety.

The graphical representations 2500, 2550 clearly show the challenges which result with regard to rectangular or square traffic signs and which are solved, for example, by the inventive shape detector.

Figure 26:
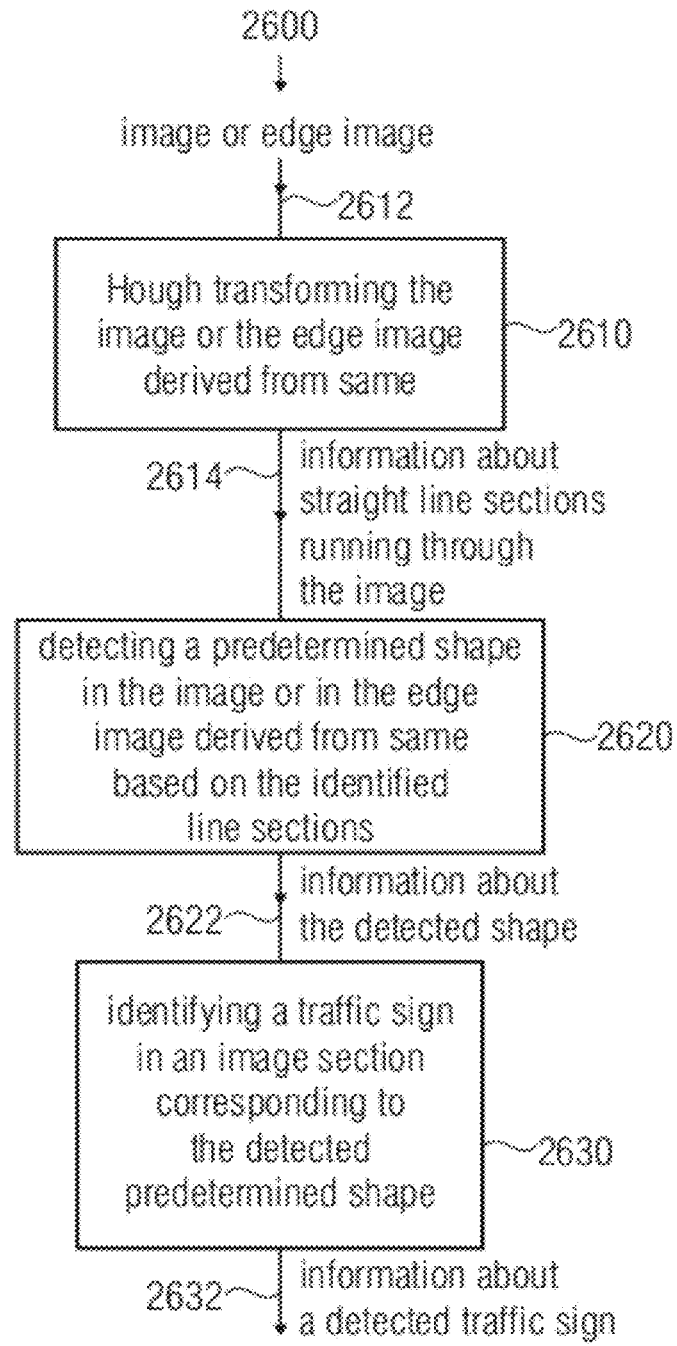
FIG. 26 shows a flow chart of an inventive method of identifying a traffic sign in an image in accordance with an embodiment of the present invention.
Figure 27:
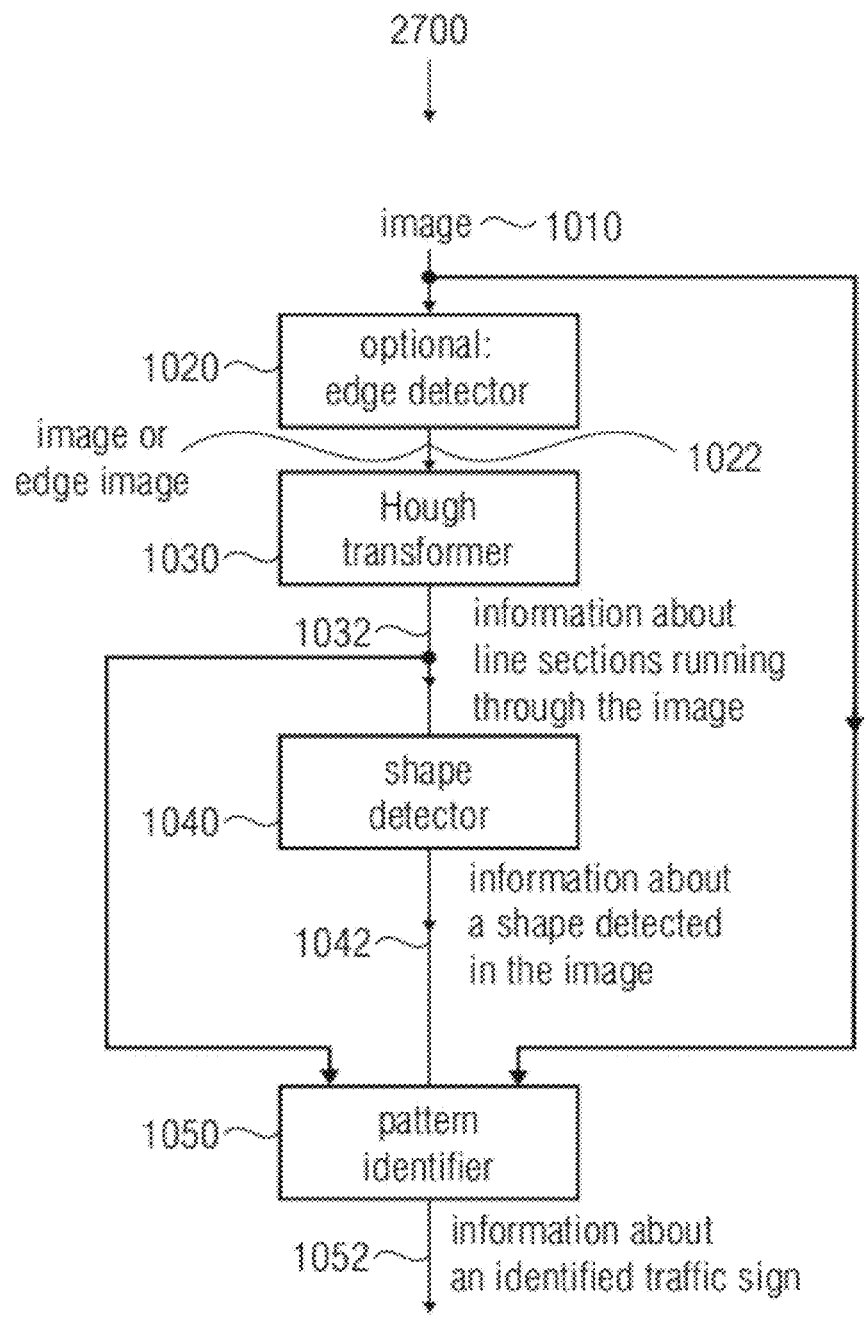
FIG. 27 shows a block diagram of an inventive device for identifying a traffic sign in an image in accordance with an embodiment of the present invention.

FIG. 26 shows a flow chart of the inventive method of detecting a traffic sign in accordance with an embodiment of the present invention.

The method of FIG. 26 is designated by 2600 in its entirety. The method 2600 includes a first step 1610 comprising Hough transforming an image or edge image 2612. Hough transforming 2610 the image or the edge image derived therefrom provides information 2614 on straight line sections running through the image. The method 2600 further comprises detecting 2620 a predefined shape in the image or in the edge image derived therefrom on the basis of the identified straight line sections or on the basis of the information 2614. Detecting 2620 a predefined shape thus provides information 2622 on the shape detected. The method 2600 further comprises, in a third step 2630, identifying a traffic sign in an image section which corresponds to the predefined shape detected. Identification thus results in information 2632 on a traffic sign detected. It shall be noted that the method 2600 may be supplemented by all of those steps which are performed by the inventive devices described in the context of the present description. Likewise, the method 2600 may be supplemented by steps which were explained with reference to the method 1900.

The method of the parallel Hough transform as well as an alternative algorithm for detecting ellipses in an image will be explained below in more detail with reference to FIGS. 1 to 9. In this context, hardware implementation of the parallel Hough transform, which may be implemented within an FPGA, for example, will also be described.

Figure 1:
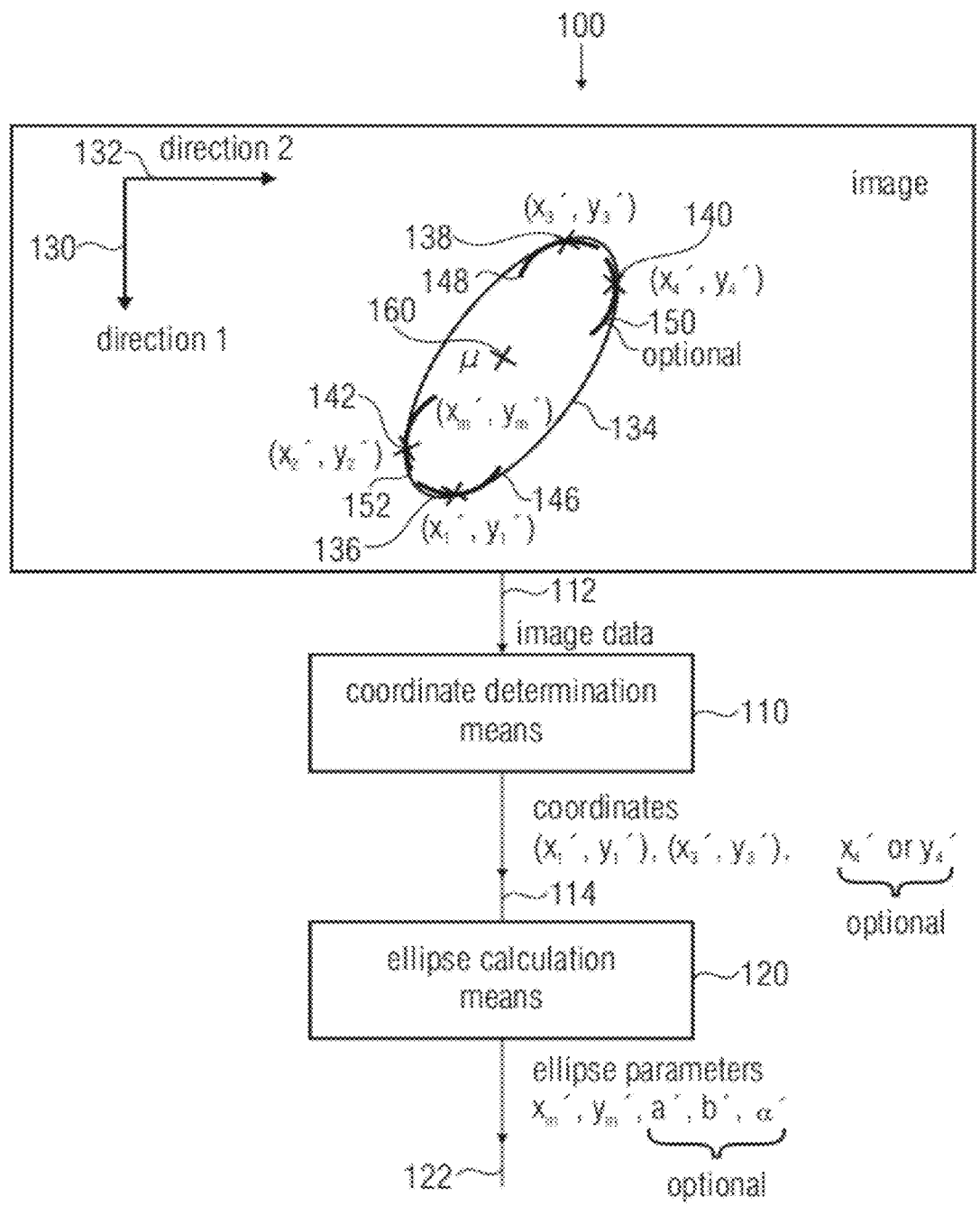
FIG. 1 shows a block diagram of an inventive device for determining information about a shape and/or a location of an ellipse in a graphic image in accordance with the first embodiment of the present invention.

FIG. 1 shows a block diagram of an inventive device for determining information about a shape and/or a location of an ellipse in a graphic image in accordance with a first embodiment of the present invention. The block diagram of FIG. 1 is designated by 100 in its entirety. The inventive device 100 essentially comprises a coordinate determination means 110 implemented to receive image data 112. The coordinate determination means 110 is implemented to extract coordinates 114 of specific ellipse points of an ellipse contained in the image data 112, and to subsequently make said coordinates 114 available to an ellipse calculation means 120. The ellipse calculation means 120 is implemented to calculate ellipse parameters 122 from the coordinates 114 provided by the coordinate determination means 110, and to output the ellipse parameters 122 for further processing.

On the basis of the above structural description, the mode of operation of the inventive device will be explained in more detail below. In this context, it shall be assumed that the image data 112, which describes a graphic image, contains an ellipse. In addition, it shall be assumed that a first direction 130 and a second direction 132 are defined in the image data 112. An ellipse 134 contained in the image data 112 comprises a first ellipse point 136 having associated coordinates $(x_1', y_1')$, the first ellipse point 136 representing that ellipse point which is located farthest in the first direction. The location here is defined, for example, by a right-angled or oblique coordinate system which comprises the first direction 130 and the second direction 132 as advantageous directions or as coordinate axes. In addition, the ellipse 134 comprises a second ellipse point 138 having associated coordinates $(x_3', y_3')$ which represents a point of the ellipse which is located farthest in a direction opposite the first direction 130. In addition, the ellipse comprises a third ellipse point 140 having associated coordinates $(x_4', y_4')$ which represents a point of the ellipse which is located farthest in the second direction 132. Finally, the ellipse 134 also comprises a fourth ellipse point 142 having associated coordinates $(x_2', y_2')$ which represents a point of the ellipse which is located farthest in a direction opposite the second direction 132.

In addition, it shall be noted that the ellipse 134 may be approximated, at the four specific ellipse points 136, 138, 140, 142 previously described, by bent line segments 146, 148, 150, 152, respectively. The bent line segments 146, 148, 150, 152 may be described by a plurality of parameters in each case. For example, the first line segment 146 may be described by two scalar location parameters, for example an x coordinate and a y coordinate, and a curvature parameter, for example a curvature radius. In addition, the first line segment 146 may contact the ellipse at the first ellipse point 136, for example. However, it is also possible for the first line segment 136 to intersect the ellipse 134 at the first ellipse point 136, in which case the ellipse 134 and the first bent line segment 146 advantageously comprise a shared tangent at the first ellipse point 136. The shared tangent may be specified by a line which is made in such a way that its points comprise a constant coordinate in the first direction. This corresponds to the definition of the first ellipse point as that point of the ellipse which is located farthest in the first direction. In addition, it shall be noted that the first line segment 146 advantageously belongs to a family of parameterized bent line segments, the parameters describing, for example, the locations and/or the curvatures of the individual line segments of the family.

The parameters of the first line segment 146, i.e. the location and/or curvature of the first line segment 146, therefore are closely related to the location and/or the shape of the ellipse 134.

In summary, it shall be noted that a line segment will be regarded as the first line segment 146 which approximates the ellipse 134 at the first ellipse point 136 if it is sufficiently similar to the ellipse in terms of a distance measure within a surrounding of the first ellipse point. In addition, it may be useful that further criteria be met, i.e. that a line segment, for example, will be identified as the first line segment 146 only if it has a shared tangent with the line of the ellipse 134 at the first ellipse point 136.

The second bent line segment 148, the third bent line segment 150, and the fourth bent line segment 142 are defined analogously, the second bent line segment 148 being a bent line segment which approximates the ellipse at the second ellipse point 138, the third bent line segment 150 being a bent line segment which approximates the ellipse at the third ellipse point 140, and the fourth bent line segment being a bent line segment which approximates the ellipse 134 at the fourth ellipse point 142.

The coordinate determination means 110 is further implemented to determine at least one parameter of the first bent line segment 146 so as to determine the coordinates $(x_1', y_1')$ of the first ellipse point 136 on the basis of the at least one determined parameter of the first bent line segment 146. In addition, the coordinate determination means 110 is also implemented to determine at least one parameter of the second bent line segment 148 and to determine, on the basis of the at least one parameter of the second bent line segment 148, the coordinates $(x_3', y_3')$ of the second ellipse point 138.

For example, if the first bent line segment 146 belongs to a parameterized family of bent line segments, determining the parameters of the first bent line segment will correspond to identifying a bent line segment, from the family of bent line segments, which approximates the ellipse 134 at the first ellipse point 136 sufficiently well and/or as well as possible. A quality of the approximation may be determined by a mathematical distance measure, for example, and a threshold value may be set for the distance measure, it being assumed, if the threshold value is exceeded or fallen below, that a bent line segment among the parameterized family of bent line segments approximates the ellipse 134 at the first ellipse point 136 sufficiently well.

By analogy, the coordinate determination means 110 may determine the parameters of the second bent line segment 148, which approximates the ellipse 134 in a surrounding of the second ellipse point 138. A parameterized family of bent line segments, which is used, for example, in determining the parameters of the second bent line segment 148, may be identical with the parameterized family of line segments used for determining the parameters of the first bent line segment 146, or it may be different therefrom, for example with regard to the direction of curvature.

Once the coordinate determination means 110 has determined the at least one parameter of the first bent line segment 146 and the at least one parameter of the second bent line segment 148, the coordinate determination means 110 may derive from this the coordinates $(x_1', y_1')$ of the first ellipse point 136 as well as the coordinates $(x_3', y_3')$ of the second ellipse point 138. The coordinate determination means 110 subsequently passes on the coordinates $(x_1', y_1')$ of the first ellipse point 136 as well as the coordinates $(x_3', y_3')$ of the second ellipse point 138 to the ellipse calculation means 120.

On the basis of the coordinates $(x_1', y_1')$ of the first ellipse point 136 and the coordinates $(x_3', y_3')$ of the second ellipse point 138, the ellipse calculation means 120 may subsequently calculate at least the center coordinates $(x_m', y_m')$ of the ellipse 134. Thus, a center point 160 of the ellipse 134 is known.

In addition, the coordinate determination means 110 may advantageously be implemented to determine at least one parameter of the third bent line segment 150 which approximates the ellipse from the third ellipse point 140. In this context, it may be determined, again, which bent line segment from a family of bent line segments best approximates the ellipse 134 at the third ellipse point 140. The associated family parameter then again represents, e.g., the parameter of the identified third line segment 150 and may be used by the coordinate determination means to determine at least one coordinate $x_4'$ or $y_4'$ of the third ellipse point 140. The coordinate determination means 110 may forward this coordinate $x_4'$ or $y_4'$ again to the ellipse calculation means 120, which enables the ellipse calculation means 120 to determine, in conjunction with the coordinates $(x_1', y_1')$ and $(x_3', y_3')$ of the first ellipse point 136 and of the second ellipse point 138, all of the parameters of the ellipse, i.e. both coordinates $(x_m', y_m')$ of the ellipse center point 160, the lengths a', b' of the two semiaxes of the ellipse 134, and a rotational angle α', and/or to calculate them while using analytical formulae.

It shall once again be explicitly noted at this point that for determining the parameters of the first line segment 146, a priori knowledge of the shape of the first line segment 146 may be used. Actually, it has already been known that the first line segment 146 may approximate the ellipse 134 at the first ellipse point 136, i.e. that the first line segment 146 may have the same curvature property or at least the same curvature direction that is exhibited by the ellipse 134 at the first ellipse point 136. In addition, the first line segment 146 is advantageously defined in that it is tangent on the ellipse at the first ellipse point 136, or at least shares a tangent with the ellipse 134 at the first ellipse point 136. Thus, the coordinate determination means is advantageously generally implemented to identify, in the graphic image, a course of curve which meets the above-mentioned conditions (curvature property, tangent direction) as the first bent line segment. Utilization of a parameterized family of curves is only to be seen as an example here, but rather, use may be made of any pattern detection algorithms which are able to identify parameters of a bent line segment having a predefined curvature direction and a predefined tangent direction, and to describe them by means of at least one location parameter.

Analogous definitions shall also apply to the second bent line segment 148, the third bent line segment 150, and the fourth bent line segment 152, which optionally is used in addition. Corresponding algorithms as for identifying the first bent line segment may be used, said algorithms needing to be adapted only with regard to the curvature direction and the tangent direction.

An essential advantage of an inventive device for determining information about a shape and/or a location of an ellipse is that "extreme points" of the ellipse to be identified, i.e. points of the ellipse which are located farthest in several predefined directions, are determined. The first ellipse point 136, the second ellipse point 138, the third ellipse point 140, and the fourth ellipse point 142 may actually be regarded as extreme points in accordance with the above definition. In this context, the extreme points are determined by identifying a bent line segment which approximates the ellipse at the respective extreme point. Here, use may be made of the a priori knowledge of the curvature of the ellipse at the respective extreme point as well as of a priori knowledge of a direction of a tangent on the ellipse at the respective extreme point. Thus, it is advantageous not to use any image points of the graphic image or of the image data 112 in order to determine the extreme points, but rather to use only such image points which represent a bent line (or a bent line segment) which may approximate an ellipse at the respective center of rotation.

In this context, a suitable bent line segment which approximates the ellipse 134 at one of the extreme points may be found in a very efficient manner by means of the a priori knowledge, i.e. a knowledge of the curvature of such a bent line segment and the direction of the tangent of such a bent line segment at that point where it touches the ellipse 134 (or at least shares a tangent with the ellipse). Once two opposite extreme points of the ellipse, i.e., for example, the first ellipse point 136 and the second ellipse point 138, are known, the ellipse calculation means 120 may determine, in a second step, at least the center point 160 of the ellipse in a computationally highly efficient manner.

In addition, determining two coordinates $(x_1', y_1')$ of the first ellipse point 136, two coordinates $(x_3', y_3')$ of the second ellipse point 138, and only one coordinate $(x_4', y_4')$ of the third ellipse point 140 is sufficient for calculating all of the ellipse parameters $((x_m', y_m'), a', b', α')$.

Figure 2A:
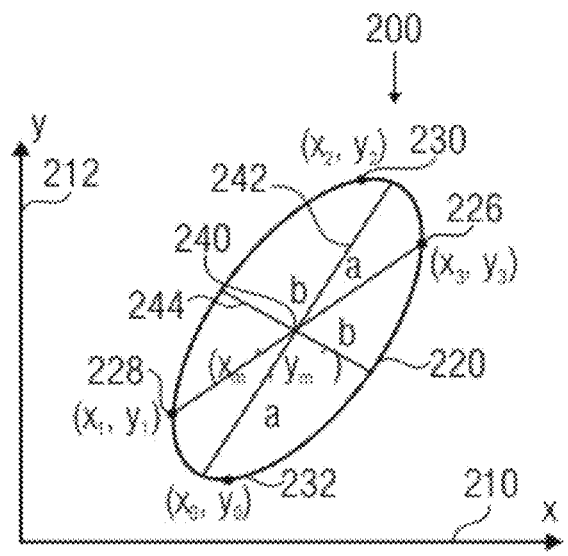
FIG. 2a shows a graphical representation of an ellipse and of the coordinates of a first ellipse point, a second ellipse point, a third ellipse point, a fourth ellipse point and a center point of the ellipse.

To facilitate understanding of the illustrations which follow, the definitions used for the ellipse parameters will be presented below. FIG. 2a therefore shows a graphical representation of an ellipse and of the coordinates of a first ellipse point, of a second ellipse point, of a third ellipse point, of a fourth ellipse point, and of a center point of the ellipse. The graphical representation of FIG. 2a is designated by 200 in its entirety. The graphical representation 200 shows a Cartesian coordinate system having an x axis 210 and a y axis 212, the x axis 210 and the y axis 212 being perpendicular to each other. The coordinate system, which is formed by the x axis 210 and the y axis 212, has an ellipse 220 arranged therein. The ellipse 220 comprises a first ellipse point 226 with associated coordinates $(x_3, y_3)$. The first ellipse point 226 represents that point of the ellipse 220 which is located farthest in the x direction defined by the x axis 210. A second ellipse point 228 with associated coordinates $(x_1, y_1)$ forms that point of the ellipse 220 which is located farthest in the negative x direction. A third ellipse point 230 with associated coordinates $(x_2, y_2)$ further represents that point of the ellipse 220 which is located farthest in the y direction defined by the y axis 212, and a fourth point 232 with associated coordinates $(x_0, y_0)$ forms a point of the ellipse 220 which is located farthest in the negative y direction. A center point 240 of the ellipse further comprises center coordinates $(x_m, y_m)$. The graphical representation 200 further shows a first semiaxis 242 of the ellipse, which in the case shown represents the large semiaxis of the ellipse, and the length of which is described by the parameter a. A second semiaxis 244 of the ellipse 220 forms a small semiaxis of the ellipse 220 in the case shown. The length of the second semiaxis 244 of the ellipse is described by the parameter b.

Figure 2B:
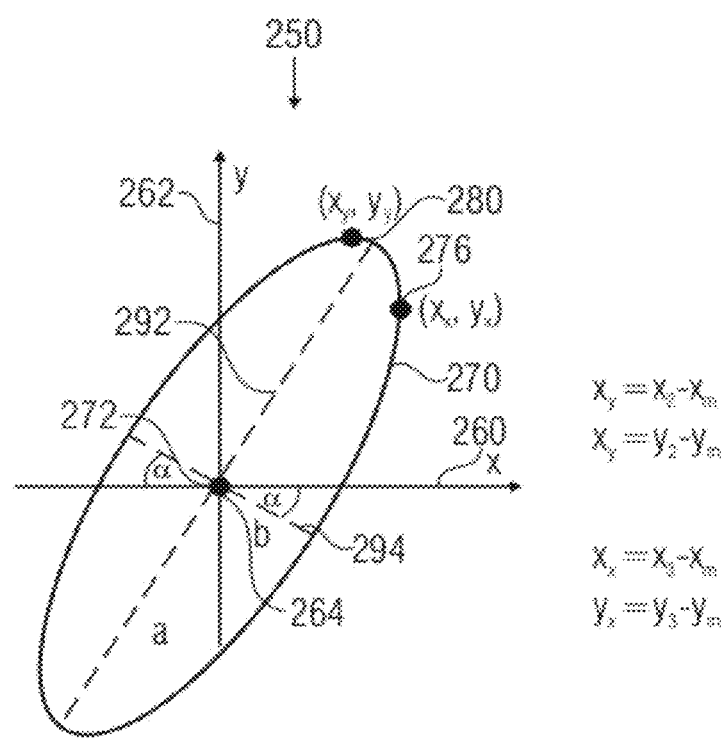
FIG. 2b shows a graphical representation of an ellipse shifted into the origin, and of transformed coordinates of two ellipse points.

In addition, FIG. 2b shows a graphical representation of an ellipse, which is shifted into the origin, along with transformed coordinates of characteristic ellipse points. The graphical representation of FIG. 2b is designated by 250 in its entirety. The graphical representation 250 again depicts an x axis 260 and a y axis 262, which orthogonally intersect in an origin 264. The graphical representation 250 further shows an ellipse 270 which is shifted into the origin and whose center point 272 coincides with the origin 264. What is also shown is a transformed first ellipse point 276 having associated coordinates $(x_x, y_x)$. The transformed first ellipse point 276 in turn forms that point of the ellipse 270 which is located farthest in the x direction defined by the x axis 260. Incidentally, it shall be noted that the transformed first ellipse point 276 results from the first ellipse point 226 by means of a shift, wherein:

$$x_x = x_3 - x_m; \quad y_x = y_3 - y_m.$$

The graphical representation 250 further comprises a transformed third ellipse point 280 having associated coordinates $(x_y, y_y)$. The transformed third ellipse point 280 forms a point of the ellipse 270 which is located farthest in the y direction defined by the y axis 262. The transformed third ellipse point 280 further results from the third ellipse point 230 by means of a shift, wherein:

$$x_y = x_2 - x_m; \quad y_y = y_2 - y_m.$$

The graphical representation 250 further shows a first semiaxis 292 of the ellipse 270, which in the example shown represents a large semiaxis and whose length is designated by a, and a second semiaxis 294 of the ellipse 270, which in the example shown represents a small semiaxis and whose length in turn is designated by b. What is also shown is a rotational angle $\alpha$. Thus, the rotational angle $\alpha$ here is shown as an acute angle between the x axis 260 and the second semiaxis 294 of the ellipse 270.

The graphical representation 250 thus shows transformed extreme points 276, 280 of the ellipse 270 which is shifted into the origin (i.e. which is transformed) as well as associated ellipse parameters a, b and $\alpha$.

Figure 3:
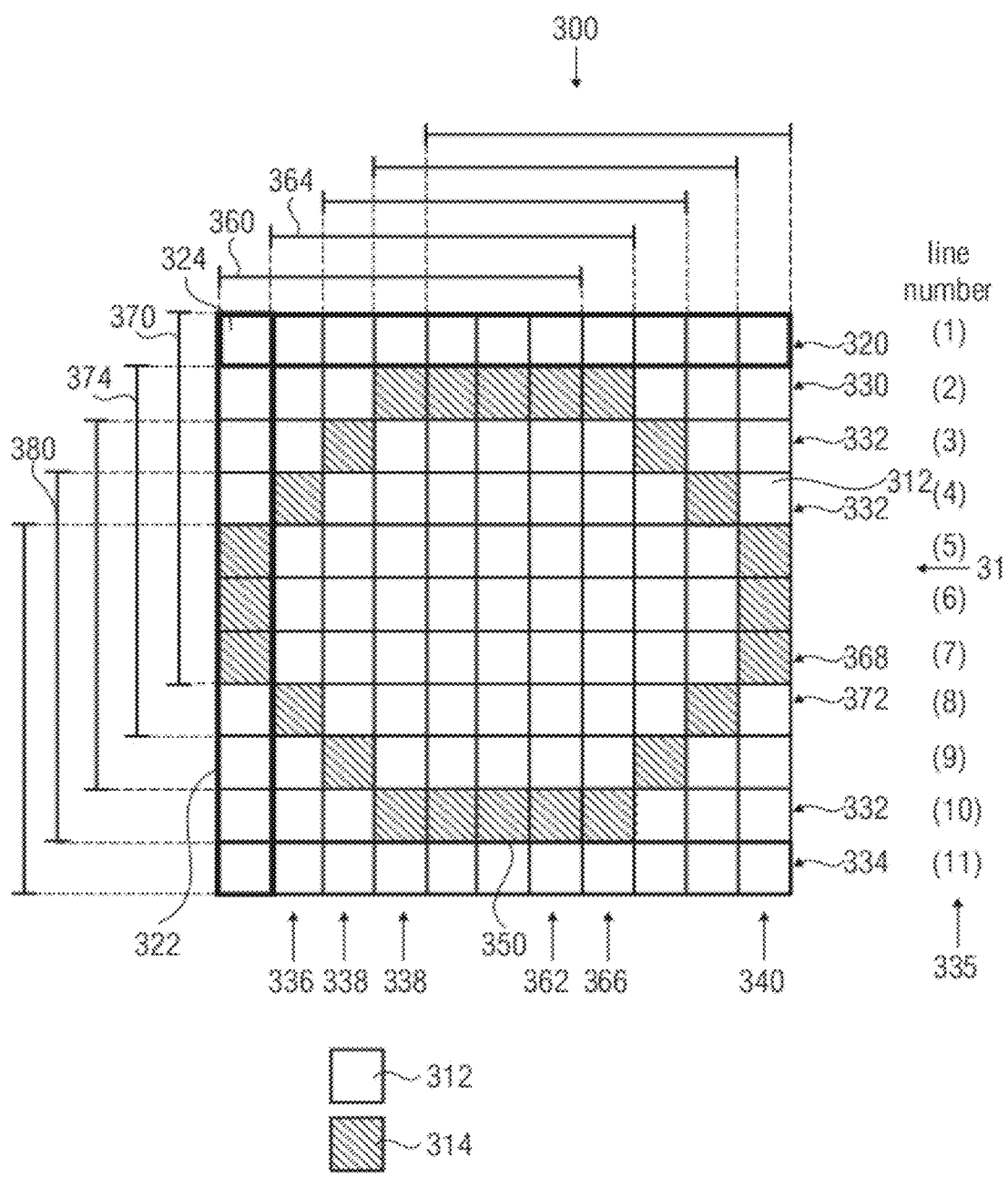
FIG. 3 shows a graphical representation of an exemplary raster image and of image sections processed successively.

FIG. 3 shows a graphical representation of an exemplary raster image of an ellipse. The graphical representation of FIG. 3 is designated by 300 in its entirety. What is shown in this context is a raster image 310 having a plurality of raster points 312. A raster point may be inactive or white, as is shown for the raster point 312. A raster point may further be active or black, as is indicated, for example, for the raster point 314 by means of hatching. It shall further be noted that the raster image 310 comprises a plurality of raster lines and a plurality of raster columns. A raster line in this context summarizes a plurality of raster points, as is illustrated, for example, by the area 320, which has thick borders and describes a raster line. A raster column also defines a combination of several raster points. One example of a raster column is shown by the thick-border area 322, which represents a raster column. Raster lines and raster columns are advantageously orthogonal to one another. In addition, it shall be noted that raster lines and raster columns may overlap, of course. For example, the raster line 320 and the raster column 322 have a common image point designated by 324. It shall also be noted that an image or image section may be fully described both by a plurality of raster lines and by a plurality of raster columns, since obviously each rastered area may be described both by raster lines and by raster columns. It shall also be noted that by definition, the raster image 310 comprises a first raster line, the raster line 320, a second raster line 330, several further raster lines 332, which advantageously are numbered consecutively, and a last raster line 334. Corresponding line numbers are designated by 335. Similarly, the raster image 310 comprises a first raster column 322, a second raster column 336, further raster columns 338, which advantageously are numbered consecutively, and a last raster column 340.

The graphical representation 300 further shows an ellipse 350 represented by the raster image 310 in the form of active or black raster points (or image points), the active raster points being marked by hatching.

The graphical representation 300 further shows a first group of raster columns which is designated by 360. The first group of raster columns comprises the first raster column 322, the second raster column 336 and all of the following raster columns up until the seventh raster column 362, inclusively. The first group 360 of raster columns thus describes a section of the raster image 310.

The above-mentioned section of the raster image further comprises a plurality of raster lines, which are reduced in length as compared to the original raster lines due to the restriction in the number of columns. The shortened raster lines, which may arise on account of the selection of an image section, will also be referred to as raster lines for short in the following.

The second group of raster columns, which is designated by 364, further comprises the second raster column 336 and the following raster columns up to an eighth raster column 366. In other words, seven adjacent raster columns are combined into one group of raster columns, respectively, which are provided for shared processing.

Similar grouping may be performed for the raster lines, for example the first raster line 320, the second raster line 330 and all of the following raster lines up to the seventh raster line 368 being combined into a first group 370 of raster lines. Similarly, a second group of raster lines comprises the second raster line 330 up to the eighth raster line 372, the second group of raster lines being designated by 374.

In this context it shall naturally be noted that a group of raster lines may comprise any number of raster lines, for example five raster lines, 16 raster lines, 32 raster lines, or 64 raster lines. In this context it is only advantageous for the number of raster lines combined into a group of raster lines to be larger than 2. Analogous considerations shall also apply to a group of raster columns.

Figure 4A:
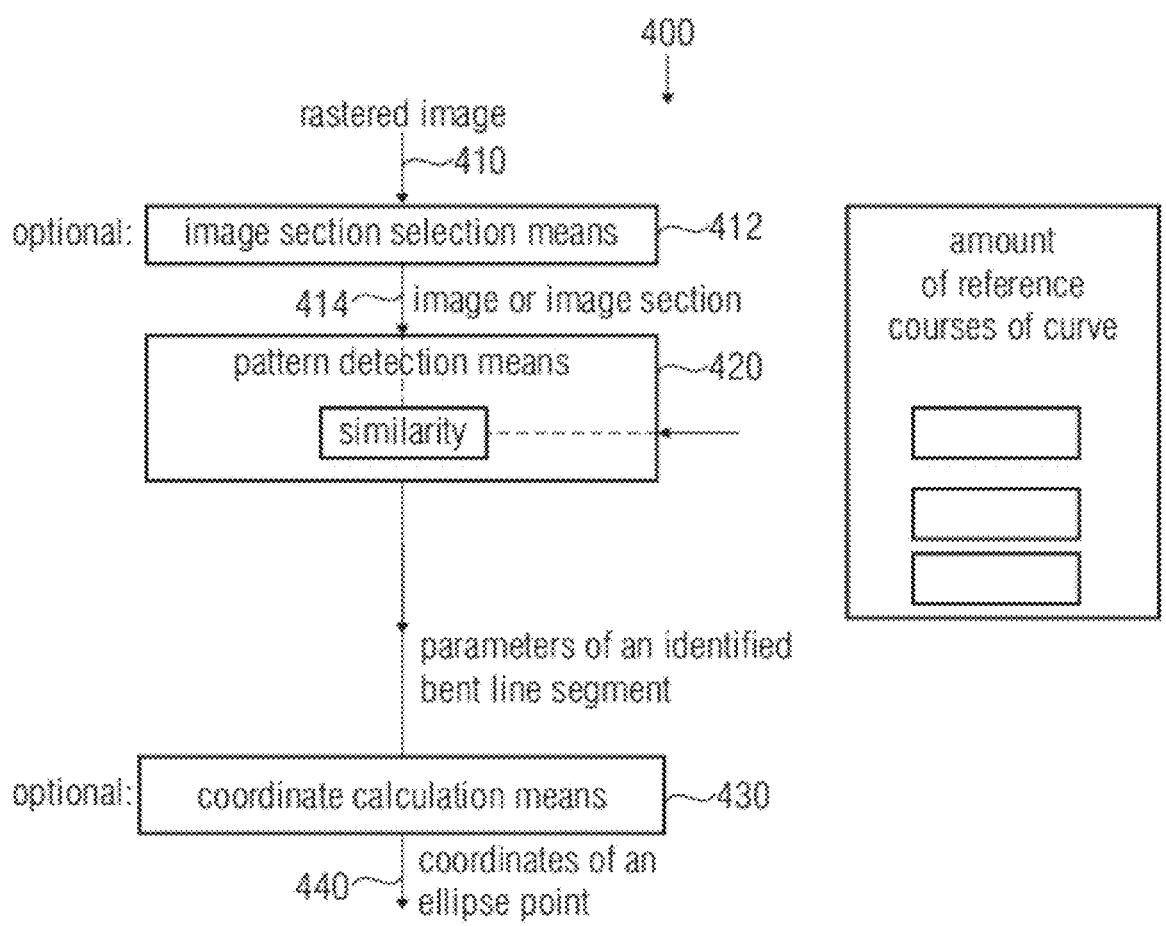
FIG. 4a shows a block diagram of an inventive device for determining coordinates of an ellipse point in accordance with a second embodiment of the present invention.

FIG. 4a shows a block diagram of an inventive device for determining coordinates of an ellipse point in a graphic image in accordance with a second embodiment of the present invention. The device of FIG. 4a is designated by 400 in its entirety. The device 400 is particularly well suited to process a raster image 310 as is depicted in FIG. 3, as will be explained below.

The device 400 is implemented to receive a rastered image 410. In addition, the device 400 is optionally implemented to select an image section 414 from the rastered image 410 while using an optional image-section selection means 412. A selected image section 414 may be defined, for example, by a plurality of raster lines and/or a plurality of raster columns, for example by a group of raster lines or a group of raster columns, as was described with reference to FIG. 3. The inventive device 400 further comprises a pattern detection means 420 implemented to receive the rastered image or the rastered image section 414. In addition, the pattern detection means 420 is implemented to establish whether a course of curve or a bent line segment among a set of reference courses of curve is contained in the rastered image or image section 414.

The courses of curve of the set of reference courses of curve here may be stored within a memory, for example, for determining the similarity between courses of curve contained in the rastered image or image section 414 and the reference courses of curve. However, it is possible for the structure of the pattern detection means to be implemented to detect whether a course of curve which is sufficiently similar to a reference course of curve among the set of reference courses of curve is contained in the rastered image or image section 414. As reference courses of curve, use is advantageously made of such courses of curve which approximate an ellipse at the first ellipse point, at the second ellipse point, at the third ellipse point, or at the fourth ellipse point. Consequently, the pattern detection means is generally implemented to detect whether a course of curve which detects an ellipse at the first ellipse point, at the second ellipse point, at the third ellipse point, or at the fourth ellipse point is contained in the rastered image or image section 414.

The pattern detection means 420 is further advantageously implemented to identify, among the set of reference courses of curve, a course of curve which is sufficiently similar to a course of curve contained in the rastered image or image section 414, as the first bent line segment, the second bent line segment, the third bent line segment, or the fourth bent line segment, depending on which one among the first ellipse point, the second ellipse point, the third ellipse point, and the fourth ellipse point is the point where the reference course of curve among the set of reference courses of curve approximates the ellipse.

In addition, the pattern detection means 420 is implemented to determine at least one location parameter—but advantageously two location parameters and, optionally, a further parameter which describes a course of curve—of the first line segment, of the second line segment, of the third line segment, or of the fourth line segment. An optional coordinate calculation means 430 may then calculate the coordinates of the first ellipse point, of the second ellipse point, and of the third ellipse point or of the fourth ellipse point from the location of the identified first bent line segment, of the second bent line segment, of the third bent line segment, or of the fourth bent line segment. However, the coordinate calculation means 430 may also be omitted if, for example, the location parameters of the bent line segments which are determined by the pattern detection means 420 are already defined such that the location parameters directly indicate coordinates of the first ellipse point, of the second ellipse point, and of the third ellipse point or of the fourth ellipse point, at which the bent line segments advantageously extend through the specific ellipse points.

It shall further be noted that as reference courses of curve, use is advantageously made of such courses of curve which approximate an ellipse at the first ellipse point, at the second ellipse point, at the third ellipse point, or at the fourth ellipse point (or in surroundings of the respective ellipse points). As reference courses of curve, use is advantageously made of symmetrical bent courses of curve. Also, it is advantageous to use, as reference courses of curve, for example sections from circular curves, since circular curves approximate an ellipse particularly well at the first ellipse point, at the second ellipse point, at the third ellipse point, or at the fourth ellipse point.

FIG. 4b is a graphical representation of two examples of reference courses of curve for utilization in an inventive pattern detection means. The graphical representation of FIG. 4b is designated by 450 in its entirety. A first graphical representation 452 describes, in the form of a raster image, a first reference course of curve which approximates a section from a circular curve with a first curvature radius $r_1$. A second graphical representation 454 describes, in the form of a raster image, a second reference course of curve which approximates a section from a circular line with a second curvature radius $r_2$, the second curvature radius $r_2$ being larger than the first curvature radius $r_1$. In addition, a third graphical representation 456 depicts, in the form of a raster image, a third reference course of curve, which also describes a section from a circular line having a third curvature radius $r_3$. In this context, the third curvature radius $r_3$ is smaller than the first curvature radius $r_1$. The three graphical representations 452, 454, 456 of FIG. 4b therefore describe three potential reference courses of curve for utilization in the pattern detection means 420. In other words, the pattern detection means 420 may generally be implemented to detect, in the rastered image or image section 414, the three reference courses of curve depicted in the graphical representations 452, 454, 456 of FIG. 4b, and to identify them, for example, as a first bent line segment which approximates the ellipse, which is to be identified, at the first ellipse point. Moreover, the pattern detection means 420 is advantageously implemented to describe, by means of location parameters, the location of a reference course of curve detected in the rastered image or image section 414, and to make said location parameters available to the coordinate calculation means 430, unless the above-mentioned location parameters directly represent the coordinates of a first ellipse point at which the known reference course of curve approximates the ellipse to be identified.

Figure 5A:
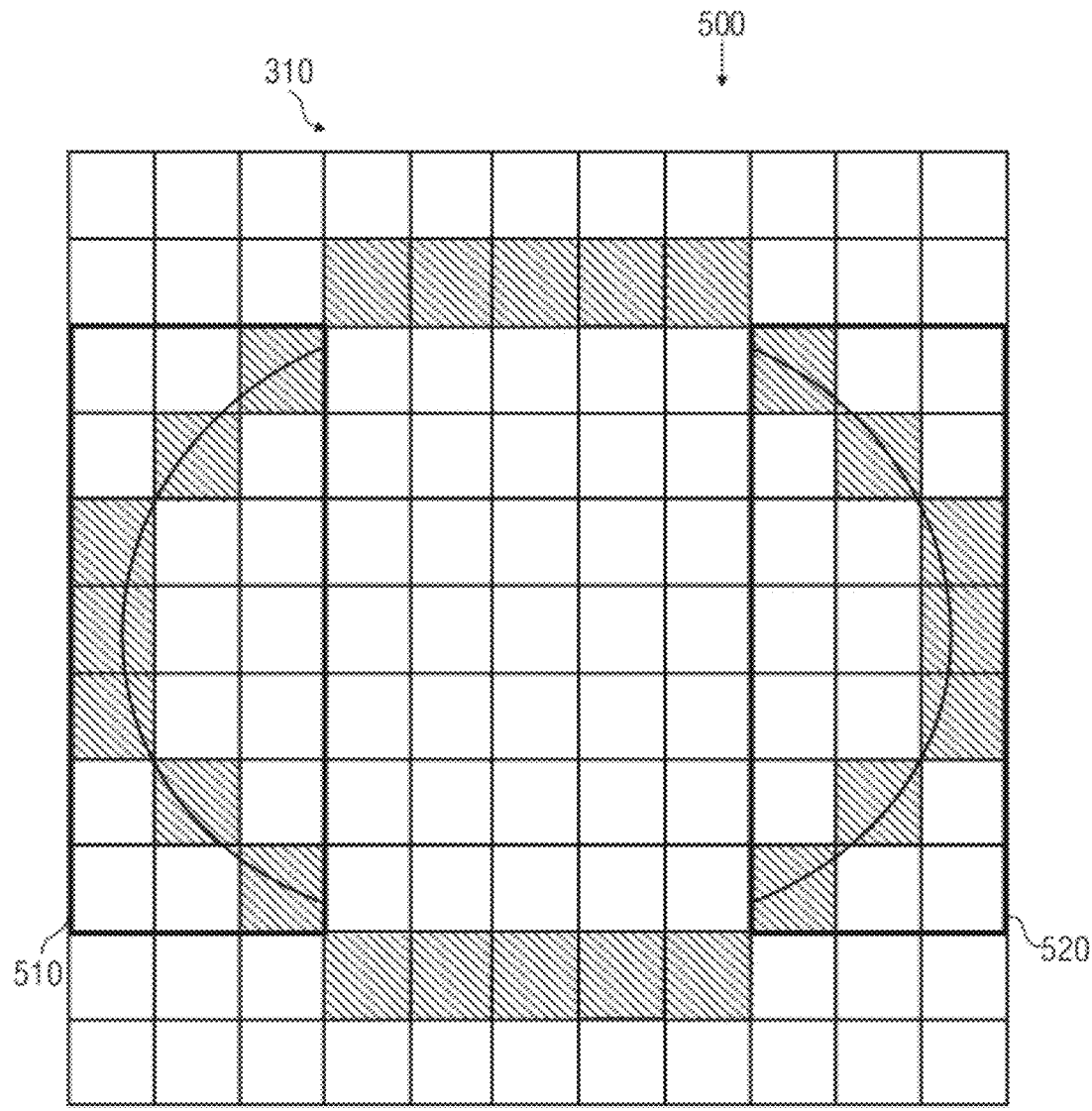
FIG. 5a shows a first graphical representation of an exemplary raster image having detected bent line segments marked therein.

FIG. 5a shows a first graphical representation of an exemplary raster image comprising detected bent line segments marked therein. In this context, it is assumed that the pattern detection means 420 of the device 400 of FIG. 4a is able, for example, to detect, in an image or image section, the reference courses of curve depicted in the first graphical representation 452, in the second graphical representation 454, and in the third graphical representation 456. It is also assumed that the exemplary raster image 310 of FIG. 3a is supplied to the pattern detection means 420 as a rastered image 414. By way of example, it is also assumed that the raster image 310 of the pattern detection means is supplied either on a line-by-line or column-by-column basis. Assuming that the raster image 310 of the pattern detection means 420 is supplied on a column-by-column basis, starting with the first raster column 322, the pattern detection means 420 may detect, in the rastered image, e.g. the third reference course of curve of the graphical representation 456. In the graphical representation 500 of FIG. 5a, the course of curve which is detected in the process is marked by 510. However, if the raster image 310 of the pattern detection means 420 is supplied on a column-by-column basis, starting with the last raster column 340, the pattern detection means may detect, for example, a further course of curve which is designated by 520 in the graphical representation 500.

It shall also be noted in this context that the pattern detection means 420 may only have an image section supplied to it which is selected by the image-section selection means 412. For example, in a first processing step, the pattern detection means 420 may only have a limited image section supplied to it which comprises the first group 370 of raster lines. In other words, an image section comprising the first raster line 320 and the adjacent raster lines up to the seventh raster line 368 may be supplied to the pattern detection means 420 in the first processing step. For example, this image section comprises does not comprise a course of curve which would match any of the reference courses of curve shown in the graphical representations 452, 454 and 456. Subsequently, in the second processing step, the pattern detection means 420 may have an image section supplied to it which comprises the second group 374 of raster lines. In other words, the pattern detection means 420 has the image contents between the second raster line 330 and the eighth raster line 372, inclusively, supplied to it on a column-by-column basis (that is, one column after another), for example. This image section, too, does not comprise a course of curve which would match the three reference courses of curve of the graphical representations 452, 454, 456. In a third processing step, the image content may further be supplied to a third group of raster lines of the pattern detection means 420. The third group of raster lines here is designated by 380 and comprises the raster lines 3 to 9. The pattern detection means 420 may identify, within this image section, a course of curve which corresponds to the third reference course of curve of the graphical representation 456. The identified course of curve is therefore designated by 510 in the graphical representation 500. It shall further be noted that in order to improve the resolution, adjacent groups 370, 374, 380 of raster lines overlap, that is comprise common raster lines. In this context, it is advantageous for adjacent groups of raster lines to differ by only one single raster line, i.e. for adjacent groups of raster lines to be mutually offset by exactly one raster line, as is shown in FIG. 3, for example.

In other words, the device 400 may be implemented to successively process various image sections which comprise various groups of raster lines, and to subject them to pattern detection. Thus, the pattern detection means may only process a small image section in each case, which intensely reduces the complexity of pattern detection. In addition, the number of reference courses of curve used may be kept small as a result. It shall further be noted that information about a location of the bent line segment which approximates an ellipse at the first ellipse point, at the second ellipse point, at the third ellipse point, or at the fourth ellipse point may be derived from the information indicating the image section in which the reference course of curve may be identified, i.e. indicating the group 370, 374, 380 of raster lines which is used for identifying the reference course of curve. In other words, the information stating the image section in which the reference course of curve is identified represents a location parameter of the bent line segment and may thus be used for determining at least one coordinate of the first ellipse point, of the second ellipse point, of the third ellipse point, or of the fourth ellipse point.

Similarly, the first image 310 may also be supplied to the pattern detection means 420 on a line-by-line basis, that is one line after another. In this context, several image sections, which comprise different groups 360, 364 of raster columns, may be processed one after another. The explanations given with regard to column-by-column processing of a group of raster lines shall apply analogously.

Figure 5B:
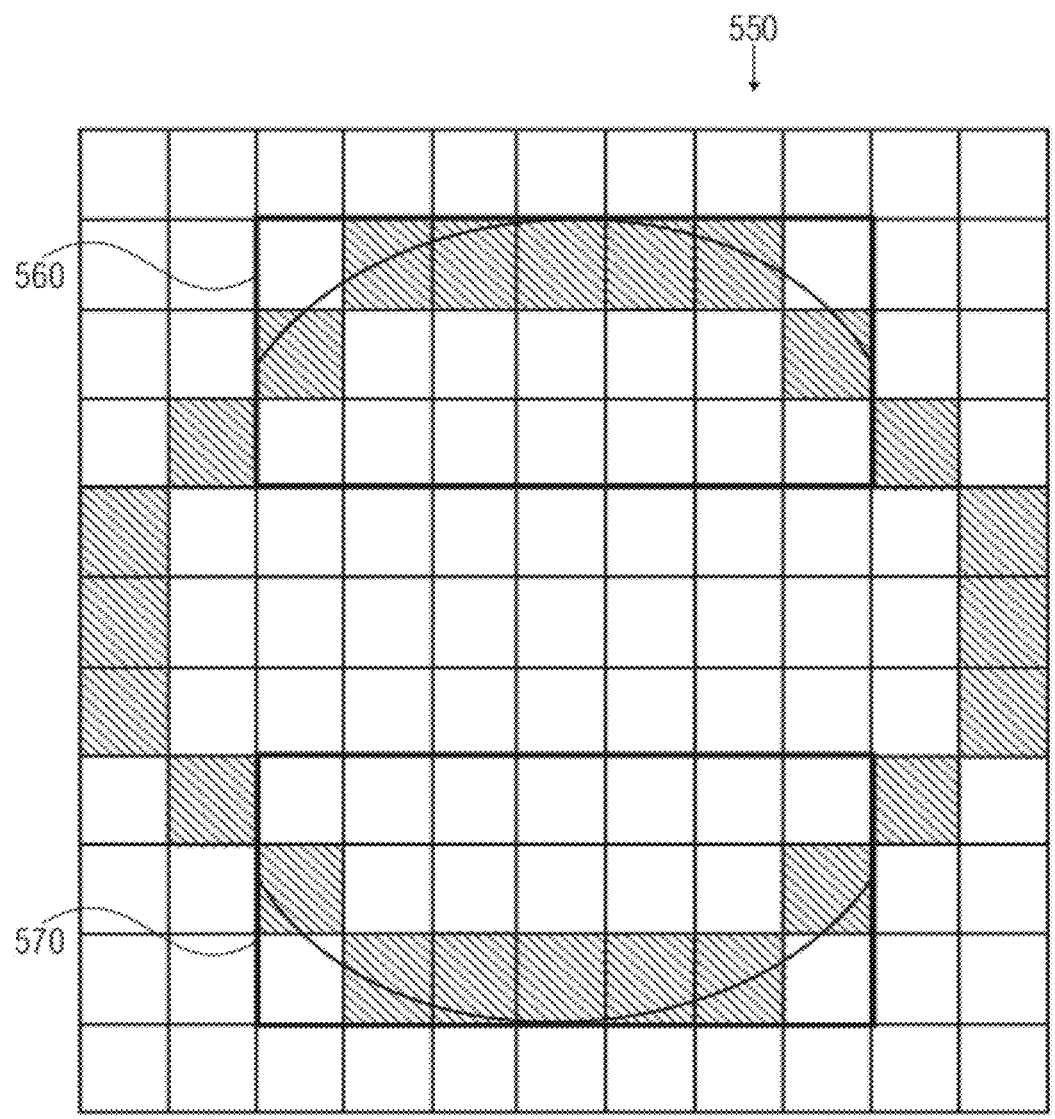
FIG. 5b shows a second graphical representation of an exemplary raster image having detected bent line segments marked therein.

It shall also be noted that FIG. 5b depicts a second graphical representation of an exemplarily raster image having detected bent line segments marked therein. The detected bent line segments, which in the graphical representation 550 of FIG. 5b are designated by 560 and 570, here correspond to the reference course of curve depicted in the graphical representation 454.

It shall also be noted that it is advantageous to supply a raster image 310 to the pattern detection means 420 on a column-by-column basis for the first time, starting with the first raster column 322, and to supply the raster image 310 to the pattern detection means 420 on a column-by-column basis for the second time, starting with the last raster column 340. In a first run, which starts with the first raster column 322, courses of curve of a first direction of curvature may be detected, while in the second run, which starts with the last raster column 340, courses of curve having a direction of curvature which is opposite thereto are detected. Similarly, line-by-line processing of the raster image 310 may be performed starting with the first raster line 320 at one point and starting with the last raster line 334 at another point so as to be able to identify, in turn, courses of curve having different curvature behaviors while using a pattern detection means which is designed only to detect courses of curve having one single curvature behavior or one single direction of curvature.

Figure 6:
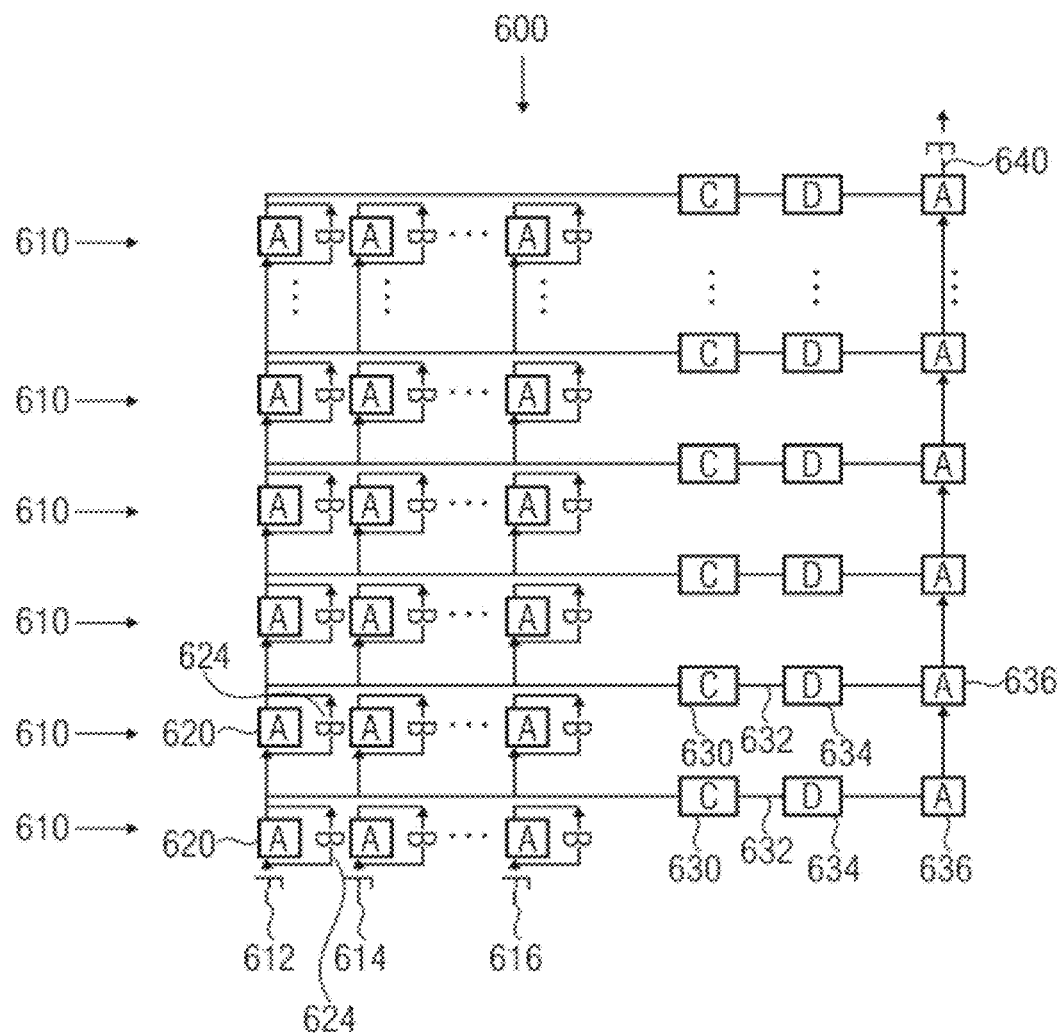
FIG. 6 shows a block diagram of a pattern detection means for utilization in an inventive device for determining information about a shape and/or a location of an ellipse in a graphic image.

FIG. 6 shows a block diagram of a pattern detection means for utilization in an inventive device 400. The circuit of FIG. 6 is designated by 600 in its entirety and describes a so-called "Hough array" for performing a Hough transform. The pattern detection means 400, which implements the coordinate determination means 110, may advantageously conduct a search for circular curves having different radii which describe, with sufficient approximation, an ellipse to be identified around the extreme points, i.e. around the first ellipse point, the second ellipse point, the third ellipse point, or the fourth ellipse point. This may be conducted, in a particularly advantageous manner, by a parallel systolic Hough transform. The Hough transform may be configured for circular curves, and may be adapted, in this context, to the search for extreme values, i.e. for identifying those points which are located farthest in a specific direction.

FIG. 6 shows a particularly advantageous means for performing a Hough transform. The means 600 for performing a Hough transform here comprises a plurality of stages 610 connected in series, by means of which several signals 612, 614, 616 are passed on in parallel. For each signal, a stage contains either a delay element 620, also designated by A, or a bypass 624, also designated by B. In addition, the signals at the output of a stage are supplied to a summing component 630, also designated by C. The summing component is advantageously implemented to establish how many signals are active at the same time at the output of the respective stage. A so-called sum of lines is present at an output 632 of a summing component 630, said sum of lines indicating the number of signals which are active at the same time at the output of the respective stage. The sum of lines 632 may then be supplied to a comparator 634, which compares the sum of lines 632 with a predefined threshold value. If the sum of lines 632 exceeds the predefined threshold value, this will mean that at least a predefined number of signals are active at the respective stage. In other words, a "straight line" is present, at least approximately, at the respective stage, said straight line being characterized in that at least a predefined number of signals of the respective stage are active at the same time. Subsequently, an output signal of the comparator 634 is supplied to a delay element 636. Several delay elements 636, each of which is connected to an output of a comparator 634 of a stage 610, are cascade-connected such that the output signal of a delay element 636 is supplied to the input of a subsequent delay element 636.

It shall further be noted that the delay elements 620, 636 operate in a clocked manner, so that both the signals 612, 614, 616 and the output signals of the comparators 634 are passed on in a clocked manner. The signals 612, 614, 616 and the output signals of the comparators 634 are passed on in parallel, in terms of their structure, and in the same direction, however the signals 612, 614, 616 being delayed to different degrees at the individual stages, depending on whether a delay element 620 or a bypass 624 is used for passing on the signal 612, 614, 616 at a stage 610. However, it is advantageous that a central signal of the plurality of signals 612, 614, 616 be forwarded, through the plurality of stages, as fast as the signals from the outputs of the comparators 634. Advantageously, the central signal is delayed by the same amount at each of the stages, and the output signals of the comparators 634 are also advantageously forwarded through the stages with a constant delay. The central signal is advantageously located approximately half way between the first signal 612 and the last signal 614, thus describes a raster line in the middle of the image section supplied to the Hough transform means 600, or is spaced apart from the center of the image section by a maximum of 25% of a width of the image section. The width of the image section is defined by the number of raster lines or raster columns which are supplied to the Hough transform means 600 at the same time.

On the basis of the structural description, the mode of operation of the pattern detection means 600 will be described in more detail below. It shall be assumed that an image section is supplied to the Hough transform means 600 in the form of parallel time signals 612, 614, 616. The delay elements 620 or the bypasses 624 are configured such that different time signals 612, 614, 616 are delayed by various degrees when they pass through the individual stages. By switching on delay elements 620 or bypasses 624, the delays are set such that a bent course of curve (advantageously a circular bent course of curve) is unbent after passing through one stage or several stages 610. In other words, a bent course of curve in the image section processed by the Hough transform means results in that the individual signals 612, 614, 616 are active at different points in time. However, suitably setting the delay elements 620 or the bypasses 624 may achieve that signals 612, 614, 616 pass through the individual stages at different speeds, so that ideally, any forwarded signals which are based on the signals 612, 614, 616 will be active at the output of a stage at the same time once a specific number of stages 610 have been passed through. In this case, a particularly large sum of lines occurs at the specific stage, said sum of lines being calculated by the respective summing means 630. An occurrence of such a large sum of lines may result in that the comparator 634 of the respective stage outputs an active signal which in turn is forwarded, via the cascade of delay elements 636, to the output 640 of the Hough transform means. Thus, a location of a course of curve in the image section which is input to the Hough transform means 600 in the form of time signals 612, 614, 616 may be inferred from a temporal position of an activity on the output signal at the output 640 of the Hough transform means 600.

It shall also be noted that it is advantageous that a predefined signal (also referred to as a central signal) among the signals 612, 614, 616 pass through the stages 610 of the Hough transform means 600 as fast as an output signal from the outputs of the comparators 634 which is forwarded by the chain of delay elements 636. In other words, at least one of the input signals 612, 614, 616 propagates in parallel and at the same speed as the output signals of the comparators 634. In this manner, one may achieve that the output signal which is present at the output 640 of the Hough transform means 600 and which is based on the signals of the comparators 634 which are forwarded in the cascade of delay elements 636, bears a direct statement on the point in time of the occurrence of a bent line segment in the input signals 612, 614, 616. In this context, the point in time of the occurrence of an activity on the output signal at the output 640 of the Hough transform means 600 provides a statement on the point in time when a bent course of line was input into the Hough transform means in the form of input signals 612, 614, 616. The point in time of the presence of a bent course of line in the signals 612, 614, 616 obviously allows direct conclusions to be drawn as to a spatial locations of the bent course of curve in the raster image underlying the signals 612, 614, 616.

In addition, it shall be noted that with the configuration indicated, wherein at least one of the signals 612, 614, 616 propagates through the stages 610 as fast as the output signals of the comparators 634, the exact shape of the curvature, i.e. the curvature radius, for example, in a bent curve only has an influence as to which of the stages 610 a comparator 634 becomes active in. However, in the configuration shown, the precise shape of the bent course of curve has no influence on the point in time when an activity occurs at the output 640 of the Hough transform means 600.

It may therefore be established that the Hough transform means 600 shown in FIG. 6 is suited to determine the location of a bent course of curve in a raster image in a very efficient manner in that the raster image (or a section thereof) is converted to a plurality of parallel signals which will then pass through several stages of the Hough transform means 600 at different speeds. By forming a sum of columns at the outputs of the stages 610, one may detect when at least a predefined number of signals are active at the outputs of the stages at the same time, which again indicates that the original course of curve has been "unbent".

Advantageously, the Hough transform means 600 is designed, by suitably selecting delay elements 620 or bypasses 624, to unbend any courses of curve which are described by signals 612, 614, 616 and which may approximate the ellipse at the first ellipse point, the second ellipse point, the third ellipse point, or the fourth ellipse point. Also, advantageously, only such courses of curve which may approximate an ellipse at the first ellipse point, the second ellipse point, the third ellipse point, or the fourth ellipse point will be unbent. Thus, the Hough transform means 600 of FIG. 6 is suited to identify the first bent line segment, the second bent line segment, the third bent line segment, or the fourth bent line segment. The point in time when an output signal is present at the output 640 of the Hough transform means 600 describes a location of the identified course of curve in the raster image on which the signals 612, 614, 616 are based, i.e. a parameter of the first bent line segment, the second bent line segment, the third bent line segment, or the fourth bent line segment.

Figure 7A:
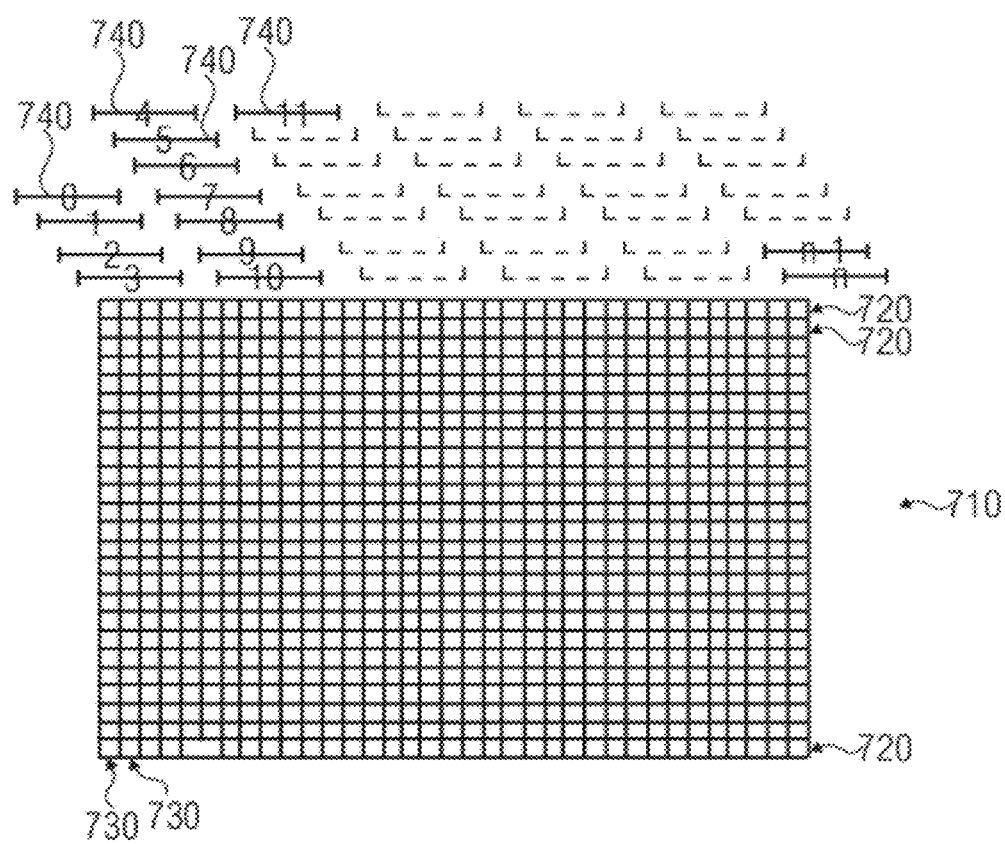
FIG. 7a shows a graphical representation of a procedure for moving a graphic image through the pattern detection means in accordance with FIG. 6.

FIG. 7a shows a graphical representation of an approach of moving a graphic image through a pattern detection means. Specifically, FIG. 7a shows moving an image or raster image through the Hough transform means 600 shown in FIG. 6 (also referred to as a Hough array) on a column-by-column basis.

FIG. 7a shows a raster image 710 consisting of a plurality of raster lines 720 and a plurality of raster columns 730. What is also shown are groups 740 of advantageously five raster columns 730 each, it being assumed that five raster columns in each case being supplied, at the same time, to the Hough transform means 600 in parallel in the form of signals 612, 614, 616. For further details, reference shall be made to the graphical representation 300 of FIG. 3.

Figure 7B:
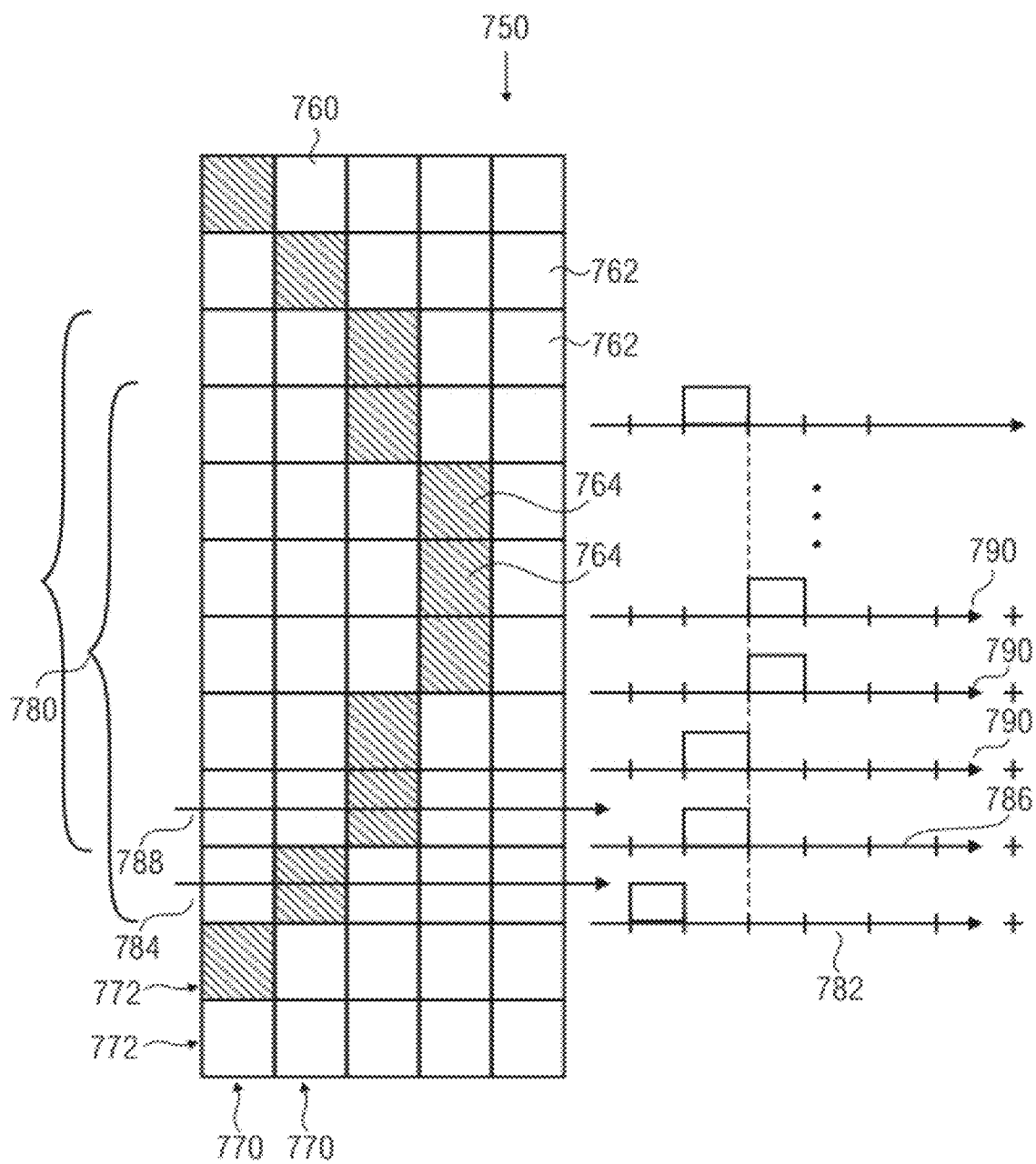
FIG. 7b shows a graphical representation of time signals which result during the conversion of a raster image to parallel time signals.

FIG. 7b shows a graphical representation of time signals which are formed during a conversion of a raster image to parallel time signals. The graphical representation of FIG. 7b is designated by 750 in its entirety. The graphical representation 750 shows a raster image 760 comprising a plurality of inactive raster points or image points 762 and a plurality of active raster points or image points 764 which are marked by hatching. The active raster points or image points 764 advantageously describe a course of curve. As was already described above, the raster image 760 comprises a plurality of raster lines 770 and a plurality of raster columns 772. It is also assumed that time signals are formed on the basis of an image section 780 comprising a group of seven raster columns. For example, a first time signal 782 is associated with a first raster column 784 contained within the group 780 of raster columns. The time signal 782 here is formed by scanning the raster image 760 along the associated raster column 784 on a line-by-line basis. Similarly, a second time signal 786 is formed by scanning the second raster column 788 among the group 780 of raster columns on a line-by-line basis. Observation of the time behaviors clearly shows that in the scanning direction described, active raster points located in the same raster line of the raster image 760 result in simultaneous activity pulses on the time signals 782, 786, 790. A horizontal line, that is, a line extending within a raster line, thus becomes noticeable in the time signals 782, 786, 790 by simultaneous pulses on the time signals 782, 786, 790.

If it is assumed that the time signals 782, 786, 790 are supplied to a Hough transform means 600 as input signals 612, 614, 616, and that the signals 612, 614, 616 are delayed to different degrees at individual stages 610 of the Hough transform means 600, it becomes clear that the delay of the time signals 782, 786, 790, which is effected to varying degrees, corresponds to a distortion of the raster image 760, as a result of which a bent course of curve may be bent into a straight line. However, a straight line which corresponds to simultaneous activity of several of the time signals 782, 786, 790 may be detected in the Hough transform means 600, as was described above.

Figure 8:
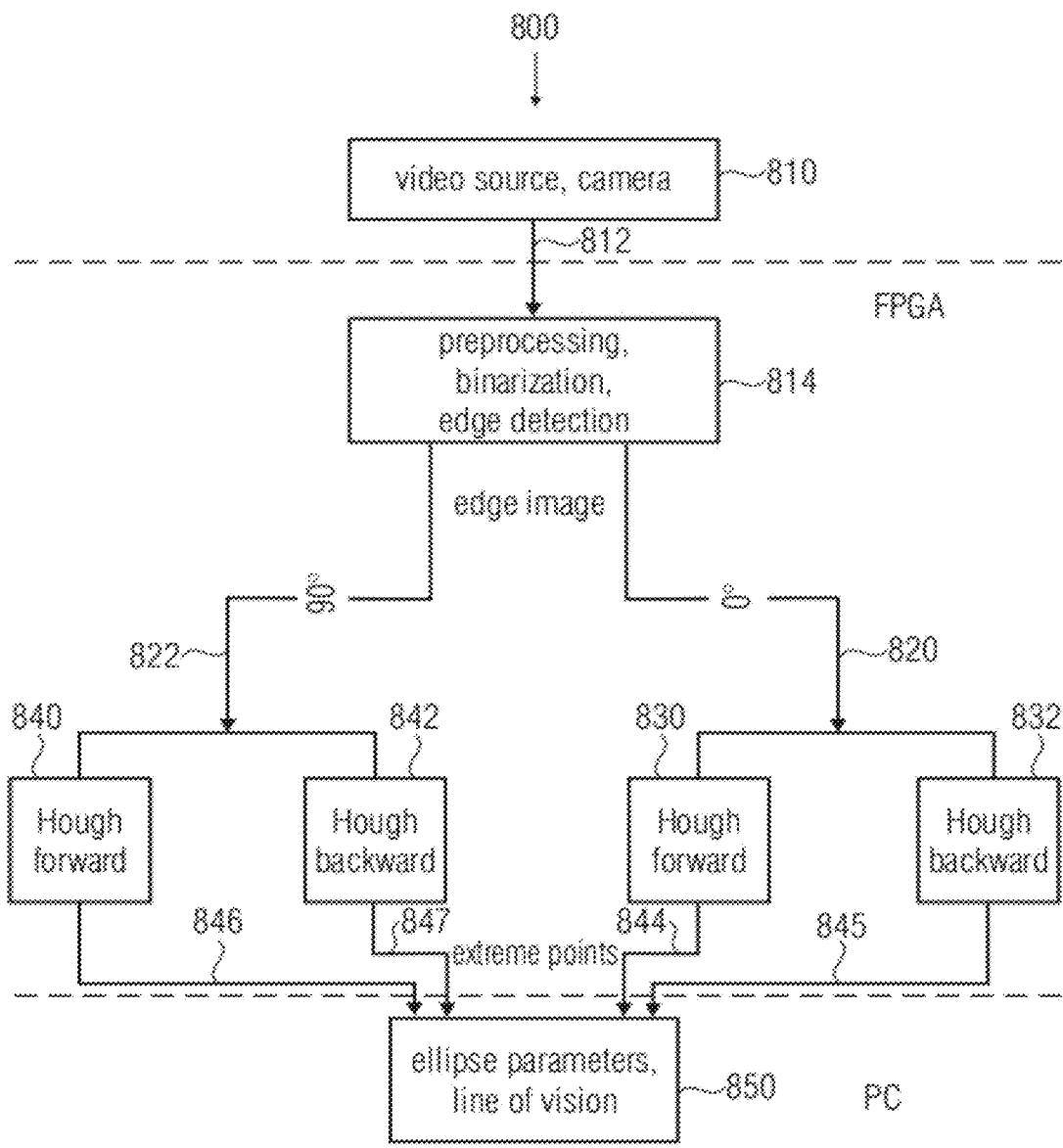
FIG. 8 shows a block diagram of an inventive device for determining information about a shape and/or a location of an ellipse in a graphic image in accordance with a third embodiment of the present invention.

FIG. 8 shows a block diagram of an inventive device for determining information about a shape and/or a location of an ellipse in the graphic image in accordance with a third embodiment of the present invention. The inventive device of FIG. 8 is designated by 800 in its entirety and is implemented to determine, on the basis of a graphic image 812 supplied by a video source or a camera 810, a line of vision of a human being or an animal. The video source 810, which comprises a camera, for example, provides video data 812 to a preprocessing means 814. The preprocessing means 814 may be integrated in a field programmable gate array (FPGA) of its own or in an application specific integrated circuit (ASIC). However, the preprocessing means 814 may also be accommodated within a single FPGA along with the Hough transform means, or Hough arrays, which will be described below. The preprocessing means 814 is advantageously implemented to convert the video data 812 to edge images by means of threshold-value binarization for producing binary images, and by means of subsequent edge extraction from the binary images resulting from the threshold-value binarization. The edge extraction from the binary images may be conducted on the basis of dilation (extension) and subtraction, which results in binary edge images. In other words, the preprocessing means 814 may be implemented to compare, for example, a brightness and/or a gray level of the video data with a threshold value, and to produce, on the basis of the comparison result, a binary image which makes a distinction between bright or dark image areas only. An extended or compressed version of the binary image may then be produced from the binary image, whereupon a difference is determined between the original binary image and the extended or compressed binary image. The difference may then be used for producing the edge image, which describes edges in the video data 812.

After having been pre-processed in the preprocessing means 814, the edge image advantageously is available for further processing in a first direction and in a second direction perpendicular thereto. However, the edge image may nevertheless be stored in a single memory which enables access to the edge image along a first direction and along a second direction orthogonal thereto. Processing of the edge image in the first direction may signify column-by-column processing of the edge image, for example, whereas processing in the direction orthogonal thereto may signify line-by-line processing of the edge image. The edge image which is present for processing in the first direction is designated by 820, whereas the edge image present for processing in the direction orthogonal thereto is designated by 822. The edge image 820 present for processing in the first direction is subsequently supplied in parallel to a first Hough transform means 830 (also referred to as a Hough array) implemented to detect a bent course of curve of a first direction of curvature. The edge image 820 is further supplied to a second Hough transform means 832 implemented to detect a bent course of curve of a second direction of a curvature, which is opposite to the first direction of curvature.

The two Hough transform means 830, 832, however, may also be designed in the same manner, in which case the edge image is supplied to the first Hough transform means 830 while starting at a first edge, and in which case the edge image is supplied to the second Hough transform means while starting at a second edge, the first edge being opposite the second edge. For example, if the edge image 820 is supplied, on a line-by-line basis, to the first Hough transform means 830 while starting with the first raster line, the edge image 820 may be supplied, on a line-by-line basis, to the second Hough transform means 832 while starting with the last raster line.

The two Hough transform means 830, 832 are implemented to identify such bent line segments in the edge images 820 which approximate an ellipse in the video data 810 at the first ellipse point, the second ellipse point, the third ellipse point, or the fourth ellipse point. In addition, the Hough transform means 830, 832 are implemented to identify the coordinates of the associated ellipse points on the basis of the identified bent line segments. Similarly, the edge image 822 present for processing in the second direction is supplied to a third Hough transform means 840 and to a fourth Hough transform means 842, the third Hough transform means 840 corresponding, in terms of its fundamental mode of operation, to the first Hough transform means 830, and the fourth Hough transform means 842 corresponding, in terms of its fundamental mode of operation, to the second Hough transform means 832. Thus, the first Hough transform means 830, the second Hough transform means 832, the third Hough transform means 840, and the fourth Hough transform means 842 provide the coordinates 844, 845, 846, 847 of the first ellipse point, of the second ellipse point, of the third ellipse point, and of the fourth ellipse point.

It shall be noted that the four Hough transform means 830, 832, 840, 842 are advantageously implemented in an FPGA, as will be described later on. An ellipse calculation means 850, which is advantageously implemented in a personal computer (PC), is further implemented to calculate the ellipse parameters on the basis of the coordinates 844, 845, 846, 847 of the first ellipse point, of the second ellipse point, of the third ellipse point, and of the fourth ellipse point. Thus, additionally, the line of vision of the human being or animal observed by the video source 810 may be calculated from the ellipse parameters.

In other words, the binary images 820, 822, which are rotated relative to each other by 90°, pass into the Hough arrays 830, 832, 840, 842, wherein all four types of extreme points, i.e. four specific ellipse points, are searched for. Subsequently, the ellipses, or their parameters, are calculated, for example in a personal computer, from the extreme points, i.e. from the first ellipse point, the second ellipse point, the third ellipse point, and the fourth ellipse point, and the line of vision of the human being or animal is determined therefrom.

Incidentally, it shall be noted that, as was already explained above, the coordinates 844 of the first ellipse point and the coordinates 845 of the second ellipse point possibly suffice to calculate at least the coordinates of the center of the ellipse to be determined. Therefore, calculation of the edge image 822, which is rotated by 90°, may possibly be omitted, as a result of which the third Hough transform means 840 and the fourth Hough transform means 842 may also be saved.

In addition, at least the fourth Hough transform means 842 may be saved even if all of the ellipse parameters are to be calculated, since the coordinates of three extreme points of the ellipse are sufficient for such a calculation.

In addition, it shall be noted that the preprocessing unit may be varied as desired, as long as it is ensured that an edge image may be supplied to the Hough transform means 830, 832, 840, 842. In addition, processing, which is shown as being parallel here, may also be conducted sequentially, provided that there is sufficient time available.

Figure 9:
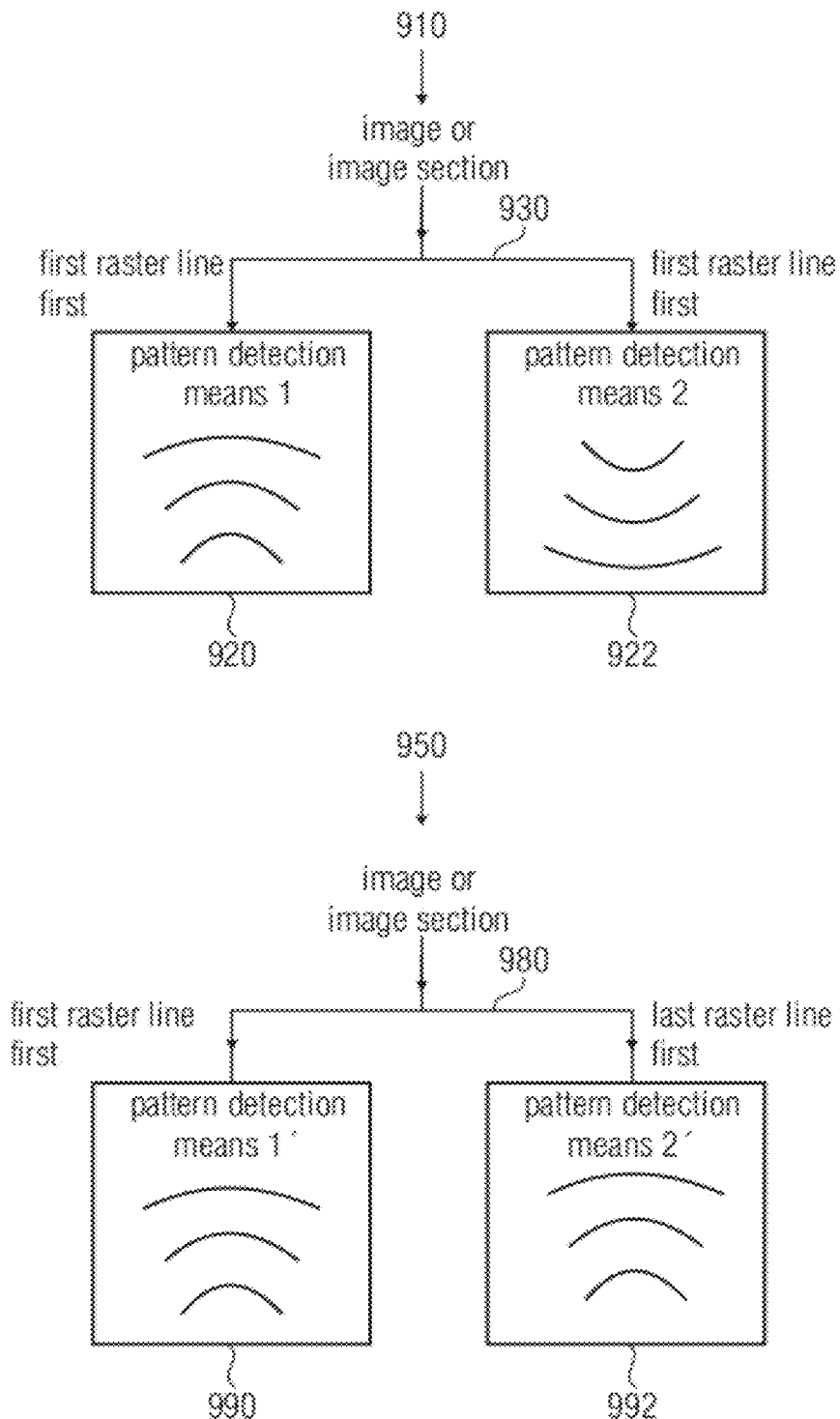
FIG. 9 shows a section of a block diagram of an inventive device for determining information about a shape and/or a location of an ellipse in a graphic image in accordance a fourth embodiment of the present invention.

FIG. 9 shows a section of a block diagram of an inventive device for determining information by a shape and/or a position of an ellipse in a graphical image according to a fourth embodiment of the present invention. Here, in a section 910 of a block diagram, FIG. 9 shows a possibility for identifying bent line segments having a different direction of curvature using two different pattern detection means 920, 922. The first pattern detection means 920 is implemented here to detect bent courses of curve of a first direction of curvature, while the second pattern detection means 922 is implemented to detect bent courses of curve of a second direction of curvature, wherein the second direction of curvature is opposite to the first direction of curvature. An image or an image section 930 may here be supplied to both pattern detection means 920, 922 in the same way. In other words, the first image section 930 is supplied to the pattern detection means 920 as an image such that the first raster line is supplied first. The image or the image section 930 is supplied to the second pattern detection means 922 also such that the first raster line is supplied first. The application of the first pattern detection means 920 and the second pattern detection means 922 may here be executed simultaneously or one after the other. It is further noted that, with regard to the block diagram 910, the term raster line may also be replaced by the term raster column.

A second block diagram 950 shows a second possibility for detecting bent courses of curve of a different curvature direction in an image or an image section 980. Here, for example, the image or the image section 980 may be supplied to the first pattern detection means 990 beginning with a first raster line. Further, the image or the image section 980 of a second pattern detection means 992 may be supplied beginning with the last raster line. The two pattern detection means 990, 992 are here both implemented to only detect bent courses of curve of a first curvature direction. By supplying the image or the image section 980 in different directions it may further be achieved that the first pattern detection means 990 detects a bent course of curve in the image section comprising the first curvature direction in the original image while, further, the second pattern detection means 992 may detect a bent course of curve in the original image or image section 980 comprising a second curvature direction opposite to the first curvature direction in the original image. It is further noted, that two separate pattern detection means 990, 992 are not required if the image or the image section 980 is, for example, supplied to the first pattern detection means 990 one after the other first beginning with the first raster line and then beginning with the last raster line. The second pattern detection means 992 may in this case also be omitted.

It is to be noted that, the described embodiments according to the block diagrams 910 and 950 may, for example, be used in the device 800, depending on which realization is thought to be advantageous.

In the following, the determination of the ellipse parameters from the coordinates of the first ellipse point, the second ellipse point and the third ellipse point will be described in more detail. It is noted here, that in the following the first ellipse point, the second ellipse point and the third ellipse point are also referred to as "extreme points or turning points".

In a first step, here the coordinates $(x_m, y_m)$ of the ellipse center 240 may be calculated from the coordinates of the first ellipse point and the second ellipse point. It is to be noted here, that in the following the definition of the graphical representations 200, 250 of FIGS. 2a and 2b are used, which were already explained in more detail before. It is further noted that, due to the symmetry of the ellipse, the center point lies exactly in the center between two opposite extreme points or turning points, respectively, as it may also be seen from the graphical representation 200 of FIG. 2a. Thus, the following applies:

$$x_m = \frac{x_1 + x_3}{2} = \frac{x_0 + x_2}{2}$$

and $$y_m = \frac{y_1 + y_3}{2} = \frac{y_0 + y_2}{2}.$$

In the following, further the determination of the shape parameters of the ellipse, i.e. the length a of the first semiaxis of the ellipse, the length b of the second semiaxis of the ellipse and the rotational angle $\alpha$ is described.

The determination of the shape parameters from the coordinates $(x_1, y_1), (x_2, y_2), (x_3, y_3), (x_4, y_4)$ of the extreme points is more difficult. Using the known center point $(x_m, y_m)$, the ellipse is first of all shifted into the origin, as was already described with reference to FIG. 2b.

Thus, in the following a rotated ellipse 270 in the coordinate origin 264 is assumed. It has four tangential points with a smallest possible, applied rectangle. Two tangential points each are rotationally symmetric to the coordinate origin. Thus, only the two points 276, 280 in the first quadrant are considered.

The equations (1.1) illustrated in the following describe an ellipse rotated by $\alpha$ in the coordinate origin in the parameter form.

$x = a \cdot \cos\theta \cdot \cos\alpha - b \cdot \sin\theta \cdot \sin(\alpha)$ $y = a \cdot \cos\theta \cdot \sin\alpha + b \cdot \sin\theta \cdot \cos(\alpha)$ (1.1)

Here, x and y are coordinates of ellipse points depending on the parameter $\theta$. The remaining parameters $\alpha$, a and b already have Solving the equation system (1.1) for $\tan(\theta)$ results in:

$$\tan(\theta) = \frac{a}{b} \cdot \frac{y - x \cdot \tan\alpha}{y \cdot \tan\alpha + x} \tag{1.2}$$

From the condition for the extreme value x $$0 = \frac{\partial x}{\partial \theta} = -a \cdot \sin\theta_x \cdot \cos\alpha - b \cdot \cos\theta_x \cdot \sin\alpha \tag{1.3}$$

equation (1.4) may be derived as $$\tan\theta_x = \frac{b}{a} \cdot \tan\alpha \tag{1.4}$$

and from the condition for the extreme value y $$0 = \frac{\partial x}{\partial \theta} = -a \cdot \sin\theta_y \cdot \sin\alpha - b \cdot \cos\theta_y \cdot \cos\alpha \tag{1.5}$$

equation (1.6) may be derived as $$\tan\theta_y = \frac{b}{a} \cdot \frac{1}{\tan\alpha} \tag{1.6}$$

The equations describe the locations of the extreme points depending on $\theta$. In other words, $\theta_x$ and $\theta_y$ describe parameter values for the parameter $\theta$ for the transformed first ellipse point 276 or, respectively, for the transformed third ellipse point 280 with regard to equation (1.1).

Equating equations (1.2) and (1.4) or, respectively, equations (1.2) and (1.6), after the substitutions $$\tan(\alpha) = u, \quad \frac{x_x}{y_x} = k_x \quad \text{and} \quad \frac{y_y}{x_y} = k_y$$

results in:

$$\frac{b^2}{a^2} = \frac{k_x \cdot u - 1}{u^2 + k_x \cdot u} \tag{1.7}$$

and $$\frac{b^2}{a^2} = \frac{k_y \cdot u - u^2}{k_y \cdot u + 1}. \tag{1.8}$$

In the following, the calculation of the rotational angle $\alpha$ is explained. For calculating the rotational angle, the square axial ratio $$\frac{a^2}{b^2}$$

of the ellipse may be eliminated by equating the equations (1.7) and (1.8). This leads to a $4^{th}$-order equation:

$$u^4 + u^3 \cdot (k_x - k_y) + u \cdot (k_x - k_y) - 1 = 0 \tag{1.9}$$

The solutions were found using the computer algebra program Maple. Two of the four solutions of equation (1.9) are imaginary. The two other solutions are $u_1$ and $u_2$:

$$u_{1,2} = -\frac{1}{2} \cdot (k_x - k_y) \pm \frac{1}{2} \cdot \sqrt{(k_x - k_y)^2 + 4} \tag{1.10}$$

After back-substitution, the two solutions for $\alpha$ are different by exactly 90°, as an ellipse which is rotated by 90° is equal to a non-rotated ellipse having a reciprocal axial ratio. By case differentiation, the right solution may be determined:

If $x_x$ and $y_y$ have the same sign, the following applies:

$$u = -\frac{1}{2} \cdot (k_x - k_y) + \frac{1}{2} \cdot \sqrt{(k_x - k_y)^2 + 4} \tag{1.11}$$

If they have different signs, the following applies:

$$u = -\frac{1}{2} \cdot (k_x - k_y) - \frac{1}{2} \cdot \sqrt{(k_x - k_y)^2 + 4} \tag{1.12}$$

Now, using the known rotational angle, the axial ratio $$\rho = \frac{a^2}{b^2}$$

may be determined from equation (1.7) or equation (1.8).

In the following, a calculation of the length of the semiaxes is described.

Up to now, the rotational angle $\alpha$ and the axial ratio $\rho$ have been determined. For calculating the length of the semiaxes, now again the ellipse equation has to be used. Here, from the locations of the extreme points $\theta_x$ and $\theta_y$, the following equation system results:

$$x_x = a \cdot \cos(\theta_x)\cos(\alpha) - b \cdot \sin(\theta_x)\sin(\alpha)$$

$$x_x = a \cdot \cos(\theta_y)\cos(\alpha) - b \cdot \sin(\theta_y)\sin(\alpha) \tag{1.13}$$

From this, by expansion and subtraction, a may be eliminated:

$$x_x \cdot \cos\theta_y - x_y \cdot \cos\theta_x == b \cdot \sin\alpha \cdot (-\cos\theta_y \cdot \sin\theta_x + \cos\theta_x \cdot \sin\theta_y) \tag{1.14}$$

By inserting (1.4) and (1.6) into (1.14), $\theta_x$ and $\theta_y$ may be eliminated. What remains is an expression for the semiaxis b which depends on the rotational angle α, the axial ratio ρ and the x coordinates of two extreme points:

$$b = \frac{\rho \cdot \tan \alpha \cdot \left( x_x \cdot \sqrt{\frac{\rho^2 + \tan^2 \alpha}{\rho^2}} \right) - x_y \cdot \sqrt{\frac{\rho^2 \cdot \tan^2 \alpha + 1}{\rho^2 \cdot \tan^2 \alpha}}}{\sin \alpha \cdot (\tan^2 \alpha + 1)} \quad (1.15)$$

From the axial ratio ρ and the semiaxis b, the missing semiaxis a may easily be calculated:

$$a = \rho \cdot b \quad (1.16)$$

In the following, the problem of overdeterminacy of the equation systems when calculating the ellipse parameters is assessed. Here, first of all the problem per se is illustrated. It is further described how the overdeterminacy may be used to increase the reliability of the inventive device or the inventive method, respectively.

Having found four extreme points, the ellipse is overdetermined. For determining the five parameters of the ellipse, only 5 coordinates of the four possible extreme points (8 coordinates) are needed. Thus, only "2.5 ellipse points" may be used.

Two opposite extreme points are needed for determining the center point. It has been found by experiments that for an ellipse according to FIG. 2b the following equation applies:

$$1 = \frac{y_y}{y_x} \cdot \frac{x_y}{x_x} \quad (1.17)$$

That means, for determining all four values $x_x$, $x_y$, $y_x$ and $y_y$, three measured values are sufficient. Two of those are inevitably known from determining the center point. A further coordinate of a third point then has to be used for determining the remaining ellipse parameters.

For example, point 1 and point 3, i.e. the first ellipse point 226 and the second ellipse point 228, are used for determining the center point 240. $x_3$-$x_m$, after shifting into the coordinate origin becomes $x_x$, and $y_3$-$y_m$ becomes $y_x$. $x_x$ and $y_x$ thus describe an extreme value in the x direction. From a further coordinate of the extreme point in the y direction, by equation (1.17) the fourth value may be determined.

The measurement values, i.e. the coordinates of the extreme points provided by the coordinate determination means, are not exact. Thus, they do not easily fulfill equation (1.17). If, instead of the calculated value, the measured value (i.e. the one provided by the coordinate determination means) is used for the calculation of the ellipse parameters without considering equation (1.17), there is a risk of obtaining wrong results from slightly erroneous measurement points. As it is assumed when deriving the ellipse parameters that an ellipse actually exists, the values (also the coordinates used in the calculations) have to come from "real" ellipses, i.e. equation (1.17) has to be fulfilled by the coordinates provided by the coordinate determination means (at least approximately) (as long as the coordinates provided by the coordinate determination means are all based on points belonging to one single ellipse).

In the following it is explained how the above-described overdeterminacy may be used.

The distance between a value (for a coordinate of the third ellipse point 280) calculated (using formula (1.17)) and a measured value (i.e. provided directly by the coordinate determination means) may be used for assessing a found ellipse. It may be guaranteed that the three extreme points come from an ellipse in the input image.

If four points are available, the calculation of the ellipse parameters may be executed using three each (or all in all 5 coordinates). From four points, for example, three different amounts having three points are to be formed. The parameters of the four ellipses calculated therefrom may be averaged to overcome the overdeterminacy in the presence of four points.

In summary it may be said that, based on the above-described concept, a real-time capable ellipse detection may be realized on the basis of the Hough transform. In a first step, here extreme values or extreme points, respectively, of the ellipse (also referred to as the first ellipse point, second ellipse point, third ellipse point and fourth ellipse point) are determined. With the help of a parallel Hough transform or other methods of pattern recognition, or detection, also distinctive points of the ellipse in an image are searched for, from the position of which it is possible to exactly determine the ellipse parameters (i.e. the center point described by the coordinates (xm, ym), the semiaxes a and b and the rotation α) or functions of the ellipse parameters like, e.g., $$\frac{a}{b}.$$

Distinctive points of the ellipse are the x and y coordinates of the extreme values or extreme points, respectively, in the positive and negative x direction and in the positive and negative y direction of the edge image. The mentioned extreme points are, for example, illustrated in the graphical representation 200 of FIG. 2a.

For a clear determination of the ellipse parameters, exactly two extreme points of one direction and a further coordinate of a third extreme point have to be known. It is, for example, sufficient if coordinates $(x_0, y_0)$ and $(x_2, y_2)$ and one of the coordinates $x_1$ or $y_1$ or $x_3$ or $y_3$ are known. It is also sufficient if the coordinates $(x_1, y_1)$ and $(x_3, y_3)$ and one of the coordinates $x_0$ or $y_0$ or $x_2$ or $y_2$ are known. In mathematical notation, this may be expressed as follows:

$$((x_0, y_0) \text{ and } (x_2, y_2) \text{ and } (x_2 \text{ or } y_2 \text{ or } x_3 \text{ or } y_3)) \text{ or}$$

$$((x_1, y_1) \text{ and } (x_3, y_3) \text{ and } (x_0 \text{ or } y_0 \text{ or } x_2 \text{ or } y_2))$$

have to be known for a determination of the ellipse parameters.

If more information (i.e. more coordinates) is available, the ambiguity of the calculation may be removed by suitable methods, like, e.g., minimizing errors. If more points are known than may be used, further using 2.5 each of the (maximum) four known points, several ellipses may be calculated. The parameters of these ellipses are averaged and result in the parameters of the resulting ellipse. In other words, 5 parameters each (of "2.5 points") may be used to calculate several sets of ellipse parameters. Thereupon, averaging may be executed across the several calculated sets of ellipse parameters.

The determination of the extreme points may also be regarded as a search for extreme values. The search for extreme values may be executed by the search for circle curves having different radii, describing the ellipses (and/or the ellipse searched for) around the extreme points in a sufficient approximation. The search for circle curves is then, for example, executed in a positive and negative x and y direction, i.e., for example, in all four standard directions of a rastered image. Here, in every direction, the image is analyzed in overlapping strips and/or image sections.

A method which is especially suitable is the above-described parallel, systolic Hough transform. The parallel, systolic Hough transform is configured for circle curves and adapted for an extreme value search. On average in every clock, the votes of n edge points are formed by an array of delay elements connected in series in columns (delay elements) A from the line sums C, while the edge points (the points of the edge image) are shifted through. In other words, in a $n^{th}$ stage of the Hough field "Hough array", thus a line sum may be formed, while the points of the edge image are shifted through the $n^{th}$ stage. Each image point is incrementally shifted through to the next delay element considering the switched bypasses B. Each column generates a vote determined before by the connection of the bypasses B in a number of clocks. The votes here indicate on which circle curves the point which is shifted through may be positioned. The votes coming from the columns, added up in each clock, result in an accumulator column.

An entry into the accumulator may be omitted if a decision is made by a comparator in each line using a threshold value whether a circle curve was found. If the threshold value was exceeded, in a further delay element column without bypasses a bit is generated at a defined location which is shifted on clockwise with the data.

When leaving the Hough field or Hough array, respectively, i.e. at the output E of the Hough transform means, the formed bits are detected. They give information about a coordinate of a detected circle curve and thus about a coordinate of an extreme point.

For a better understanding one may imagine that, by the different configuration of the bypasses of the delay elements in each column, a circle curve shifted line by line at F into the Hough transform means 600 becomes one single straight line in a certain line of the field (array), which results in a (detectable) maximum line sum.

To find all circle curves or extreme values, respectively, or extreme points, every image column and every image line has to be shifted forward exactly once and shifted backward exactly once through each column of the field (array), wherein its image columns are only shifted through the field (array) together with their neighbors. FIG. 7a shows shifting an image through the field (array) in one direction column by column. Here, for example, five adjacent image columns are shifted through simultaneously.

Instead of using a field (array) and using it for all four directions, two or four fields (arrays) may be used. If two fields (arrays) each are configured such that they transform and/or detect circle curves having a reversed curvature than the two other fields (arrays), the (image) data only have to be shifted through the fields (arrays) forward, i.e. each from the original image and the image rotated by 90 degrees. In the above-described way, then the coordinates of the extreme points may be determined. The usually few extreme points existing in one image, whose coordinates thus only form a small amount of data, have to be associated with individual ellipses in a further step. This may, e.g., be executed by a personal computer or a microcontroller. Due to the small amount of data after extreme value detection (i.e. after determining the coordinates of the extreme points), here no high requirements result. The inventive concept here has the advantage that the processing time is independent of an image content. Further, the ellipse parameters may be calculated from only few extreme values. This calculation of the ellipse parameters from the extreme values may be executed extremely fast and easily be realized in hardware, e.g. using an FPGA or an ASIC.

In the following, the concept of traffic sign detection is briefly summarized again. In this respect, it is to be noted that traffic sign detection in its first steps is similar to the identification of an ellipse which was described with reference to FIGS. 1 to 9. Here, the parameters, like, for example, a threshold value for binarization or a threshold value for a minimum number of image points belonging to a corresponding course of curve, may be set.

Traffic sign detection is executed step by step as follows:
1. Record an image using a camera;
2. Set a threshold value; binarization (advantageously adaptively according to histogram distribution of the gray levels); with video, advantageously readjust more often after x image frames, or set an optimum threshold for every image; standard image processing;
3. Find contour; contour-finding algorithm advantageously consists of morphologic operators, but is in principle an edge detection algorithm;
4. Hough transform; using a software for executing a Hough transform, extremes in an image are found and marked; each extreme (value) is advantageously indicated using an x,y position and has an additional curvature value; clouds of extreme values generated may be more or less dense, depending on the variation of parameters of the software for executing the Hough transform;
5. Classification using the Hamilton variation calculation; minimizing an integral according to min (integral $x\_i-t\_j)^2$;

For the example of the ellipse, the classification is executed as follows:

Set up a list of all possible four-point pairs; fit an ellipse for every combination of four, determine the ellipse parameters and form the deviation of the measurement points from the fitted ellipse; with regard to the minimum deviation, set up a decreasing list of the combination of four;
6. Traffic signs are round, triangular or rectangular or have another shape which does not fall into this category (e.g. stop sign).

This is the main principle of curve sketching. This function may be approximated by a node and second derivation. This only holds true in a digital case with limitations. Vertical and horizontal lines are found. Also circles are no problem. With straight lines of a different slope, a conventional method does not function well. Here, advantageously a Hough line finder is used, as it is, for example, described in the publication "A neural net for 2D slope and sinusoidal shape detections" by A. Bruckmann, F. Klefenz and A. Wünsche (published: International Scientific Journal of Computing, Vol. 3, Edition 1, Ukraine, 2004, p. 21 to 26).

Thus, advantageously a complete computational neuroscientific Hubel-Wiesel solution of an orientation selectivity is achieved (computational neural science Hubel-Wiesel solution of an orientation selectivity).
7. Form an amount of templates or masters, respectively, in a contour description language (see publication "Object detection by contour segment networks" by V. Ferrari et al., published: European Conference of Computer vision (ECCV), Graz, May 2006).

Example: round sign, x,y coordinates, with a curvature radius z, is found.

Example: triangle, square:

Form all triple combination pairs from the straight elements. Form a minimum after variation calculation. If 45° triangles are present, in a tolerance range two straight Hough lines of an inclination of +45° and/or −45° and a horizontal line have to exist.

As also a circle touches a square at four points, determine a minimum of all distances (fit circle—contour point); decision whether circle or ellipse.

General method: if an object consists of lines and arcs of a circle, describe how the object is put together. Example: corner; line upwards, y centimeters, line downwards, x centimeters; curvature arc with curvature radius.

Shift this template in different directions across marked points; form a minimum of a difference between a template vector and a red point vector (min (template vector—red point vector)); where a best possible match is identified, it is assumed that an object exists.

Thus, a traffic sign is segmented into basic geometrical shapes. Subsequently, the sign is positioned to a standard size and a fixed location and compared to standard signs.

8. For this purpose, a simple correlation algorithm is used pixel after pixel. The algorithm uses both color and also shape.

In summary it is to be noted that the present invention provides an especially reliable concept for detecting traffic signs in an image recorded by a camera attached to a vehicle.

With a comparatively low computational effort, the described concept here enables an especially reliable traffic sign detection.

In the following it is described how characters may be efficiently detected in a traffic sign and used for an identification of the traffic sign.

Figure 28:
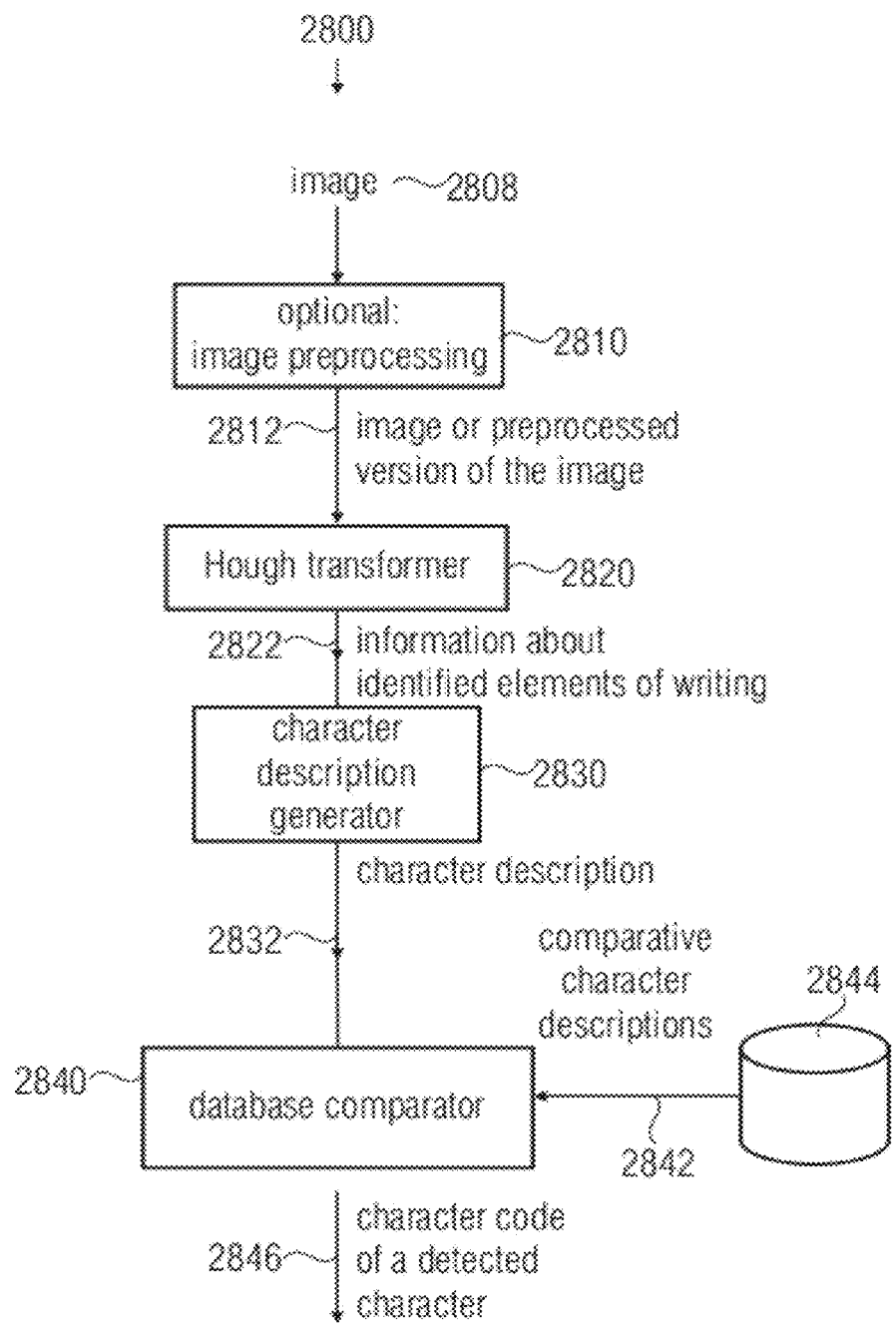
FIG. 28 shows a block diagram of an inventive device for detecting characters in an image in accordance with an embodiment of the present invention.

FIG. 28 shows a block diagram of an inventive device for detecting characters in an image. The device according to FIG. 28 is designated by 2800 in its entirety. The device 2800 is advantageously implemented to receive an image 2808. The device 2800 optionally includes an image preprocessing 2810 implemented to generate a preprocessed version 2812 of the image from the image 2808. The device 2800 further includes a Hough transformer 2820 implemented to receive the image 2808 or the preprocessed version 2812 of the image and to identify elements of writing in the image 2808 or in the preprocessed version 2812 of the image. According to one embodiment of the present invention, the Hough transformer 2820 is implemented to identify arcs of a circle or arcs of an ellipse in the image 2808 or in the preprocessed version 2812 of the image as identified elements of writing.

In another advantageous embodiment, the Hough transformer 2820 is implemented to identify a plurality of straight line sections running from different directions through the image 2808 or through the preprocessed version 2812 of the image as the identified elements of writing.

In a further embodiment, the Hough transformer 2820 is implemented to identify both arcs of a circle or arcs of an ellipse on the one hand and also straight line sections on the other hand in the image 2808 or in the preprocessed version 2812 of the image, respectively, as identified elements of writing. The Hough transformer 2812 is further implemented to provide information 2822 on the identified elements of writing to a character description generator 2830.

The character description generator 2830 is implemented to obtain a character description 2832 describing a position of the identified elements of writing based on the identified elements of writing, i.e. based on the identified arcs of a circle or arcs of an ellipse, and/or based on the identified straight line sections.

A database comparator 2840 is implemented to receive the character description 2832 from the character description generator 2830 and to compare the character description 2832 to a plurality of comparative character descriptions 2842. Advantageously, character codes are associated with the comparative character descriptions 2842, which may, for example, be stored in a database 2844. The database comparator 2840 is implemented to provide a character code 2846 of a detected character between the character description and the plurality of comparative character descriptions.

Based on the structural description of the device 2800 above, in the following the functioning of the device 2800 will be explained in more detail.

In this respect it is to be noted, that the Hough transformer 2820 is advantageously implemented to detect different character and/or elements of writing, e.g. arcs of a circle and/or arcs of an ellipse and/or straight line sections in the image 2808 or in the preprocessed version 2812 of the image. In this respect it is to be noted, that a Hough transformer is able to detect straight or bent lines as a whole due to its functioning, even if the lines are interrupted. Here, it is only useful for the interruptions of the lines not to be too long. This is achieved by a Hough transformer, for example by bending inclined or bent lines into a straight line step by step, wherein the straight line is detected then. A detection of a straight line is typically especially simple, as for detecting a straight line it only has to be checked how many image points exist along a straight line. If the number of image points along a straight line is greater than a predefined minimum number, it may be assumed that a straight line exists, even if not all points along the straight line exist. If, however, less than a predefined number of points along a straight line are present, it may be assumed that no line in present in an image.

A Hough transformer generally speaking is an especially reliable means to detect also non-continuous lines running along a predefined curve (i.e. for example along an arc of a circle, an arc of an ellipse or an inclined line) as a whole, even if short interruptions exist.

Further, due to its operating principle, a Hough transformer provides information at least regarding one location of the identified line-shaped elements (arcs of a circle and/or arcs of an ellipse and/or straight line sections).

The information provided by the Hough transformer typically also includes, in addition to positional information, information about a course of the identified element of writing, for example information about a direction of an identified straight line section or information about a curvature radius of an identified arc of a circle or arc of an ellipse.

It is further noted, that the Hough transformer typically also provides information about an extreme point of an arc of a circle or arc of an ellipse, i.e. about a point which is farthest in a certain direction, in the detection of an arc of a circle or an arc of an ellipse.

In summary, it may generally be noted that a Hough transformer provides a plurality of parameters describing a location of individual elements of writing, wherein elements of writing having short interruptions are described as one single continuous element of writing. Thus, by the use of a Hough transformer, the problem of conventional means for character detection is prevented, that, when the slightest interruptions exist in the typeface, a fragmentation of the characters into a plurality of individual components occurs directly. The use of a Hough transformer, on the contrary, brings a substantial measure of insensitivity against such interferences.

The character description generator 2830 thus receives a description of a very limited number of individual elements of writing from the Hough transformer (arcs of a circle or arcs of an ellipse on the one hand and/or straight line sections on the other hand).

From the limited number of elements of writing identified by the Hough transformer, either describing arcs of a circle to which a certain sufficient number of image points belong, or describing straight line sections to which a sufficient number of image points belong, the character description generator generates a compact character description describing the identified arcs of a circle or arcs of an ellipse. In other words, by the character description generator 2830 an especially advantageous description of characters is formed, including location parameters and/or further parameters, e.g. curvature parameters with arcs of a circle or arcs of an ellipse and direction parameters with straight line sections. Thus, a character is all in all described by its natural components, i.e. by a sequence of arcs (arcs of a circle/arcs of an ellipse) and/or straight line sections.

The identified basic elements of a font, or writing, thus correspond to a form of description using which a human user might describe a character unknown to him in an efficient way. Thus, the character description 2832 provided by the character description generator 2830 represents an efficient description of a character existing in the image 2808 or in the preprocessed version 2812 of the image, respectively, wherein the description advantageously only includes such elements which are identified by the Hough transformer 2820.

By an adaptation of the Hough transformer to characteristics of different fonts, the inventive device 2800 may thus be adapted to different fonts in a simple and efficient way. If a font for example mainly consists of round elements, as it is the case with German script or some computer fonts, the Hough transformer 2820 may in particular be adapted to the detection of arcs of a circle of different curvature radii, whereby in the information 2822 provided by the Hough transformer 2820 mainly (or, alternatively, exclusively) a description of arc-shaped elements of writing is contained.

If a font is, however, a font which basically includes straight lines, as is, for example, the case with some computer fonts, the Hough transformer 2820 may be implemented to advantageously (or, alternatively, exclusively) detect straight lines of different directions.

Thus, the character description generator 2830 advantageously contains information about the substantial features of the currently processed font. Thus, the character provider 2830 only has to generate a representation of the information 2822 provided by the Hough transformer 2820 which may be processed by the database comparator. By this, the character description generator 2833 may be realized with a comparatively low effort.

As the subsequent database comparison via the database comparator 2840 is based on a description of the basic elements (arcs of a circle/arcs of an ellipse and/or straight line sections), the comparison may also take place in an efficient way. The reason for this is, among others, that typical characters only contain a very limited number of characteristic character elements. Thus, a font may be described by especially few features, for example by the features and/or parameters of the characteristic elements of writing. A low number of elements to be used for the database comparison results in a very efficient realization of the database comparator, whereby the computational power may be kept low and the character detection may take place very rapidly.

Apart from that it is to be noted that the characters may already be narrowed down extremely by the presence of a certain number of different elements of writing. In other words, if a number of different elements of writing is known (arcs of a circle/ellipse and/or straight line section), only a very limited number of characters are possible. By such a pre-selection, the database comparison executed by the database comparator 2840 may be made substantially more efficient than is usually the case.

In summary it may thus be determined, that the device 2800 enables especially efficient character detection due to the fact that only characteristic elements of writing are detected by the Hough transformer, whereby strongly information-compressed information 2822 results, based on which an expressive character description 2832 may be generated with little effort. Thus, a high efficiency results, and further a high reliability of the database comparison executed by the database comparator 2840.

Details with regard to the individual means of the device 2800 are explained more explicitly in the following.

FIG. 29 shows a block diagram of an extended device for detecting characters in an image. The device of FIG. 29 is designated by 2900 in its entirety.

The device 2900 is implemented to receive an image 2908 which basically corresponds to the image 2808. The device 2900 further includes an image preprocessing 2910 which basically corresponds to the image preprocessing 2810. The image preprocessing 2910 includes, in an advantageous embodiment, one or several of the following functionalities: binarization, edge detection, character separation.

The image preprocessing 2910 thus provides a preprocessed version 2912 of the image which basically corresponds to the preprocessed version 2812 of the image.

It is to be noted that the image preprocessing may, for example, be implemented to receive the image 2908, convert the same into a gray level image (as far as the image 2908 is not yet present as a gray level image), and then apply a threshold value to the gray level values. Depending on whether a gray level value of an image point is greater than or smaller than a default or adaptively set threshold value, an associated image point in the preprocessed version 2912 of the image is set to a first value and/or color value or to a second value and/or color value. Thus, for example from the image 2908 an associated monochrome image results.

In an advantageous embodiment, the threshold value used for binarization is set depending on a histogram distribution of gray levels in the image 2908 and/or in a gray level version of the image 2908. In another embodiment, however, also a fixedly predefined threshold value may be used. If a new image is recorded, in an advantageous embodiment the threshold value used for binarization is readjusted.

It is further to be noted, that a binarization may in a further, advantageous embodiment be executed without an intermediate step of converting the image 2908 into a gray level image, if, for example, threshold values are directly applied to the different color intensities.

In a further advantageous embodiment, the image preprocessing 2910 for example includes an edge detection in addition to binarization. By the edge detection, for example edges in the monochrome image generated by the binarization are detected. In other words, transitions between the two colors in the monochrome image are e.g. marked as edges. This is especially advantageous, as a Hough transformer may deal especially well with an edge image.

Apart from that, it is to be noted that the edge detection may also take place directly using the image 2908, i.e., for example without the use of a binarization.

In a further, advantageous embodiment, the image preprocessing 2910 further includes a character separation. Here, individual characters are separated. If, for example, different identified edge comprise a distance which is greater than a predefined distance, it is, for example, assumed that two separate characters exist. It is, for example, advantageous when characters are in principle separated from each other by a minimum distance. Thus, by a character separation, for example from one image a plurality of image sections results, wherein each image section advantageously only includes one individual character.

It is to be noted that different approaches exist for character separation which are not to be explained in detail here.

All in all, by image preprocessing 2910 thus a preprocessed version 2912 of the image 2909 results. The device 2900 further includes a Hough transformer 2920. The Hough transformer 2920 fulfils the same function as the Hough transformer 2820 which was described with reference to FIG. 28. Thus, at the output of the Hough transformer 2920 information about identified elements of writing is available, wherein the identified elements of writing may be arcs of a circle, arcs of an ellipse and/or straight line sections.

The device 2900 further includes a line-of-writing detector 2926. The line-of-writing detector 2926 receives the information 2922 about identified elements of writing provided by the Hough transformer 2920 and is implemented to provide information 2928 about lines of writing in the image 2908 or, respectively, in the preprocessed version 2912 of the image.

The line-of-writing detector 2926 is here implemented to detect, based on the information 2922 on identified elements of writing provided by the Hough transformer 2920, lines in the image, on which an excessively large number of extremes of arcs of a circle or arcs of an ellipse are located and/or on which an especially large number of straight line sections end.

Details with regard to the functionality of the line-of-writing detector 2926 are described later with reference to FIGS. 31 and 32.

Apart from that, it is to be noted that the line-of-writing detector 2926 may optionally also be omitted.

The device 2900 further includes a character description generator 2930 which in its function basically corresponds to the character description generator 2830. The character description generator 2930 is, however, in one advantageous embodiment, in which the line-of-writing detector 2926 is present, configured to use both information 2928 about lines of writing in the image provided by the line-of-writing detector 2926 and also information 2922 on identified elements of writing provided by the Hough transformer 2920 in order to generate a character description 2932.

The character description generator 2930 is here advantageously implemented to generate the character description 2932 so that the character description 2932 describes a relative position of elements of writing described by the information 2922 with regard to the lines of writing described by the information 2928.

Thus, an especially advantageous character description 2932 results, in which the lines of writing to be described in more detail are considered. The corresponding character description 2932 which considers information about the lines of writing 2928, and which indicates the parameters of the identified elements of writing 2922, advantageously in relation to the identified lines of writing, is thus insensitive with regard to a rotation or a dimensional scaling of the characters.

The device 2900 further includes a database comparator 2940 which receives the character description 2932 and with regard to its function basically corresponds to the database comparator 2840 of the device 2800. The database comparator 2940 is thus advantageously coupled to a database 2944 to receive comparative characters 2942. The database comparator 2940 apart from that provides a character code 2946 of a detected character.

In an advantageous embodiment, the device 2900 further includes an optional means 2958 for checking the reliability of an identified character. The means 2958 for checking the reliability of an identified character includes a Euler connectivity number calculator 2960. The Euler connectivity number calculator 2960 either receives the image 2908 or the preprocessed version 2912 of the image and thus provides Euler connectivity number information 2962 including a Euler connectivity number of an image content of the image 2908 or the preprocessed version 2912 of the image. The Euler connectivity number is, moreover, sometimes referred to as the Euler characteristic in the literature and describes a difference between a number of objects in the image (or in the preprocessed version of the image) and a number of holes or enclosed areas in the image. Further details with regard to the calculation of the Euler connectivity number which is executed by the Euler connectivity number calculator 2960 are to be described in the following.

The device 2958 for determining the reliability of the character detection further includes a character examiner 2970 coupled to the Euler connectivity number calculator 2960 to receive the Euler connectivity number 2962. The character examiner 2970 is further coupled to the database comparator 2940 to obtain a comparative Euler connectivity number 2972 belonging to a detected character. The comparative Euler connectivity number 2972 is here provided by the database comparator 2940 based on an entry in the database. The character examiner 2970 is further implemented to provide character reliability information 2974. Here, the character examiner 2970 is advantageously implemented to indicate the high reliability of a detected character when the actual Euler connectivity number 2962 determined by the Euler connectivity number calculator 2960 from the image 2908 or from the preprocessed version 2912 of the image, respectively, corresponds to the comparative Euler connectivity number 2927 taken from the database 2944 which belongs to an identified character. In contrast to that, by the character reliability information 2974, the character examiner 2970 advantageously indicates a low reliability of an identified character when a deviation between the actual Euler connectivity number 2962 and the comparative Euler connectivity number 2972 exists.

In the following, a procedure in the detection of characters is explained with reference to FIGS. 30a, 30, 31, 32a, 32b, 32c, 33, 34 and 35.

Figures 30A, 30B:
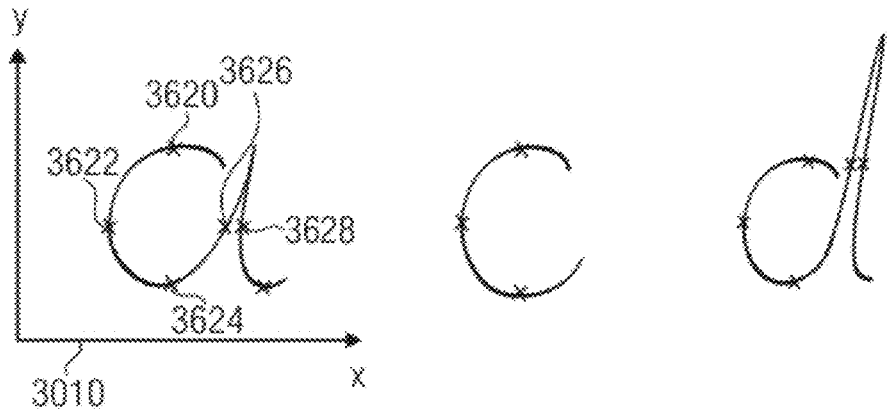
FIG. 30a shows a graphical representation of three characters "a" "c" "d"
FIG. 30b shows a representation of a character description of the character "a"

FIG. 30a in this respect shows a graphical representation of three characters "a" "c" "d". In the characters "a" "c" "d" here, for example, extreme points of arcs of a circle or arcs of an ellipse, respectively, are indicated as well as center points of straight line sections. The mentioned points are designated by "x". It is to be noted that an extreme point of an arc is a point of the arc which is farthest in a predefined direction. If it is assumed that the characters are plotted in an (e.g. rectangular) x-y coordinate system, then the extreme points of arcs are, for example, points of the arcs which are farthest in the positive x direction, negative x direction, positive y direction and negative y direction. An x-y coordinate system is, moreover, designated by 3010 in FIG. 30.

Further, an extreme point of a first (upper) arc of the character "a" is designated by 3020. An extreme point of a second left arc is designated by 3622. An extreme point of a third, lower arc is designated by 3624. A center point of a first straight line section is designated by 3626, and a center point of a second straight line section is designated by 3628. It is to be noted that an arc is a section of an at least approximately circular or ellipse-shaped line. In other words, the Hough transformer detects that a course of line of the character "a" is approximated in an environment of the first extreme point 3620 by an arc of a circle or an arc of an ellipse, and that further a course of line of the character "a" is, for example, approximated in an environment of the line center point 3626 by a straight line section.

Just like for character "a", also for characters "c" and "d" corresponding extreme points of approximation circular arcs and/or approximation elliptical arcs as well as center points of approximation line sections are marked by an "x".

FIG. 30*b* shows a tabular illustration of a simple description of character "a". Here, it is assumed that the Hough transformer 2830 of the device 2800 and/or the Hough transformer 2930 of the device 2900 may, for example, identify a location of an extreme point of different curved lines and may further identify a location of a center point of different curved lines.

Thus, for character "a", according to FIG. 30*a* three arcs and two straight line sections are identified. The description of character "a" according to FIG. 30*b* thus includes a description for the three arcs and for the two straight line sections. The first arc around the extreme point 3620 is an arc that is curved downward, so that the associated description, for example, includes an attribute and/or a parameter indicating a downward curvature. Further, the description advantageously includes information about a position of the extreme point 3620. The position may advantageously be indicated by associated coordinates x, y. The description of the first arc around the extreme point 3620 further optionally includes an indication of a curvature radius r of the first arc.

Similarly, a description of a second arc approximating character "a" in a surrounding of the second extreme point 3622 includes information about the fact that the arc comprises a curvature to the right. The description of the second arc may again indicate a position of the second extreme point 3622 in the form of coordinates x, y and optionally information about a curvature radius r of the second arc. A corresponding description may also be given for the third arc approximating the character "a" in a surrounding of the third extreme point 3624, as is illustrated in FIG. 30*b*. It is to be noted, however, that the arcs approximating character "a" at the extreme points 3620, 3622, 3624 may also be described by other parameters.

Apart from that it is to be noted that an extreme is advantageously a local extreme which needs not necessarily be a global extreme.

For the two straight line sections of character "a", for example by the Hough transformer 2820, 2920, information about a direction may be provided. Thus, the description of the first straight line section with the center point 3626 may, for example, indicate that the first straight line section goes to the top right. The description may further optionally indicate the angle under which the line section is inclined as compared to a horizontal. Further, the description may, for example, indicate the position of the center point 3626 of the corresponding line section by the coordinates x, y. Further, the description of the first straight line section may include information about the length of the first straight line section in the form of a parameter 1. Alternatively, however, also other parameters may be used for the description, for example the coordinates of a starting point or an end point.

FIG. 30*b* shows two descriptions of the straight line sections, the first straight line section with the center point 3626 and the second straight line section with the center point 3628. Thus, it may be seen from FIG. 30*b* that, based on the information provided by the Hough transformer 3820, 2920, an efficient description of a character may be generated.

In the following it will be described, how the information provided by the Hough transformer may be further processed for a comparison in the database comparator 2840, 2940, to obtain a more favorable illustration of the information 2822, 2922 about identified elements of writing. It is to be noted, however, that, in a simplified embodiment, the information provided by the Hough transformer 2820, 2920 may also be directly supplied to a database comparator 2840.

Figure 31:
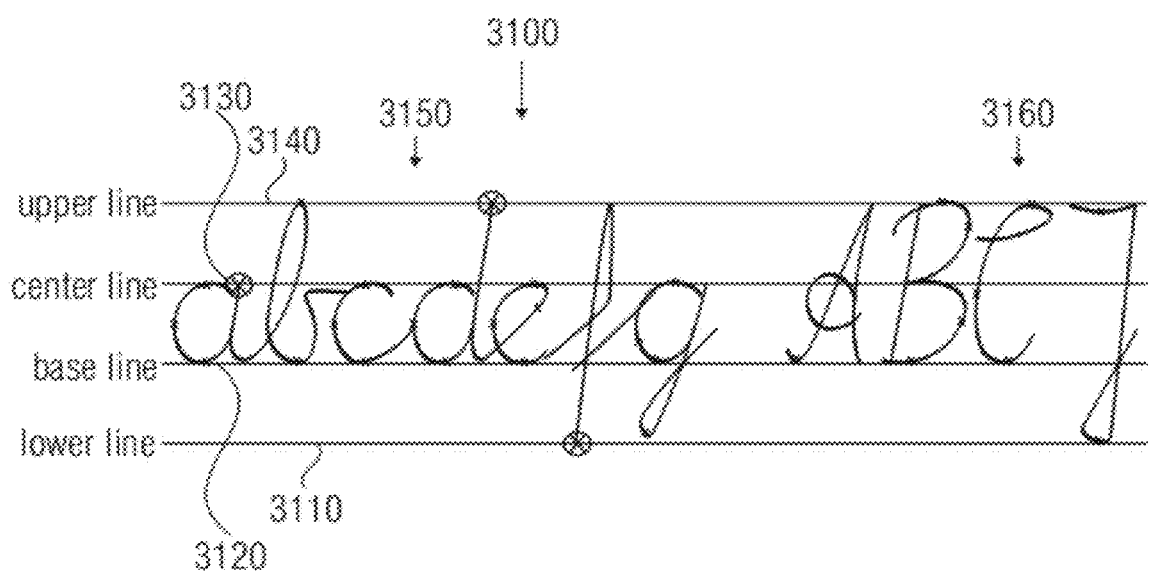
FIG. 31 shows a graphical representation of a sequence of contiguous characters and of a lower line, base line, center line and upper line which occur within the typeface.

FIG. 31 shows a graphical representation of characters in German script and of associated lines of writing. The graphical representation of FIG. 31 is designated by 3100 in its entirety. The graphical representation 3100 shows four characteristic lines of writing, i.e. a lower line 3110, a base line 3120, a center line 3130 and an upper line 3140. Further, the schematic illustration 3100 shows a lettering "abcdefg" 3150 and four capital letters "ABCJ" 3160. From the graphical representation 3100 it may be seen that the lower-case letters "a", "c" and "e" at least ideally lie between the base line and the center line and touch these lines. The lower-case letters "b" and "d" as well as the capital letters "A", "B" and "C" lie between the base line 3120 and the upper line 3140 and typically touch the base line 3120 and the upper line 3140. The letter "f", however, lies between the lower line and the upper line and touches the lower line 3110 and the upper line 3140. The same holds true for the upper case letter "J".

In the graphical representation 3100, apart from that extreme points of arcs contained in the letters (e.g. of arcs of a circle or of an ellipse) are marked with an "x". Further, the end points of straight line sections are marked with "⊕". From the schematic illustration 3100, it may be seen that along the lines of writing 3110, 3120, 3130, 3140 an especially large number of extreme points of arcs occur. Further, there is an especially large number of end points of straight line sections on the lines of writing. It is thus understandable that a line-of-writing detector 2926 may detect a line of writing by searching for a straight line on which there is an especially large number of extreme points of arcs and/or an especially large number of end points of straight line sections. For determining the lines of writing, the line-of-writing detector 2926 may thus advantageously use the information 2922 provided by the Hough transformer 2960 regarding extreme points of arcs and/or the information regarding end points of a straight line sections provided by the Hough transformer 2920. Based on the mentioned information, the line-of-writing detector 2926 determines lines along which an accumulation of extreme points of arcs and/or of end points of straight line sections occurs.

Thus, the line-of-writing detector 2926 for example provides information about a position of the lines of writing 3110, 3120, 3130, 3140, i.e., for example, about a position and/or a direction of the mentioned lines of writing as information 2928.

The line-of-writing detector may, apart from that, be implemented to additionally use a pre-knowledge about the position of the lines of writing with regard to each other (for example with regard to the fact that the lines of writing are parallel to each other and have certain relative spacings) to determine the lines of writing.

In the following, it is described with reference to FIGS. 32*a*, 32*b* and 32*c* how an especially advantageous character description may be determined by describing the position of the extremes relative to the determined lines of writing. For this purpose, FIG. 32*a* shows a graphical representation of a character "a" in a line system consisting of a lower line, a base line, a center line and an upper line. The graphical representation according to FIG. 32*a* is designated by 3200 in its entirety. The graphical representation 3200 shows a lower line 3210, a base line 3212, a center line 3214 and an upper line 3216. A character "a" is here arranged between a base line and a center line. The character "a" is designated by 3220 in its entirety. A first, top arc of the character "a" comprises an extreme 3230. The extreme 3230 in the example of FIG. 32a is located on the center line 3214. It may be assumed here, that the extreme 3230 is at least approximately located on the center line and/or is regarded to be located on the center line, when a distance of the extreme 3230 from the center line is smaller than a predefined threshold which is indicated either absolutely (in terms of an absolute distance) or relatively (depending on a distance between two base lines). Here, for example, basically arbitrarily an x coordinate (x=0) is associated with the extreme 3230 of the first arc.

The character "a" includes a second, left arc whose extreme 3232 lies between the base line 3212 and the center line 3214. Further, an x coordinate (x=−0.5) is associated with the second extreme 3232, describing a position (or a horizontal position or x position, respectively) relative to the first extreme 3230 selected as a reference point. The character "a" further includes a third, bottom arc whose extreme 3234 is located on the base line 3212. In other words, a distance of the third extreme 3234 from the base line 3212 is smaller than a predefined threshold, wherein the predefined threshold may again be determined and/or predefined as an absolute value or as a relative value (depending on a distance between two lines of writing).

Further, also the third extreme 3232 comprises an x coordinate describing a position relative to the reference point. In the illustrated example, the following applies: x=−0.1.

Similar information may, moreover, also be given for the further components of character "a" (and for all other characters), for example for the right approximately straight line section of the character "a".

It is further to be noted that for example a range between the lower line 3210 and the base line 3212 may be defined as a first interval (interval I). A range between the base line 3212 and the center line 3214 may further be defined as a second interval (interval II). A range between the center line 3214 and the upper line 3216 may further be defined as a third interval (interval III).

It is further to be noted that, depending on a distance of the lines of writing confining the interval, a value between 0 and 1 may be associated with a position within an interval, wherein the value describes a vertical position or a relative y position, respectively. In other words, if a certain point (e.g. an extreme point of an arc, a starting point of a straight line section, a center point of a straight line section or an end point of a straight line section) is located within an interval, a relative position coordinate of approximately 0 may, for example, be associated with this point when the point is located at the beginning of an interval, and further a relative position coordinate of approximately 1 may be associated with the point, when the point is, for example, located close to the end of the interval. If, for example, a corresponding point lies between the base line and the center line, but very close to the base, then, for example, a location parameter of zero is associated with the point. If the point lies between the base line and the center line, however, but close to the center line, for example a location parameter of approximately 1 may be associated with the point. Apart from that, for example a location parameter of 0.5 may be associated with a point which is located in the middle between the base line and the center line. However, one need not necessarily to select a linear association of the location parameters. Also a boundary of the location parameters to an interval between 0 and 1 need not be used, but is only to be regarded as an example. Rather, it is a general advantage in one embodiment of the present invention that relative location parameters are associated with points (extreme points of arcs, starting points of straight line sections, end points of straight line sections or center points of straight line sections) which are related to the base lines.

With reference to FIG. 32b, in the following an exemplary form of description for a character is given. For an arc (i.e., for example, an arc of a circle or an arc of an ellipse) the description may comprise information about the direction which indicates whether the arc is curved upward, downward, to the left or to the right. Further, the description for an arc may include information about a position of an extreme. The position of the extreme may, for example, be indicated as an absolute or relative position in a first direction (for example in a direction along the lines of writing, which is also designated as the x direction). Alternatively, however, also relative information about a position in the x direction may be given, for example indicating a position with regard to a point of comparison in the character. The point of comparison is, for example, an arc, a starting point of a straight line section, an end point of a straight line section or a center point of a straight line section. Likewise, the reference point may, however, also be an otherwise selected characteristic point of a character, for example a center point, a point which is farthest in a certain direction or another characteristic point. Further, the description of an arc advantageously includes information about a position y relative to the lines of writing 3210, 3212, 3214, 3216. The information about the position relative to the lines of writing may, for example, indicate whether the point in an interval is located between two lines of writing (within a predefined tolerance) or on a line of writing. Further, the information may optionally indicate in what interval between the lines of writing the point is given.

Additionally or alternatively, the information about the position relative to the lines of writing may contain formation about whether a point (for example within a predefined tolerance range) lies on one of the lines of writing and, if yes, on which of the lines of writing the point is located. Additionally, optionally a more accurate description of the position in the y direction relative to the lines of writing may be given, for example in the form of a value between 0 and 1, as was described above. Also the position in the x direction may, apart from that, be indicated absolutely or relatively with regard to one or two reference points.

The information about an arc may further include information about a curvature radius of the arc. The information about the curvature radius is, however, to be regarded as optional.

Further, the description of a character may include information about a straight line section. For example, the direction of a straight line section may be contained in the information about a character. Thus, the direction of a straight line section may, for example, be given by the indication of an angle with regard to a horizontal and/or with regard to a line of writing 3210, 3212, 3214, 3216. Alternatively or additionally, the location of the identified straight line sections may, for example, be given by the fact that the position of a starting point of the straight line section and of an end point of the straight line section is described. As an alternative to that, information about a straight line section may further include information about a length of the straight line section and about a center point of the straight line section. The mentioned information regarding the straight line section is advantageously selected relative to the lines of writing.

It has thus to be noted, that the character description generator 2930 may provide the relative description of a character as the information 2932 using the information provided by the base line detector 2926 and further using the information provided by the Hough transformer 2920, so that the information 2932 describes the position of arcs and/or straight line sections in the character relative to the lines of writing.

FIG. 32*c* shows an exemplary description of the character "a" illustrated in FIG. 32*a*. The character "a", according to the description 3280 illustrated in FIG. 32*c*, includes a first arc which is curved downward, whose extreme 3230 comprises the x coordinate x=0 and which is further located on the center line 3216. The character "a" further includes a second arc which is curved and/or bent to the right, an whose extreme comprises the x coordinate x=−0.5. The extreme 3232 of the second arc is, moreover, located in the second interval (interval II). A y position of the extreme 3232 may, for example, be indicated accurately as y=0.5, whereby it is expressed that the extreme 3232 is located in the middle between the base line and the center line. The character "a" additionally includes a third arc which is curved upward and whose extreme comprises the x coordinate x=−0.1. The extreme 3234 of the third arc is located on the base line 3212, moreover. The right straight line section of character "a", according to the description 3280, goes to the top right and comprises an angle of 80° with regard to a horizontal and/or with regard to a line of writing. A starting point of the straight line section comprises an x coordinate of x=0.4 and is located in the second interval, i.e. between the base line and the center line. An end point of the straight line section comprises an x coordinate of 0.5 and is, for example, located on the center line 3214. The corresponding location information may, for example, be provided by the character description generator 2930 to the database comparator 2940 in an encoded and ordered, or sequenced, manner.

In the following it is described with reference to FIGS. 33 and 34 how, by the character description generator (i.e., for example, by the character description generator 2830 or by the character description generator 2930), information 2822, 2932 may be gained which is especially suitable for being processed by the database comparator 2840, 2940.

Figure 33:
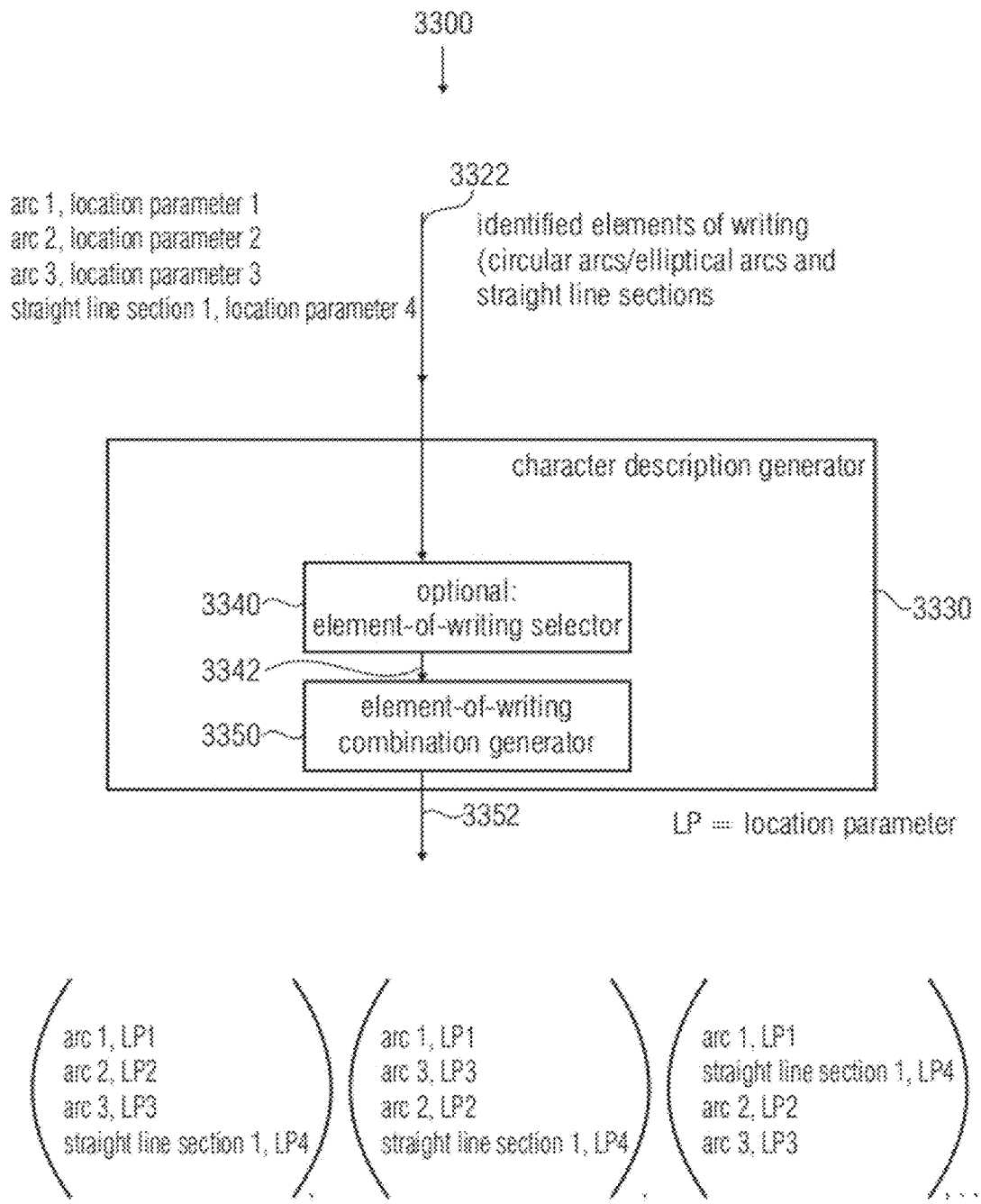
FIG. 33 shows a block diagram of an inventive character description generator in accordance with an embodiment of the present invention.

For this purpose, FIG. 33 shows a block diagram of an inventive character description generator according to an embodiment of the present invention. The character description generator according to FIG. 33 is designated by 3300 in its entirety. The character description generator 3300 which, for example, corresponds to the character description generator 2830 according to FIG. 28 or the character description generator 2930 according to FIG. 29 is implemented to receive information 3322 about identified elements of writing, i.e., for example, about identified arcs of a circle or about identified arcs of an ellipse or about identified straight line sections. The information 3322 may here, for example, correspond to the information 2822 or the information 2922. However, in an alternative embodiment, the information 3322 may also be formed based on the information 2928 about lines of writing and based on the information 2922 about the identified elements of writing, and thus describe the position of the identified elements of writing relative to the lines of writing. According to one embodiment of the present invention it is here only of importance that the information 3322 describes different element of writing in one (certain, determined by the preceding processing) order by parameters. The character description generator 3330 includes an optional element-of-writing selector 3340 implemented to select a real subset of selected elements of writing from the entirety of elements of writing described by the information 3322. The number of elements of writing to be selected may here, for example, be given externally. Further, the selection may, for example, take place randomly. Alternatively, it may also be predefined that the element-of-writing selector 3340 selects the subset of selected elements of writing such that the subset of the selected elements of writing describes, for example, a first predefined number of arcs and further a second predefined number of straight line sections. The selection may thus take place randomly or according to a predefined rule.

An element-of-writing combination generator 3350 is implemented to receive a description of the subset 3342 of characters selected by the element-of-writing selector 3340. As an alternative, the element-of-writing combination generator 3350 may also be implemented, for example, to receive the information 3322 when the element-of-writing selector, for example, is omitted.

The element-of-writing combination generator 3350 is implemented to generate different combinations of elements of writing described by the information 3342 or the information 3322, respectively, and output the same as information 3352. The information 3352 here, for example, corresponds to the character description 2832 or the character description 2932 and is, for example, supplied to the database comparator 2840, 2950.

Different combinations of elements of writing here are a different arrangement of the elements of writing. If, for example, the information 3322 describes three arcs and one straight line section with associated location parameters, then the element-of-writing combination generator 3350 may, for example, generate different combinations. A first combination, for example, describes the elements of writing in the order arc 1, arc 2, arc 3, straight line section 1. A second combination, for example, describes the elements of writing described by the information 3322 in the order which is different to the one above: arc 1, arc 3, arc 2, straight line section 1. A third combination generated by the character combination generator 3350 describes, for example, the elements of writing described by the information 3122 in a further order and/or arrangement: arc 1, straight line section 1, arc 2, arc 3.

In other words, the element-of-writing combination generator 3350 is implemented to form sets of differently ordered elements of writing based on the information 3322 in which the elements of writing are arranged in a different order. In what order the elements of writing are arranged may, for example, be determined by rules contained in the element-of-writing combination generator 3350. Alternatively, the element-of-writing combination generator 3350 may also be implemented to use any possible orders.

Thus, the element-of-writing combination generator 3350 is all in all implemented to form several differently ordered sets of elements of writing described by associated parameters based on one single set of elements of writing. Thus, the database comparison executed subsequently by the database comparator 2840, 2940 is independent of the order in which the individual elements of writing are described in the information 3322. Accordingly, the identification of a character is independent of the sequence of the description of the elements of writing in the information 3322, which is how an especially reliable font detection is achieved.

Figure 34:
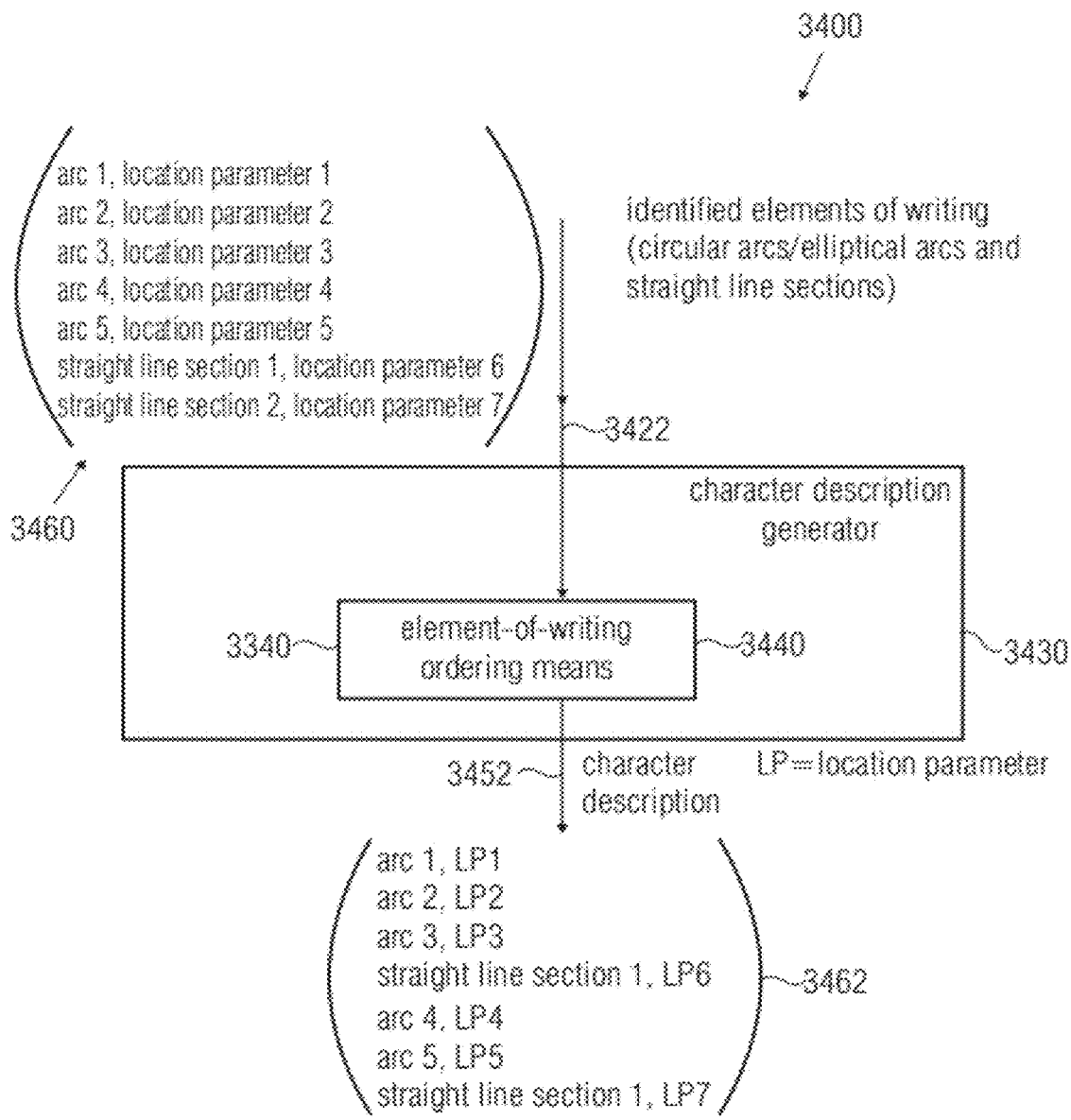
FIG. 34 shows a block diagram of an inventive character description generator in accordance with an embodiment of the present invention.

FIG. 34 shows a block diagram of an inventive character description generator according to an embodiment of the present invention. The character description generator according to FIG. 34 is designated by 3400 in its entirety. In this respect, it is to be noted that the character description generator 3400 receives information 3422 about identified elements of writing which basically corresponds to the information 3322. In the embodiment illustrated in FIG. 34, the information 3422 includes information about, for example, five arcs and two straight line sections to which respective location parameters are associated. One example of the information 3422 is described in more detail in the following with reference to FIG. 35.

The character description generator 3430, which may, for example, take over the position of the character description generator 2830 or the position of the character description generator 2930 or which may alternatively also be a part of the character description generator 2830, 2930, includes an element-of-writing ordering means 3440. The element-of-writing ordering means 3440 is implemented, for example, to generate information 3452 based on the information 3422, in which the elements of writing are ordered such that they describe a continuous base line in the order reproduced by the information 3452. In other words, the element-of-writing ordering means 3440 is implemented to identify a subsequent element of writing for a certain element of writing so that the certain element of writing and the subsequent element of writing form a continuous line of writing. Thus, the element-of-writing ordering means 3440 may be implemented, for example, to identify a distance between end points of several elements of writing and to detect two elements of writing as being subsequent elements of writing, while a distance between an end point of a first element of writing and a starting point of a second element of writing is smaller than a predefined bound. Thus, the element-of-writing ordering means 3440 all in all provides ordered information 3452 which may, for example, serve as input information for the database comparator 2840, 2940.

Figure 35:
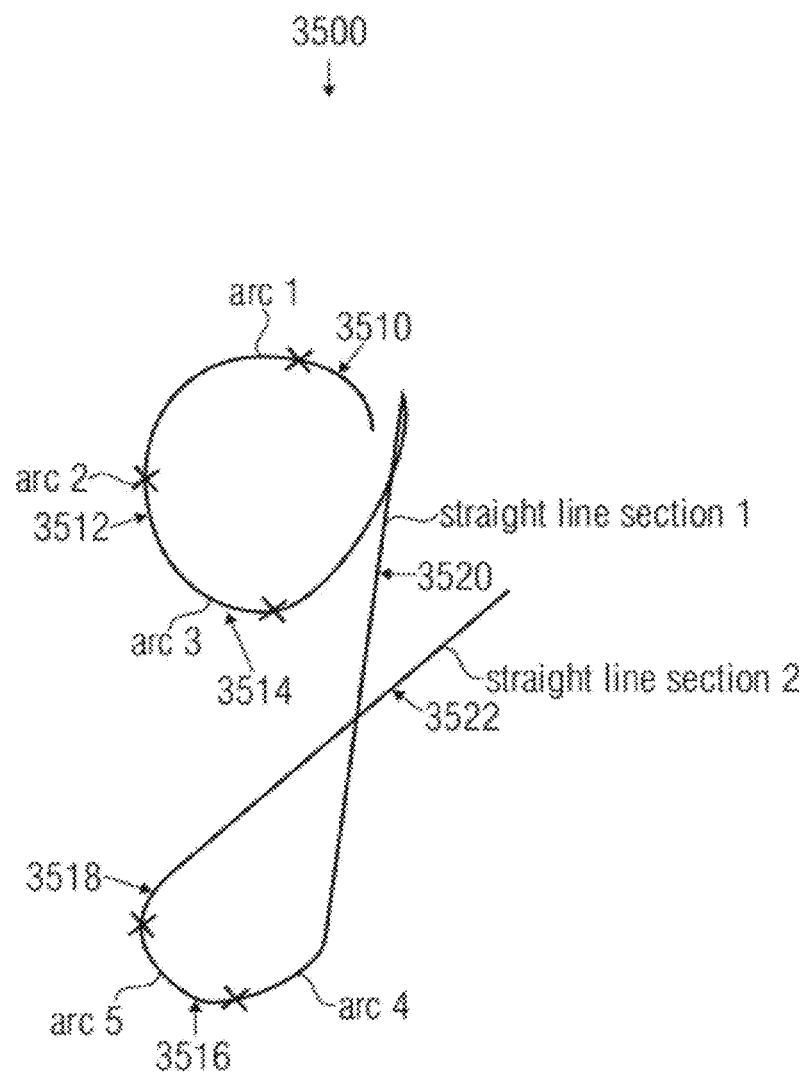
FIG. 35 shows a graphical representation of a character "g"

In the following, with reference to FIG. 35, a concrete example is illustrated, using which the functioning of the element-of-writing ordering means 2440 is better understandable. FIG. 35 shows a graphical representation of a character "g" and of the elements of writing of which the character "g" consists. The graphical representation according to FIG. 35 is designated by 3500 in its entirety. The graphical representation 3500 shows the character "g". The character "g" includes a first arc 3510, a second arc 3512, a third arc 3514, a fourth arc 3516 and a fifth arc 3518. The character "g" further includes a first straight line section 3520 and a second straight line section 3522. It may further be seen that, when writing the character "g", the individual elements of writing are passed in the following order: arc 1, arc 2, arc 3, straight line section 1, arc 4, arc 5, straight line section 2. Thus, for example an end point of the "arc 1" element of writing is adjacent to a starting point of the "arc 2" element of writing. Further, an end point of the "arc 2" element of writing is adjacent to one starting point of the "arc 3" element of writing. Corresponding relationships also hold true for the starting points and end points of the remaining elements of writing. An end point of the "arc 3" element of writing is far away from a starting point of the "arc 4" element of writing, however. Based on the above explained circumstances, for example the element-of-writing ordering means 3410, based on a description describing, for example, first the arcs and only then the straight line sections, by reordering generates a description describing the elements of writing in an ordered order, so that by the corresponding order of the elements of writing a continuous line of writing is described.

An exemplary, non-ordered description is designated by 3460 in FIG. 34, while an illustration ordered according to the course of a line of writing is designated by 3462.

Figure 36:
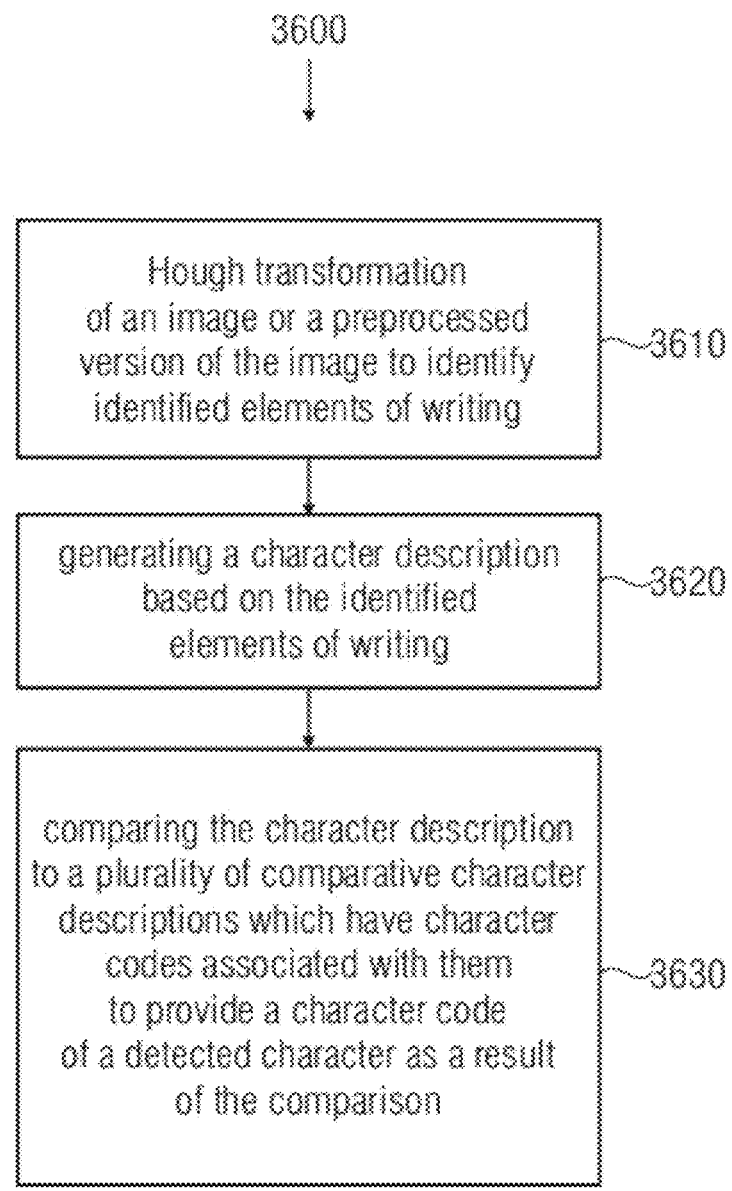
FIG. 36 shows a flow chart of an inventive method of detecting a character in an image.

In the following, an inventive method of detecting a character in an image is described. For this purpose, FIG. 36 shows a flowchart of an inventive method of detecting a character in an image. The method according to FIG. 36 is designated by 3600 in its entirety.

In a step 3610 the method 3600 includes Hough transforming an image or a preprocessed version of the image to identify identified elements of writing. The method 3600 further includes, in a second step 3620, generating a character description based on the identified elements of writing. Further, in a third step 3630, the method 3600 includes comparing the character description to a plurality of comparative character descriptions to which character codes are associated to provide, as a result of comparing, a character code of the detected character.

It is further to be noted that the method 3600 may be supplemented by all those steps which were described with regard to the inventive concept (i.e. with regard to the inventive devices).

The inventive device or the inventive method may be implemented in hardware or in software. The implementation may be executed on a digital storage medium, for example a floppy disc, a CD, a DVD, an ROM, a PROM, an EPROM, an EEPROM or a FLASH memory having electronically readable control signals which may cooperate with a programmable computer system so that the corresponding method is executed. In general, the present invention thus also consists in a computer program product having a program code stored on a machine-readable carrier for executing the inventive method, when the computer program product is executed on a computer. In other words, the invention may also be realized as a computer program having a program code for executing the inventive method, when the computer program is executed on a computer.

In summary, it has to be noted that the present invention describes an especially efficient method of character detection.

In this respect it is to be noted that reading town signs, town names or speed limits is an important aspect of font detection. Thus, for example many characters and numbers (in some font types even all characters and numbers) are put together from vertical lines, horizontal lines, concave lines and convex lines. At least, however, the characters and numbers in a plurality of font types include vertical lines, horizontal lines, concave lines and convex lines.

For example, a letter "S" has four extremes, just like a letter "O" and/or "o". The letter "S" is, however, different from the letter "0" with regard to a curvature and to a relative distance of the extremes with regard to each other.

Based on the mentioned finding, thus a character detection system may be developed. For the detection of diagonal lines in the letters "W", "Z", "A", "K", "Y", "X", "V", "N" and/or "M", advantageously a Hubel-Wiesel bar detector may be used, as is, for example, described in the publication "A neural net for 2D-slope and sinusoidal shape detection" by A. Bruckmann, F. Klevenz and A. Wünsche (published in: International Scientific Journal of Computing, Vol. 3, Edition 1, Ukraine, 2004, pp. 21-25). Both the detection of arcs (for example of arcs of a circle or of an ellipse) and also the detection of straight line sections (e.g. of diagonal lines) may in one embodiment of the present invention be based on the same architecture "Dual Hough IP Core", only with a different programming. In other words, a re-configurable Hough transformer may be used which, for example, in a first configuration state is able to detect arcs and which in a second configuration state is able to detect straight lines.

In one embodiment of the present invention, a position of found extremes is associated with a line system, for example like in an exercise book of first-grade students.

Thus, in one embodiment of the present invention, a base line, a center line, for example with lower-case letters "d", "c", and an upper line, for example with upper-case letters "C", "K", are determined.

In one embodiment of the present invention, not only the extremes belong to a character detection, but every extreme comprises information "convex/concave top/bottom", "convex/concave left/right". In other words, in one advantageous embodiment, for example also information about a curvature of arcs is determined and assessed later.

In a software simulation (or generally when executing a Hough transform, respectively) for example a range between a maximum curvature radius and a minimum curvature radius may be set, wherein for example only arcs having a curvature radius between the maximum curvature radius and the minimum curvature radius are detected by the Hough transformer.

Further, in software simulation, or when executing the Hough transform, respectively, with the help of a parameter "DelayLines not sum" it may be determined which delay lines in the Hough transformer and/or in the Hough field do not contribute to a summation. Thus, it may, for example, be finely set that lines around the extreme do not contribute to a summation, as otherwise too often straight lines would be counted and/or determined.

In other words, it may be achieved in the Hough transformer that a section of a line which is located in the proximity of an extreme of the curved line does not contribute to a result of the Hough transform.

Thus, in one embodiment of the present invention, with regard to a curved line in the image (for example with regard to a circularly curved line or an elliptically curved line) a feature vector results having the form (x, y position of the extremes; curvature radius in a range of values of negative max_curvature radius, positive max_curvature radius). In other words, a feature vector with regard to a curve in the image describes the position of an extreme point of the arc as well as a curvature radius, whereas the curvature radius is smaller regarding its absolute value than a maximum curvature radius.

Further, character single segmentation algorithms exist. In this respect, reference is made, for example, to documents of K. H. Noffz and R. Lay at the University Ruprecht Karl of Heidelberg or by T. Roska at the Pázmány P. Catholic University of Budapest.

As an example it is to be noted here that a character "c" includes three extremes, one on the center line, one on the base line and one in between. In this case, a relative x position of the extremes with regard to each other further counts.

In one advantageous embodiment, a classification is executed according to a classical variation method of min $(X-X_i)^2$. Alternatively or additionally, a classification is further performed according to a labeling method by V. Ferrari. For details in this respect, reference is made to the publication "Object detection by contour segment networks" by V. Ferrari et al. (published: European Conference of Computer vision (ECCV), Graz, May 2006).

For a double cross check or at least for checking the character detection, in one embodiment of the present invention the use of a Euler connectivity number is obvious. The Euler connectivity number is defined as follows:

connectivity number=number of the objects−number of enclosed holes.

An object is here defined as a continuous area of image points, or pixels.

The connectivity number is calculated in a pixel grid from the determination of 2×2 search masks according to $$K = \frac{n * [1 \ 0] - m * [? 1]}{[0 \ 0] \quad [1 0]}$$

For the different letters of the Latin alphabet, the following applies:
for "B": K=−1;
for "Q", "R", "O", "P", "A": K=0;
for the remaining letters or for the rest: K=1.

Figure 37:
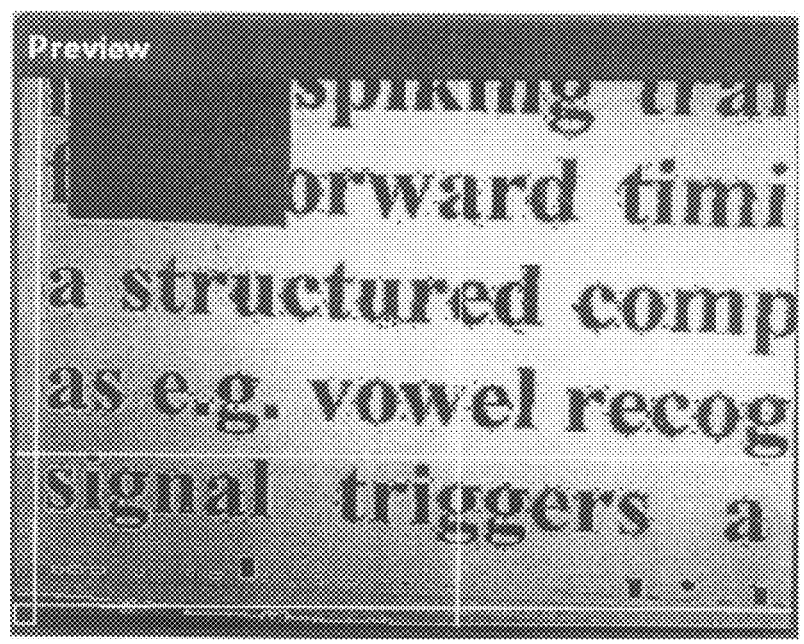
FIG. 37 shows a graphical representation of extreme points detected in an image.

Further, FIG. 37 shows a screen illustration of a hyperfine structure of a font detection using a WinDelay program.

The graphical representation of FIG. 37 is designated by 3700 in its entirety. From the graphical representation 3700 it may be seen that a comma at the bottom left is marked (for example by the WinDelay program). Further, alternatively or additionally, a letter "G", a letter "S" and/or a letter "O" is marked. Even a letter thickness and serifs may be determined. An input image from which the graphical representation 3700 is gained is a text recorded by a screen with a camera (e.g. using a Web-Cam).

In the following, the method of character detection is again described step by step with reference to an embodiment. In the first steps, the method is similar to an identification of ellipses (also referred to as ellipse finder). Parameters, like for example a threshold, may be set in a program "WinDelayLine", providing the function of a Hough transform.

The character detection is executed step by step as follows:
1) Record an image with a camera. Alternatively, the image may, for example, also be generated by a scanner or gained otherwise.
2) Set threshold value; binarization (ought to be adaptive according to histogram distribution of the gray levels); with video readjust more often after x frames or best, optimum threshold for each image; standard image processing.
3) Find contour; contour finder algorithm is an algorithm set up from morphological operators, in principle an edge detection algorithm.
4) Hough transform; with the help of a Hough transform (for example executed by the software "WinDelayLine"), extremes in an image are found an marked (for example in red). Each extreme is indicated with an x, y position and additionally has a curvature value. The clouds of marked extremes generated by the Hough transform (also referred to as "red clouds") may be more or less dense, depending on the variation of the parameter core size, minimum curvature radius, maximum curvature radius, delay not sum. For details in this respect, reference is made to the dissertation "Echtzeitfähige, auf der Hough-Transformation basierende Methoden der Bildverarbeitung zur Detektion von Ellipsen" by J. Katzmann (dissertation at the University of Ilmenau, Germany, 2005).
5) Classification according to Hamilton's variation calculation according to min (integral) $(X\_i-t\_j)^2$. In other words, for example a deviation between a feature vector and a comparative feature vector is minimized.

The algorithm works, for example, as follows for the detection of an ellipse:

Set up a list of all possible four-point pairs; fit an ellipse for each combination of four, determine the ellipse parameters and form the deviation of the measurement points from the fitted ellipse. Set up a decreasing list of the combinations of four according to the min deviation (or the minimum deviation, respectively).

Step 5) is to be regarded as optional however.

6) Letters and numbers consist of lines and arcs. Here, a law of curve sketching has to be taken to heart: each function may be approximated by a node and a second derivation. This is only true in the digital case with limitations: vertical and horizontal lines are found, also circles are not a problem, but with straight lines of different inclination the method does not work well. Here, for example, in the software WinDelayLine or in the Hough transformer, respectively, a straight line Hough finder is used, as is described, for example, in the publication "A neural net for 2D slope and sinusoidal shape detection" by A. Bruckmann, F. Klefenz and A. Wünsche (published in: International Scientific Journal of Computing 3 (1), pages 21-26, 2004).

Thus, a complete computational neuro-scientific Hubel-Wiesel solution of an orientation selectivity is achieved.

7) Form a bunch of templates in a contour description language. For example, a contour description language may be used as is descried in the publication "Object detection by contour segment networks" by V. Ferrari et al (published: European conference on computer vision (ECDB), Graz, May 2006).

An exemplary description is given here with reference to character "p": straight downward line; three extremes with a downward curvature, curvature bending to the left, horn growth bending upward.

Form all four-point combination pairs from a straight element and three arc elements under the compulsory condition that a default for a position (e.g. position below a center line or above a center line) is to be maintained in tolerance ranges and that the "p" line has to be located left of the three arcs of a circle. For all letters and numbers (at least for a plurality of letters or numbers), their characteristic template is to be generated and all combination pairs are to be matched with the template. A minimum is the result.

In other words, four points are determined representing extremes of arcs or characteristic points of straight line sections (e.g. starting points, center points or end points), wherein certain default position relations are to be maintained (e.g. points above or below a center line, or relation of the existing curvatures).

Further, alternatively or additionally, a method may be applied, as it is described in the publication "object detection by contour segment networks" by V. Ferrari et al. The corresponding method may be summarized as follows: If an object is put together from lines and arcs of a circle, describe, how the object is put together. The description may for example be as follows: corner; line upward, y centimeters; line downwards, x centimeters; curvature arc with curvature radius r. This template is thereupon shifted in different directions ("crisscross") across marked points (extremes identified in the image; also referred to as "red points"). Form "Min (templates vector—red point vector)". In other words, determine a deviation between a template vector and a vector describing features or describing a position of the identified extremes, respectively ("red points vector"). Where there is a best possible match it is assumed that an object is present.

In the following it is still to be explained how a Euler connectivity number may be determined. In this respect, it is noted, that Leonard Euler, which used to be on a 10 franks bill was the first to determine the connectivity number. His scripts are in Latin and his formula is:

The connectivity number K is equal to a number of objects minus a number of holes.

In a translation of this fact that may be used for an application in a computer system in a pixel grid, this means:
an object is defined as a continuous area of pixels (also referred to as pixel area). For example, an object may be defined as a continuous pixel area of black pixels. The continuous area of pixels (pixel area) may also contain holes and/or enclosures, for example in the form of white pixels. A hole is here defined as an enclosure in a border of black pixels. In other words, a hole is for example a pixel of a first color (a white pixel) which is surrounded by pixels of another color (e.g. of black pixels).

In the following it is described how the connectivity number may be determined based on local 2×2 operators. For this purpose it is counted how often a 2×2 pattern $$\begin{pmatrix} 1 & 0 \\ 0 & 0 \end{pmatrix}$$

is present in a pixel image.

It is further counted, how often a 2×2 pattern $$\begin{pmatrix} ? & 1 \\ 1 & 0 \end{pmatrix}$$

is present in the image.

Then, the determined numbers are subtracted from each other and this number (for example the result) indicates the connectivity number.

Applied to characters this means, that capital "B" has the connectivity number K=−1, that the characters "a", "b", "d", "e", "q", "o", "p" and "R" comprise the connectivity number K=0, and that the remaining characters or letters, respectively, (for example of the Latin alphabet) comprise the connectivity number 1.

Alternatively, it may be determined, that in another font illustration, the letters "A", "D", "O", "P", "Q", "a", "b", "d", "e", "g", "o", "p" and "q" have the connectivity number 0.

The Euler connectivity number may thus serve as a double crosscheck, whether a correct letter was found.

In summary, it may thus be said, that the present invention provides an especially advantageous concept for character detection.

Figure 38:
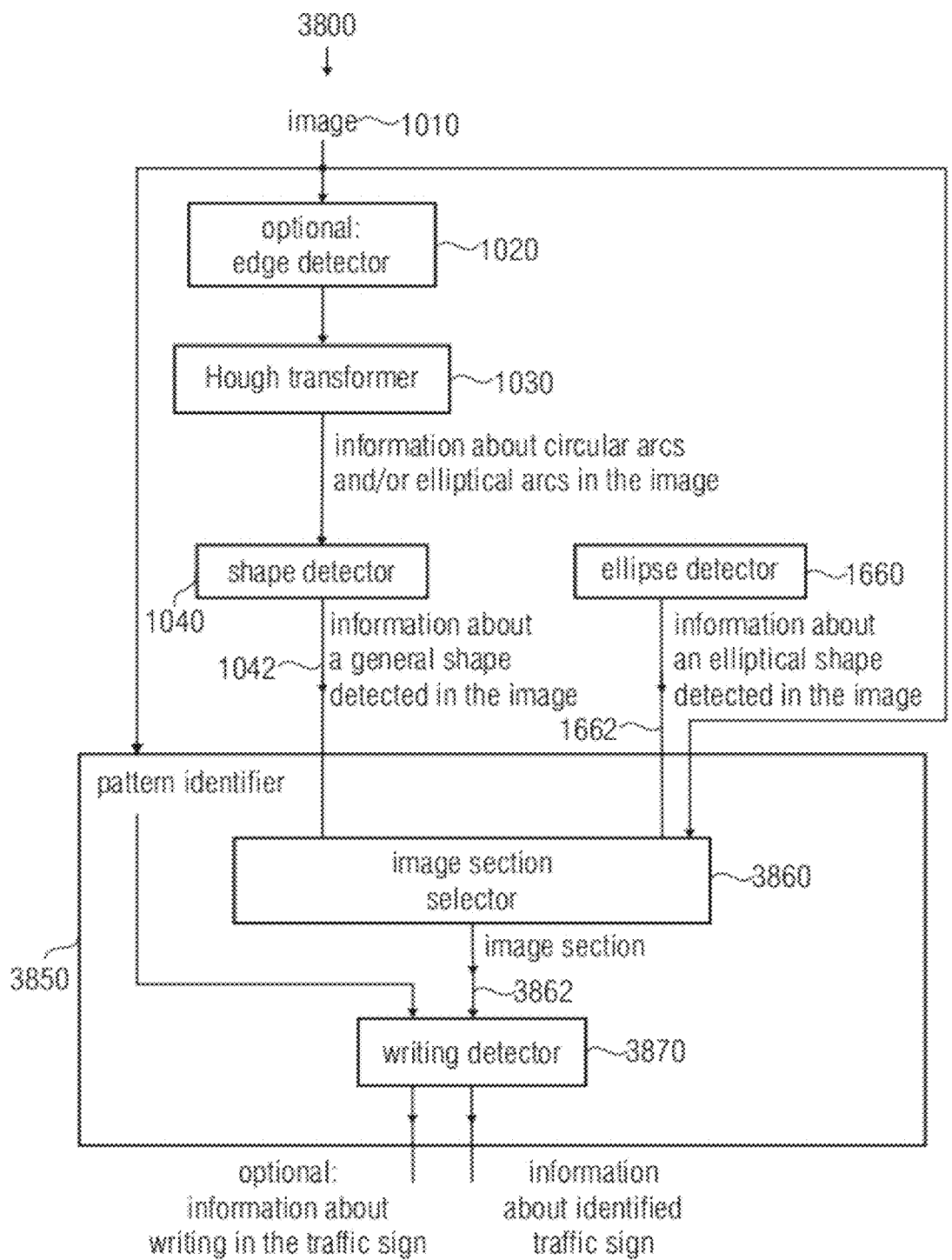
FIG. 38 shows a block diagram of an inventive device for identifying a traffic sign in an image in accordance with an embodiment of the present invention.

FIG. 38 shows an inventive device for identifying a traffic sign in an image according to an embodiment of the present invention. The device according to FIG. 38 is designated by 3800 in its entirety. It is noted, that the device 3800 is implemented to receive an image 1010. Further, the device 3800, similar to the device 1000 according to FIG. 10, includes an optional edge detector 1020. Likewise, the device 3800 includes a Hough transformer 1030. The edge detector 1020 and the Hough transformer 1030 correspond to the means described with reference to FIG. 10 with regard to their functioning.

The device 3800 further includes at least one shape detector 1040 or one ellipse detector 1660, advantageously however both a shape detector 1040 and also an ellipse detector 1060. With regard to its function, the shape detector 1040 corresponds to the shape detector described with reference to the device 1000, and the ellipse detector 1660, with regard to its function, corresponds to the ellipse detector 1660 described with reference to the device 1600.

Further, the device 3800 includes a pattern identifier 3850. The pattern identifier or pattern detector, respectively, is implemented to receive information about arcs of a circle or arcs of an ellipse in the image 1010 from the Hough transformer 1030 or to receive information about straight line sections running through the image from the Hough transformer 1030. Thus, the Hough transformer 1030 may for example be implemented in the device 3800 to only provide information about arcs of a circle or arcs of an ellipse in the image, or to only provide information about straight line sections in the image. Alternatively, the Hough transformer 1030 may also be able to provide information both about arcs of a circle or arcs of an ellipse in the image and also about straight line sections in the image. A decision, what information the Hough transformer 1030 provides, among others depends on the fact what information may be used by the shape detector 1040 and/or the ellipse detector 1660 as well as by the pattern identifier 3850.

The pattern identifier 3850 includes an image section selector 3860 implemented to select an image section 3862 of the image 1010 using the information provided by the shape detector 1040 about a (general) shape 1042 detected in the image and/or based on the information 1662 provided by the ellipse detector 1660 about an elliptical shape detected in the image. The selection of an image section may for example be executed as it was described with reference to FIG. 15.

Further, the image section selector 3860 may optionally be implemented to execute a mapping of the image section, as it was described with reference to FIG. 15. Further, the image section selector 3860 may alternatively be implemented to determine the image section 3862 using a masking, as it was described with reference to FIG. 19. The pattern identifier 3850 further includes a writing detector 3870 implemented to receive the image section 3862 and/or information about the image section selected by the image section selector 3860. Further, the writing detector 3870 is implemented to receive the information about arcs of a circle and/or arcs of an ellipse and/or straight line sections in the image provided by the Hough transformer. Further, the writing detector 3870 is implemented to determine those arcs of a circle and/or arcs of an ellipse and/or straight line sections lying in the image section 3862 selected by the image section selector. Thus, the writing detector 3870 receives information about selected arcs of a circle and/or arcs of an ellipse and/or straight line sections in the image lying in the image section 3862. The information about selected arcs of a circle and/or straight line sections received by the writing detector 3870 thus describes elements of writing. Thus, a fonts detection may be executed as it was explained with reference to FIGS. 28-36.

It is further to be noted, that the pattern identifier 3850 may also be set up differently. It is here only decisive that the writing detector 3870 all in all contains information about selected arcs of a circle and/or arcs of an ellipse and/or straight line sections in the image, lying within a general (e.g. triangular or rectangular or square) or elliptic form detected by the shape detector 1040 or by the ellipse detector 1660. The information about the selected arcs of a circle and/or arcs of an ellipse and/or straight line sections in the image thus takes on the place of the information 2822 about identified elements of writing (see FIG. 28). If the writing detector 3870 detects a character, then the writing detector 3870 for example provides a character code of a detected character, as it was for example described with reference to FIGS. 28 and 29. The character code provided by the writing detector 3870 may for example carry information about the fact which traffic sign was detected. In other words, the detected character code may be part of information describing an identified traffic sign. If the traffic sign includes more than one letter and/or more than one character, the writing detector 3870 may optionally also provide information about a font in a traffic sign which includes more than one letter. The corresponding font may then, for example by a comparison to a database, be used to identify the information represented by the traffic sign and/or the traffic sign itself.

In summary it may thus be noted, that the writing detector 3870 is implemented to provide a character code of at least one detected character based on information about elements of writing lying within a shape detected by the shape detector 1040 or the ellipse detector 1660, wherein the character code is advantageously used to determine information about an identified traffic sign.

It may thus be noted, that the information provided by the Hough transformer may be reused repeatedly in the detection of a traffic sign. The information about arcs of a circle and/or arcs of an ellipse and/or straight line sections identified in the image may on the on hand be used to detect general or elliptical shapes in the image 1010 with the help of a shape detector or with the help of an ellipse detector. Further, the information provided by the Hough transformer 1030 may subsequently be used to identify one or several characters in an image section described by the detected shapes, to thus obtain especially reliable information about an identified traffic sign.

In one embodiment, the present invention thus provides an especially advantageous concept for traffic sign detection based on the execution of the Hough transform, wherein the information provided by the Hough transformer may even be reused repeatedly depending on the embodiment.

All in all, the inventive concept thus enables a traffic sign detection by a visual system in a car. The invention thus provides information about speed limits and other signs.

The present invention was tested using the software "Windelayline" in extensive on-road tests both in inner city or also highway drives. The traffic signs were recorded using a standard video camera Panasonic GS27-EG. All round traffic signs were segmented to 100%, no matter how the light conditions are (tunnel, shadowing). The method of "Windelayline" is a parallel Hough transform portable as a netlist on the silicon software "microenable IV" video processor (frame grabber).

In accordance with an embodiment, the invention provides a device 1000; 1600 for identifying a traffic sign 1060; 1310; 1510 in an image 1010, 1150; 1300; 1500; 1610, comprising: a Hough transformer 1030; 1630 which is implemented to identify a plurality of line sections running through the image 1010; 1610 in different directions in the image or in an edge image 1022; 1622 derived from same; a shape detector 1040; 1200; 1640 which is implemented to detect a shape corresponding to a traffic sign in the image or in an edge image derived from same based on the identified line sections; and a pattern identifier 1050, 1650 which is implemented to select an image section corresponding to the detected shape whose shape corresponds to the shape detected by the shape detector based on the detected shape and to identify a traffic sign based on the selected image section using a comparative image pattern, wherein the pattern identifier 1050, 1650 is implemented to adapt the section of the image 1010; 1610 and the comparative image pattern to each other with respect to a shape by mapping; wherein the Hough transformer 1630 is further implemented to identify circular arc segments or elliptical arc segments in the image 1610 or in the edge image 1622 derived from same; wherein the device further comprises an ellipse detector 1660; 1700 which is implemented to detect a location of an ellipse in the image or in the edge image derived from same based on the identified circular arc segments or elliptical arc segments; wherein the Hough transformer 1630 is implemented to determine extreme points 1812*a*-1812*h* of circular arc segments or of elliptical arc segments, and wherein the ellipse detector 1660; 1700 is implemented to select at least a first set of four extreme points 1812*a*, 1812*b*, 1812*c*, 1812*d* from the extreme points determined by the Hough transformer, and a second set 1812*a*, 1812*b*, 1812*c*, 1812*d* of four extreme points from the extreme points determined by the Hough transformer, wherein the first set of four extreme points is different from the second set of four extreme points, to determine parameters of a first fit ellipse 1840 by the four extreme points of the first set of extreme points, to determine a deviation d of the four extreme points of the first set of extreme points from the first fit ellipse, to determine parameters of a second fit ellipse 1840 by the four extreme points of the second set of extreme points, to determine a deviation D of the four extreme points of the second set of extreme points from the fit ellipse, and to determine, using the deviation d of the four extreme points of the first set of extreme points from the first fit ellipse and using the deviation D of the four extreme points of the second set of extreme points from the second fit ellipse, whether the four extreme points of the first set of extreme points belong to an ellipse in the image, and whether the four extreme points of the second set of extreme points belong to an ellipse in the image.

Optionally, in the device, the pattern identifier may be implemented to identify an image pattern filling the detected shape or whose boundary is determined by the detected shape based on the detected shape, by a comparison to at least one comparative image pattern, in order to identify a traffic sign.

Optionally, in the device, the pattern identifier may be implemented to adapt the section of the image and the comparative image pattern 2200 to each other by shifting and/or by rotating and/or by a distortion.

Optionally, in the device, the pattern identifier may be implemented to compare the image pattern using an image correlation algorithm to at least one comparative image pattern 2200.

Optionally, in the device, the pattern identifier may be implemented to compare the image pattern in the image section to a plurality of comparative image patterns 2200 to acquire a measure for deviations between the image pattern and the comparative image pattern, and to indicate a detection of a comparative image pattern in the image for a comparative image pattern 2200, comprising a least deviation with the image pattern, provided the measure for the deviation is not greater than a predetermined, maximum admissible deviation.

Optionally, in the device, the pattern identifier may be implemented to select an image section of the image corresponding to the identified ellipse or to the identified comparative shape depending on the fact whether in the image or an edge image derived from same an ellipse or a comparative shape was identified.

Optionally, the device may comprise an edge detector 1020; 1620 which is implemented to detect edges in the image 1010; 1610 and to generate an edge image 1022; 1622 based on the image.

Optionally, the edge detector 1020; 1620 may be implemented to convert the image into a monochrome image using a threshold value and to detect edges in the monochrome image.

Optionally, in the device, the image 1010; 1610 may be a camera image from a video camera.

In accordance with an embodiment, the invention provides a device 3800 wherein the pattern identifier comprises a writing detector, wherein the writing detector comprises a character description generator which is implemented to acquire a character description describing the location of the identified straight line sections, the identified circular arc segments or the identified elliptical arc segments based on information provided by the Hough transformer 1030; 1630 about straight line sections, identified circular arc segments or identified elliptical arc segments passing through the image; wherein the writing detector comprises a database comparator which is implemented to compare the character description to a plurality of comparative character descriptions to which character codes are associated to provide a character code of a detected character as a result of the comparison; and wherein the device is implemented to use the character code for an identification of a traffic sign.

Optionally, in the device, the Hough transformer may be implemented to provide information about a location, a length or a direction of an identified straight line section, and wherein the character description generator is implemented to use the information provided by the Hough transformer about the identified straight line section for the generation of the character description.

Optionally, in the device, the identified straight line sections, the identified circular arc segments or the identified elliptical arc segments may form identified elements of writing.

Optionally, in the device, the character description generator may be implemented to acquire a description of a character as the character description, describing the character as an ordered description of identified elements of writing.

Optionally, in the device, the character description generator may be implemented to order the character description so that the ordered identified elements of writing describe a continuous line of writing.

Optionally, in the device, the Hough transformer may be implemented to provide information about a location, an arc length, a curvature radius or a curvature angle of the identified circular arc segments or elliptical arc segments, and wherein the character description generator is implemented to use the information about the location, the arc length, the curvature radius or the curvature angle of the identified circular arcs or elliptical arcs provided by the Hough transformer for the generation of the character description.

Optionally, in the device, the character description generator may be implemented to generate the character description so that the character description comprises a description of a relative location of circular arcs or elliptical arcs belonging to a character.

Optionally, the device may comprise a line-of-writing detector which is implemented to identify a line along which the characters are arranged based on a location of the elements of writing identified by the Hough transformer.

Optionally, in the device, the line-of-writing detector may be implemented to determine a lower line, a base line, a center line or an upper line of characters as a line of writing based on a location of the elements of writing identified by the Hough transform.

Optionally, in the device, the line-of-writing detector may be implemented to determine a line on which more than a predetermined number of extremes of identified circular arcs or elliptical arcs are located as a line of writing.

Optionally, in the device, the character description generator may be implemented to generate the character description so that the character description describes information about a location of the identified elements of writing relative to at least one detected line of writing.

Optionally, in the device, the character description generator may be implemented to comprise information provided by the Hough transformer about an orientation of the circular arc or the elliptical arc into the character description for identified circular arcs or elliptical arcs.

Optionally, in the device, the character description generator may be implemented to comprise information about a position of an extreme point of the identified circular arc or the identified elliptical arc provided by the Hough transformer into the character description for identified circular arcs or elliptical arcs.

Optionally, in the device, the Hough transformer may be implemented to identify only circular arcs or elliptical arcs whose curvature radius is smaller than a predetermined maximum admissible curvature radius with regard to an absolute value.

Optionally, in the device, the character description generator may be implemented to generate a description of the character by assembling selected adjacent identified character elements, wherein the character description generator is implemented to select the selected character elements used for the description of the character from an entirety of identified character elements so that the selected character elements describe a continuous course of line from a predetermined starting point to a predetermined endpoint.

Optionally, in the device, the character description generator may be implemented to generate a feature vector based on the identified character elements which describes subsequent sections of a character.

Optionally, in the device, the database comparator may be implemented to compare a feature vector comprising the information of the character description to a plurality of comparative feature vectors associated with comparative characters to acquire a measure for differences between the feature vector and the comparative vectors and to determine a character code belonging to the feature vector based on the measure for the differences.

Optionally, device may comprise a connectivity number calculator which is implemented to calculate a Euler connectivity number based on an image content of an image section of the image which comprises a character; and wherein the device further comprises a connectivity number examiner which is implemented to compare the Euler connectivity number calculated for the image section to a predetermined comparative connectivity number comprised in a database which is associated to a character detected in the image section, to acquire reliability information carrying information about a reliability of a detection of a character.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

References

[1] B. V. Funt and G. D. Finlayson. Color constant color indexing. IEEE Transactions on Pattern Analysis and Machine Intelligence, 17(5): 522-529, 1995.

[2] J. Kludas. Color indexing, constant color indexing. Hauptseminar, TU-Ilmenau, 2005.

[3] P. Lambert, N. Hervey, and H. Grecu. Image retrieval using spatial chromatic histograms. Imaging and Vision, pages 343-347, 2004. CGIV 2004—Second European Conference on Color in Graphics.

[4] G. Ciocca, R. Schettini, and L. Cinque. Image indexing and retrieval using spatial chromatic histograms and signatures. Imaging and Vision, (April 2-5), 2002. CGIV 2002—First European Conference on Color in Graphics, University of Poitiers (France).

The invention claimed is:

1. A device for identifying a traffic sign in an image, comprising:
 a Hough transformer which is implemented to identify a plurality of line sections running through the image in different directions in the image or in an edge image derived from same;
 a shape detector which is implemented to detect a shape corresponding to a traffic sign in the image or in an edge image derived from same based on the identified line sections; and
 a pattern identifier which is implemented to select an image section corresponding to the detected shape whose shape corresponds to the shape detected by the shape detector based on the detected shape and to identify a traffic sign based on the selected image section using a comparative image pattern,
 wherein the pattern identifier is implemented to adapt the section of the image and the comparative image pattern to each other with respect to a shape by mapping;
 wherein the Hough transformer is further implemented to identify circular arc segments or elliptical arc segments in the image or in the edge image derived from same;
 wherein the device further comprises an ellipse detector which is implemented to detect a location of an ellipse in the image or in the edge image derived from same based on the identified circular arc segments or elliptical arc segments;
 wherein the Hough transformer is implemented to determine extreme points of circular arc segments or of elliptical arc segments, and
 wherein the ellipse detector is implemented to select at least a first set of four extreme points from the extreme points determined by the Hough transformer, and a second set of four extreme points from the extreme points determined by the Hough transformer, wherein the first set of four extreme points is different from the second set of four extreme points,
 to determine parameters of a first fit ellipse by the four extreme points of the first set of extreme points,
 to determine a deviation of the four extreme points of the first set of extreme points from the first fit ellipse,
 to determine parameters of a second fit ellipse by the four extreme points of the second set of extreme points,
 to determine a deviation of the four extreme points of the second set of extreme points from the fit ellipse, and
 to determine, using the deviation of the four extreme points of the first set of extreme points from the first fit ellipse and using the deviation of the four extreme points of the second set of extreme points from the second fit ellipse, whether the four extreme points of the first set of extreme points belong to an ellipse in the image, and whether the four extreme points of the second set of extreme points belong to an ellipse in the image.

2. The device according to claim 1, wherein the pattern identifier is implemented to select the image section based on the detected shape so that its shape corresponds to the shape detected by the shape detector.

3. The device according to claim 1, wherein the shape detector is implemented to detect the predetermined shape in the image or in the edge image derived from same based on a relative location of the identified line sections.

4. The device according to claim 1, wherein the shape detector is implemented to select a subset of selected identified line sections from an entirety of identified line sections,
 to determine relative location parameters for the selected identified line sections, which describe a relative location of the selected identified line sections to each other or a relative location of intersections of the selected identified line sections, and to decide, based on the relative location parameters, whether the selected identified line sections describe a predetermined comparative shape.

5. The device according to claim 4, wherein the shape detector is implemented to compare the relative location parameters for the selected identified line sections to relative location parameters of comparative shapes to be identified, to acquire a quantitative description of a deviation between the relative location parameters for the selected identified line sections and the relative location parameters of the comparative shapes to be identified, and to detect a shape corresponding to the comparative shape in the image or in an edge image derived from same, when the relative location parameters for the selected identified line sections deviate from the relative location parameters of the comparative shapes by at most a predetermined, maximum admissible deviation.

6. The device according to claim 1, wherein the Hough transformer is implemented to identify the circular arc segments or elliptical arc segments in the image or in an edge image derived from same, and wherein the shape detector is implemented to describe a description of an object in the form of a list of adjacent identified straight line sections and of identified circular arc segments or elliptical arc segments.

7. The device according to claim 6, wherein the list comprises information about a length, a direction, a position or a curvature radius of the identified straight line section and the identified circular arc segments or elliptical arc segments.

8. The device according to claim 6, wherein the shape detector is implemented to compare the information of the list to a description of a comparative shape to be identified, to determine a measure for a difference between the object described by the list and the comparative shape, and to decide based on the measure for the difference whether the object described by the list corresponds to the comparative shape.

9. The device according to claim 6, wherein the shape detector is implemented to set up a plurality of descriptions of objects comprising different combinations of adjacent, identified straight line sections, identified circular arc segments or identified elliptical arc segments, and to select selected descriptions of objects corresponding to at least one comparative shape from the plurality of descriptions of objects.

10. The device according to claim 6, wherein the shape detector is implemented to detect two identified straight line sections, circular arc segments or elliptical arc segments as adjacent, identified straight line sections, circular arc segments or elliptical arc segments, when a distance between the identified straight line sections, circular arc segments or elliptical arc segments is smaller than a predetermined minimum distance.

11. The device according to claim 1, wherein the device comprises an edge detector which is implemented to detect edges in the image, and to generate an edge image based on the image;

wherein the Hough transformer is implemented to identify circular arc segments or elliptical arc segments in the edge image, to acquire a location information about the identified circular arc segments or elliptical arc segments, and to identify a plurality of straight line sections running in different directions through the edge image in the edge image to acquire a location information about the identified straight line sections;

wherein the device further comprises an ellipse detector which is implemented to detect a location of an ellipse in the image based on the location information about the identified circular arc segments or elliptical arc segments and to provide location information about the detected ellipse;

wherein the shape detector is implemented to determine relative location parameters based on a plurality of selected identified line sections from a entirety of identified line sections, describing a relative location of the selected identified line sections with regard to each other, to compare the relative location parameters of the selected identified line sections to relative location parameters of comparative shapes to be identified, wherein the comparative shapes describe contours of traffic signs, to detect a comparative shape in the edge image, when the relative location parameters of the selected identified line sections deviate from the relative location parameters of the comparative shapes to be identified by no more than a predetermined maximum admissible deviation, and to acquire the location information about the comparative shape detected in the edge image based on the location information about the identified straight line sections;

wherein the pattern identifier is implemented to select an image section of the image corresponding to the identified ellipse or the identified comparative shape depending on the fact whether in the edge image an ellipse or a comparative shape was identified, and to compare the image section or a mapped image section resulting from a mapping of the image section to one or several comparative images, to provide information with regard to the fact whether the image section or the mapped image section shows a traffic sign depending on how well the image section matches the at least one comparative image.

12. The device according to claim 1, wherein the pattern identifier comprises a writing detector, wherein the writing detector comprises a character description generator which is implemented to acquire a character description describing the location of the identified straight line sections, the identified circular arc segments or the identified elliptical arc segments based on information provided by the Hough transformer about straight line sections, identified circular arc segments or identified elliptical arc segments passing through the image;

wherein the writing detector comprises a database comparator which is implemented to compare the character description to a plurality of comparative character descriptions to which character codes are associated to provide a character code of a detected character as a result of the comparison; and wherein the device is implemented to use the character code for an identification of a traffic sign.

13. A method of identifying traffic signs in an image, comprising:

Hough transforming the image or an edge image derived from same to identify circular arc segments or elliptical arc segments;

detecting a shape corresponding to a traffic sign in the image or an edge image derived from same based on the identified circular arc segments or elliptical arc segments; and identifying a traffic sign in an image section corresponding to the detected shape using a comparative image pattern, wherein the section of the image and the comparative image pattern are adapted to each other with respect to a shape by mapping;

wherein detecting a shape corresponding to a traffic sign comprises detecting a location of an ellipse in the image or in the edge image derived from same based on the identified circular arc segments or elliptical arc segments;

wherein Hough transforming comprises determining extreme points of circular arc segments or of elliptical arc segments, and wherein detecting the ellipse comprises selecting a first set of four extreme points from the extreme points determined by the Hough transformer, and a second set of four extreme points from the extreme points determined by the Hough transformer, wherein the first set of four extreme points is different from the second set of four extreme points, wherein detecting the ellipse comprises determining parameters of a first fit ellipse by the four extreme points of the first set of extreme points, determining a deviation of the four extreme points of the first set of extreme points from the first fit ellipse, determining parameters of a second fit ellipse by the four extreme points of the second set of extreme points, determining a deviation of the four extreme points of the second set of extreme points from the fit ellipse, and determining, using the deviation of the four extreme points of the first set of extreme points from the first fit ellipse and using the deviation of the four extreme points of the second set of extreme points from the second fit ellipse, whether the four extreme points of the first set of extreme points belong to an ellipse in the image, and whether the four extreme points of the second set of extreme points belong to an ellipse in the image.

14. The method according to claim 13, the method comprising selecting an image section whose shape corresponds to the detected shape and identifying a traffic sign in the image section corresponding to the detected shape.

15. A non-transitory computer readable medium having a computer program for executing, when the computer program is executed on a computer, the method of identifying traffic signs in an image, the method comprising:

Hough transforming the image or an edge image derived from same to identify circular arc segments or elliptical arc segments;

detecting a shape corresponding to a traffic sign in the image or an edge image derived from same based on the identified circular arc segments or elliptical arc segments; and identifying a traffic sign in an image section corresponding to the detected shape using a comparative image pattern, wherein the section of the image and the comparative image pattern are adapted to each other with respect to a shape by mapping;

wherein detecting a shape corresponding to a traffic sign comprises detecting a location of an ellipse in the image or in the edge image derived from same based on the identified circular arc segments or elliptical arc segments;

wherein Hough transforming comprises determining extreme points of circular arc segments or of elliptical arc segments, and wherein detecting the ellipse comprises selecting a first set of four extreme points from the extreme points determined by the Hough transformer, and a second set of four extreme points from the extreme points determined by the Hough transformer, wherein the first set of four extreme points is different from the second set of four extreme points, wherein detecting the ellipse comprises determining parameters of a first fit ellipse by the four extreme points of the first set of extreme points, determining a deviation of the four extreme points of the first set of extreme points from the first fit ellipse, determining parameters of a second fit ellipse by the four extreme points of the second set of extreme points, determining a deviation of the four extreme points of the second set of extreme points from the fit ellipse, and determining, using the deviation of the four extreme points of the first set of extreme points from the first fit ellipse and using the deviation of the four extreme points of the second set of extreme points from the second fit ellipse, whether the four extreme points of the first set of extreme points belong to an ellipse in the image, and whether the four extreme points of the second set of extreme points belong to an ellipse in the image.

* * * * *